(12) United States Patent
Lu et al.

(10) Patent No.: US 11,686,923 B2
(45) Date of Patent: Jun. 27, 2023

(54) IMAGING LENSES AND IMAGING DEVICE

(71) Applicant: ZHEJIANG SUNNY OPTICAL, CO., LTD, Zhejiang (CN)

(72) Inventors: Jia Lu, Zhejiang (CN); Meng Yang, Zhejiang (CN); Fujian Dai, Zhejiang (CN); Liefeng Zhao, Zhejiang (CN)

(73) Assignee: ZHEJIANG SUNNY OPTICAL, CO., LTD, Zhejiang (CN)

( * ) Notice: Subject to any disclaimer, the term of this patent is extended or adjusted under 35 U.S.C. 154(b) by 399 days.

(21) Appl. No.: 16/896,247

(22) Filed: Jun. 9, 2020

(65) Prior Publication Data

US 2021/0072510 A1 Mar. 11, 2021

(30) Foreign Application Priority Data

Sep. 6, 2019 (CN) .......................... 201910843752.7

(51) Int. Cl.
*G02B 13/00* (2006.01)
*G02B 9/62* (2006.01)

(52) U.S. Cl.
CPC ............ *G02B 13/0045* (2013.01); *G02B 9/62* (2013.01)

(58) Field of Classification Search
CPC ...... H04N 5/2258; H04N 5/225; H04N 5/247; H04N 5/2254; H04N 13/243; H04N 13/239; G02B 13/0045; G02B 9/62; G02B 9/64; G03B 41/00; G01B 11/254; G01B 11/2513

USPC ....... 359/797, 763, 756, 753, 752, 749, 746, 359/745, 721, 714, 713
See application file for complete search history.

(56) References Cited

U.S. PATENT DOCUMENTS

2020/0150387 A1* 5/2020 Kim .................... H04N 5/23229
2020/0267326 A1* 8/2020 Yim .................... H04N 5/23296
2020/0371323 A1* 11/2020 Chern .................. H04N 13/243

FOREIGN PATENT DOCUMENTS

| CN | 101937124 B | 1/2013 |
| CN | 107664825 A | 2/2018 |
| CN | 107783260 A | 3/2018 |

* cited by examiner

*Primary Examiner* — Travis S Fissel
(74) *Attorney, Agent, or Firm* — Yu Gang

(57) ABSTRACT

An imaging lenses and an imaging device are provided, the imaging lenses includes a first imaging lens, a second imaging lens and a third imaging lens which are arranged at intervals in sequence, wherein the first imaging lens, the second imaging lens and the third imaging lens satisfy $1.0<Fno_1<Fno_2<Fno_3<3.0$; $5.0 \text{ mm} > F_1 > F_2 > F_3 > 1.0 \text{ mm}$; $P_1<P_2<P_3$; wherein $Fno_1$ is an aperture number of the first imaging lens, $Fno_2$ is an aperture number of the second imaging lens, $Fno_2$ is an aperture number of the third imaging lens, $F_1$ is an effective focal length of the first imaging lens, $F_2$ is an effective focal length of the second imaging lens, $F_3$ is an effective focal length of the third imaging lens. The disclosure solves the problem in the related art that a resolution of light of 3D structure the imaging device is low in a distant scene.

19 Claims, 23 Drawing Sheets

IMAGING LENSES AND IMAGING DEVICE

CROSS-REFERENCE TO RELATED APPLICATION(S)

The present application claims priority to Chinese Patent Application No. 201910843752.7, filed on Sep. 6, 2019 and entitled "Imaging Lenses and Imaging Device", the contents of which are hereby incorporated by reference in its entirety.

TECHNICAL FIELD

The disclosure relates to the technical field of optical lens imaging, and in particular, to an imaging lenses and an imaging device.

BACKGROUND

In recent years, with the gradual rise of three-dimensional depth applications, chip technologies and intelligent algorithms develop rapidly, and a structured light lens is used to project light emitted by an infrared LD (Laser Diode) or a VCSEL (Vertical Cavity Surface Emitting Laser) to an interaction target object. After the projection light beam passes through the optical diffraction element (DOE), the projection image is redistributed on the target object, and then the pattern projected onto an object is received back by using the camera lens, and after a certain algorithm processing, a three-dimensional image containing depth information about the position of the projected object can be calculated. The 3D structure light needs to actively emit a fixed spot pattern which is pre-designed and has high precision, and therefore has the advantages of being able to be used in a dark environment, high measurement precision, high resolution, etc., but also has the essential disadvantage of a relatively short measurement distance. Once the scene is far away, such as into an outdoor scene or the depth of the scene exceeds 1-10 m, the dispersed spot of the optical pattern is continuously enlarged, resulting in defocussing and increased errors.

That is to say, the imaging device in the related art has a problem that a resolution of light of 3D structure the imaging device is low in a distant scene.

SUMMARY

Some embodiments of the disclosure is to provide an imaging lenses and an imaging device, so as to solve the problem in the related art that a resolution of light of 3D structure the imaging device is low in a distant scene.

In order to achieve the described object, according to an embodiment of the disclosure, provided is an imaging lenses, including a first imaging lens, a second imaging lens and a third imaging lens which are arranged at intervals in sequence, wherein the first imaging lens, the second imaging lens and the third imaging lens satisfy: $1.0 < Fno_1 < Fno_2 < Fno_3 < 3.0$; $5.0 \text{ mm} > F_1 > F_2 > F_3 > 1.0 \text{ mm}$; $P_1 < P_2 < P_3$; wherein $Fno_1$ is an apertures number of the first imaging lens, $Fno_2$ is an apertures number of the second imaging lens, $Fno_3$ is an apertures number of the third imaging lens, $Fno_1$ is an effective focal length of the first imaging lens, $F_2$ is an effective focal length of the second imaging lens, $F_3$ is an effective focal length of the third imaging lens, $P_1$ is an object distance of the first imaging lens, $P_2$ is an object distance of the second imaging lens, $P_3$ is an object distance of the third imaging lens.

In an exemplary embodiment, the first imaging lens includes at least three lenses having positive focal power; the second imaging lens includes at least three lenses having positive focal power; the third imaging lens includes at least three lenses having positive focal power.

In an exemplary embodiment, the first imaging lens includes at least five plastic lenses; the second imaging lens includes at least five plastic lenses; the third imaging lens includes at least five plastic lenses.

In an exemplary embodiment, each of the first imaging lens, the second imaging lens and the third imaging lens each have at least one lens whose lens surface is aspherical.

In an exemplary embodiment, a viewing angle $Fov_3$ of the third imaging lens is greater than a viewing angle $Fov_1$ of the first imaging lens, and the viewing angle $Fov_3$ of the third imaging lens is greater than a viewing angle $Fov_2$ of the second imaging lens.

In an exemplary embodiment, any two adjacent lenses of the first imaging lens have an air interval on an optical axis of the first imaging lens; any two adjacent lenses of the second imaging lens have an air interval on an optical axis of the second imaging lens; any two adjacent lenses of the third imaging lens have an air interval on an optical axis of the third imaging lens.

In an exemplary embodiment, an object distance $P_2$ of the second imaging lens is greater than or equal to 500 mm and less than or equal to 1500 mm.

In an exemplary embodiment, the effective focal length $F_2$ of the second imaging lens, an effective focal length $f_{21}$ of a first lens of the second imaging lens, an effective focal length $f_{25}$ of a fifth lens of the second imaging lens and an effective focal length $f_{26}$ of a sixth lens of the second imaging lens satisfy $0.7 < F_2/(f_{21}+f_{25}+f_{26}) < 1.0$.

In an exemplary embodiment, a curvature radius $R_{23}$ of a second lens object-side surface of a second lens of the second imaging lens, a curvature radius $R_{24}$ of a second lens image-side surface of the second lens of the second imaging lens, a curvature radius $R_{21}$ of a first lens object-side surface of a first lens of the second imaging lens, and a curvature radius $R_{22}$ of a first lens image-side surface of the first lens of the second imaging lens satisfy $0.4 < (R_{23}+R_{24})/(R_{21}+R_{22}) < 0.8$.

In an exemplary embodiment, a distance $TTL_2$ between a first lens object-side surface of a first lens of the second imaging lens and an imaging surface of the second imaging lens on an optical axis of the second imaging lens, $ImgH_2$ is a half of a diagonal length of an effective pixel area on an imaging surface of the second imaging lens, $TTL_2$ and $ImgH_2$ satisfy $TTL_2/ImgH_2 < 1.65$.

In an exemplary embodiment, an effective focal length $f_{31}$ of a first lens of the third imaging lens, an effective focal length $f_{32}$ of a second lens of the third imaging lens, an effective focal length $f_{33}$ of a third lens of the third imaging lens, an effective focal length $f_{34}$ of a fourth lens of the third imaging lens, an effective focal length $f_{35}$ of a fifth lens of the third imaging lens and an effective focal length $f_{36}$ of a sixth lens of the third imaging lens satisfy the following condition: $-1.0 < (f_{31}+f_{34}+f_{36})/(f_{32}+f_{33}+f_{35}) < -0.4$.

In an exemplary embodiment, a curvature radius $R_{39}$ of a fifth lens object-side surface of a fifth lens of the imaging lens and a curvature radius $R_{310}$ of a fifth lens image-side surface of the fifth lens of the third imaging lens satisfy the following condition: $0.6 < (R_{39}+R_{310})/(R_{39}-R_{310}) < 0.9$.

In an exemplary embodiment, an optical axis of the first imaging lens, an optical axis of the second imaging lens and an optical axis of the third imaging lens are all not coaxial, t.

According to another embodiment of the disclosure, there is provided an imaging device including the imaging lenses described above.

By applying the technical solutions of the disclosure, an imaging lenses includes a first imaging lens, a second imaging lens and a third imaging lens which are arranged at intervals in sequence, wherein an apertures number $Fno_1$ of the first imaging lens, an apertures number $Fno_2$ of the second imaging lens and an apertures number $Fno_3$ of the third imaging lens satisfy $1.0<Fno_1<Fno_2<Fno_3<3.0$; an effective focal length $F_1$ of the first imaging lens, an effective focal length $F_2$ of the second imaging lens and an effective focal length $F_3$ of the third imaging lens satisfy $5.0 \text{ mm} > F_1 > F_2 > F_3 > 1.0 \text{ mm}$; an object distance p of the first imaging lens, an object distance $P_2$ of the second imaging lens and an object distance $P_3$ of the third imaging lens satisfy $P_1 < P_2 < F_3$.

By arranging the aperture numbers, the focal lengths and an object distances of the first imaging lens, the second imaging lens and the third imaging lens to be different gradients, so that the depth of field and the detection distance of the three imaging lenses have different ranges, and the finally obtained depth map can use a weighted combination of the three depth maps, so as to increase the resolution of an image formed by the imaging lenses. Certainly, different weights of the lenses in the imaging lenses may also be allocated, so that the proportion of the weights of the lenses with clearer imaging in the imaging lenses is larger, thereby increasing the depth of field of the imaging lenses and the resolution of imaging. In this way, a part of low-definition areas in the three lenses caused by inconsistent depth of field and detection distance measurement can be compensated, and a noise point, a blank point or a data error point which may appear in a depth image of a single lens can also be compensated, so that the imaging lenses can improve the imaging resolution of a scene distributed in different shapes under different distances.

BRIEF DESCRIPTION OF THE DRAWING

The accompanying drawings, which form a part of the present application, are used to provide a further understanding of the disclosure. The schematic embodiments of the disclosure and the description thereof are used to explain the disclosure, and do not form improper limits to the disclosure. In the drawings.

Figure 1:
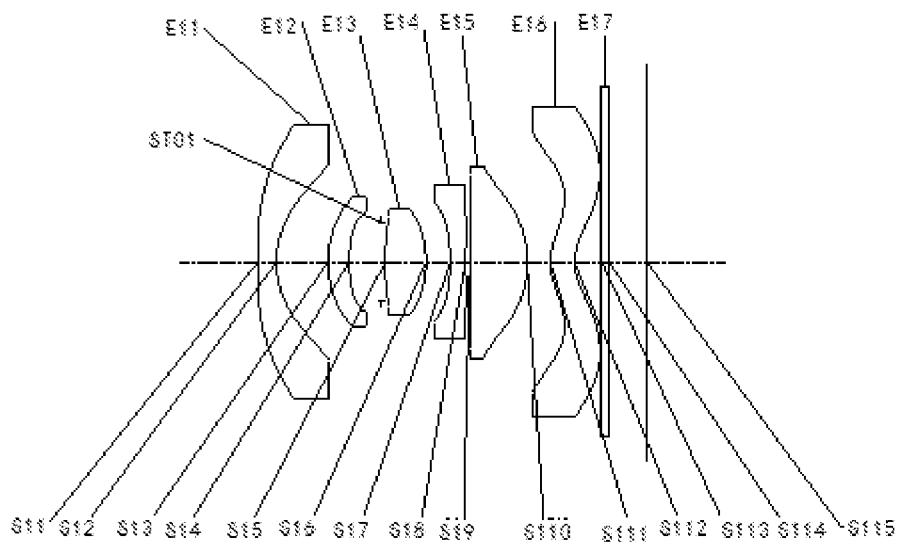
FIG. 1 is a schematic structural view of a first imaging lens according to a first embodiment of the disclosure.

The figures include the following reference signs:

10: first imaging lens; 20: second imaging lens; 30: third imaging lens; E11: first lens of the first imaging lens; S11, first lens object-side surface of a first lens of a first imaging lens; S12, first lens image-side surface of the first lens of the first imaging lens; E12, second lens of the first imaging lens; S13, second lens object-side surface of the second lens of the first imaging lens; S14, second lens image-side surface of the second lens of the first imaging lens; E13, third lens of the first imaging lens; S15, third lens object-side surface of the third lens of the first imaging lens; S16, third lens image-side surface of the third lens of the first imaging lens; E14: fourth lens of the first imaging lens; S17, fourth lens object-side surface of the fourth lens of the first imaging lens; S18, fourth lens image-side surface of the fourth lens of the first imaging lens; E15: fifth lens of the first imaging lens; S19, fifth lens object-side surface of the fifth lens of the first imaging lens; S110, fifth lens image-side surface of the fifth lens of the first imaging lens; E16, sixth lens of the first imaging lens; S111, sixth lens object-side surface of the sixth lens of the first imaging lens; S112, sixth lens image-side surface of the sixth lens of the first imaging lens; E17, filter of the first imaging lens; S113, filter object-side surface of the first imaging lens; S114, filter image-side surface of the first imaging lens; S115, imaging surface of the first imaging lens; E18, seventh lens of the first imaging lens; S116, seventh lens object-side surface of the seventh lens of the first imaging lens; S117, seventh lens image-side surface of the seventh lens of the first imaging lens; STO1, diaphragm of the first imaging lens; E21, first lens of second imaging lens; S21, first lens object-side surface of a first lens of a second imaging lens; S22, first lens image-side surface of the first lens of the second imaging lens; E22, second lens of second imaging lens; S23, second lens object-side surface of the second lens of the second imaging lens; S24, second lens image-side surface of the second lens of the second imaging lens ; E23, third lens of the second imaging lens; S25, third lens object-side surface of the third lens of the second imaging lens; S26, third lens image-side surface of the third lens of the second imaging lens; E24, fourth lens of the second imaging lens; S27, fourth lens object-side surface of the fourth lens of the second imaging lens; S28, fourth lens image-side surface of the fourth lens of the second imaging lens; E25, fifth lens of the second imaging lens; S29, fifth lens object-side surface of the fifth lens of the second imaging lens; S210, fifth lens image-side surface of the fifth lens of the second imaging lens; E26, sixth lens of the second imaging lens; S211, sixth lens object-side surface of the sixth lens of the second imaging lens; S212, sixth lens image-side surface of the sixth lens of the second imaging lens; E27, filter of the second imaging lens; S213, filter object-side surface of the second imaging lens; S214, filter image-side surface of the second imaging lens; S215, imaging surface of the second imaging lens; STO2, diaphragm of the second imaging lens; E31, first lens of the third imaging lens; S31, first lens object-side surface of the first lens of the third imaging lens; S32, first lens image-side surface of the first lens of the third imaging lens; E32: second lens of the third imaging lens; S33, second lens object-side surface of the second lens of the third imaging lens; S34, second lens image-side surface of the second lens of the third imaging lens; E33, third lens of the third imaging lens; S35; third lens object-side surface of the third lens of the third imaging lens; S36: third lens image-side surface of the third lens of the third imaging lens; E34, fourth lens of the third imaging lens; S37, fourth lens object-side surface of the fourth lens of the third imaging lens; S38, fourth lens image-side surface of the fourth lens of the third imaging lens; E35, fifth lens of the third imaging lens; S39, fifth lens object-side surface of the fifth lens of the third imaging lens; S310, fifth lens image-side surface of the fifth lens of the third imaging lens; E36, sixth lens of the third imaging lens; S311, sixth lens object-side surface of the sixth lens of the third imaging lens; S312, sixth lens image-side surface of the sixth lens of the third imaging lens; E37, filter of the third imaging lens; S313, filter object-side surface of the third imaging lens; S314, filter image-side surface of the third imaging lens; S315, imaging surface of the third imaging lens; ST03: diaphragm of the third imaging lens.

DETAILED DESCRIPTION OF THE EMBODIMENTS

It is important to note that the embodiments of the disclosure and the characteristics in the embodiments can be combined under the condition of no conflicts. The disclosure will be described below with reference to the drawings and embodiments in detail.

It is noted that, unless otherwise indicated, all technical and scientific terms used herein have the same meaning as commonly understood by one of ordinary skill in the art to which the disclosure belongs.

In the disclosure, unless specified to the contrary, the directional terms such as "upper", "lower", "top", and "bottom" are generally used for the directions shown in the drawings, or for the components themselves in vertical, vertical, or gravitational directions; Likewise, for ease of understanding and description, "inner and outer" refers to the inner and outer relative to the outline of each component itself, but the described orientation is not used to limit the disclosure.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lenses have been slightly exaggerated for ease illustration. In particular, a spherical shape or an aspherical shape shown in the drawings is shown by some embodiments. That is, the spherical shape or the aspherical shape is not limited to the spherical shape or the aspherical shape shown in the drawing. The drawings are by way of example only and not strictly to scale.

Herein, a paraxial area refers to an area near an optical axis. If a lens surface is a convex surface and a position of the convex surface is not defined, it indicates that the lens surface is a convex surface at least in the paraxial area. If the lens surface is a concave surface and a position of the concave is not defined, it indicates that the lens surface is a concave surface at least in the paraxial area. A surface of each lens close to an object-side is an object-side surface of the lens, and a surface of each lens close to the image-side is an image-side surface of the lens. According to a determination method of a common knowledge in the art; the surface type of the paraxial area can be determined by using an R value, the concave surface or the convex surface is determined by positive and negative correlations of the R value are (R refers to a curvature radius of the paraxial area, and generally refers to an R value on a lens data in optical software). For an object-side surface, when the R value is positive, it is judged to be a convex surface, and when the R value is negative, it is judged to be a concave surface. For an image-side surface, when the R value is positive, it is judged to be a concave surface, and when the R value is negative, it is judged to be a convex surface.

In order to solve the problem in the related art that the resolution of light of 3D structure the imaging device is low in a distant scene, the disclosure provides an imaging lenses and an imaging device.

As shown in FIGS. 1-46, an imaging lenses includes a first imaging lens 10, a second imaging lens 20 and a third imaging lens 30 which are arranged at intervals in sequence, wherein an apertures number of the first imaging lens $Fno_1$, an apertures number of the second imaging lens $Fno_2$ and an apertures number of the third imaging lens $Fno_3$ satisfy $1.0<Fno_1<Fno_2<Fno_3<3.0$; an effective focal length $F_1$ of the first imaging lens, an effective focal length $F_2$ of the second imaging lens and an effective focal length $F_3$ of the third imaging lens satisfy 5.0 mm$>F_1>F_2>F_3>$1.0 mm; an object distance $P_1$; of the first imaging lens, an object distance $P_2$ of the second imaging lens and an object distance $P_3$ of the third imaging lens satisfy $P_1<P_2<P_3$.

By arranging the aperture numbers, the focal lengths and an object distances of the first imaging lens 10, the second imaging lens 20 and the third imaging lens 30 to be different gradients, so that the depth of field and the detection distance of the three imaging lenses have different ranges, and the finally obtained depth map can use a weighted combination of the three depth maps, so as to increase the resolution of an image formed by the imaging lenses. Certainly, different weights of the lenses in the imaging lenses may also be allocated, so that the proportion of the weights of the lenses with clearer imaging in the imaging lenses is larger, thereby increasing the depth of field of the imaging lenses and the resolution of imaging. In this way, a part of low-definition areas in the three lenses caused by inconsistent depth of field and detection distance measurement can be compensated, and a noise point, a blank point or a data error point which may appear in a depth image of a single lens can also be compensated, so that the imaging lenses can improve the imaging resolution of a scene distributed in different shapes under different distances.

Specifically, a second imaging lens is selected as a predetermined lens; an image error formed by the predetermined lens is a2; an image error formed by the first imaging lens is a1; an image error formed by the third imaging lens is a3; at a2 and a3 are compared; when a1>a2, and a3>a2, increasing a weight of a depth corresponding of an image formed by the predetermined lens, and when a1<a2 and a3>a2, increasing a weight of a depth corresponding of an image of the first imaging lens; when a1>a2 and a3<a2, increasing a weight of a depth corresponding to the image formed by the third imaging lens; when a1<a2 and a3<a2, increasing both the weight of the depth corresponding to the image formed by the first imaging lens and the weight of the depth corresponding to the image formed by the third imaging lens, the contrast of an image formed by the predetermined lens is b2, the contrast of an image formed by the first imaging lens is b1, and the contrast of an image formed by the third imaging lens is b3; and b1, b2 and b3 are compared, and when b1<b2 and b3<b2, increasing a weight of a depth corresponding to the image formed by the predetermined lens; when b1<b2 and b3>b2, increasing a weight of a depth corresponding to the image formed by the third imaging lens; and when b1>b2 and b3<b2, increasing a weight of a depth corresponding to the image formed by the first imaging lens, when b1>b2 and b3>b2, increasing the weight of the depth corresponding to the image formed by the first imaging lens and the weight of the depth corresponding to the image formed by the third imaging lens at the same time. It should be noted that the predetermined lens may be the first imaging lens or the third imaging lens, and only the second imaging lens is used as the predetermined lens for description, and the imaging lens forming the image error a1 may also be the third imaging lens or the second imaging lens, and not only the first imaging lens. For convenience of explanation, a1 is assigned to the first imaging lens and a3 is assigned to the third imaging lens.

It should be noted that the imaging lenses may select a lens required by the three imaging lenses to perform shooting and imaging according to the position, brightness, depth of field, resolution, and the like of the images collected by the imaging lenses.

Specifically, the first imaging lens 10 includes at least three lenses with positive focal power; the second imaging lens 20 includes at least three lenses with positive focal power; the third imaging lens 30 includes at least three lenses with positive focal power. By reasonably configuring the focal power of each imaging lens, the deflection angle of light between lenses can be reduced, and the sensitivity of the lenses is reduced, thereby relaxing tolerance conditions, reducing the process difficulty of the imaging lenses, and facilitating the manufacturing of the imaging lenses.

Optionally, the first imaging lens 10 includes at least five plastic lenses; the second imaging lens 20 includes at least five plastic lenses; the third imaging lens 30 includes at least five plastic lenses. By reasonably configuring the materials of the lenses in the three imaging lenses, the material cost can be saved, the technological process can be simplified, the weight of the imaging lens can also be reduced, and the trend of light and thin imaging lenses is satisfied.

The first imaging lens 10, the second imaging lens 20, and the third imaging lens 30 each have at least one lens whose lens surface is aspherical. The introduction of an aspheric mirror surface in the imaging lens can not only greatly increase the degree of freedom of optical design, but also correct most aberrations (spherical aberration, coma, field area, distortion, etc.), thereby further improving the imaging quality of the imaging lenses. An aspheric lens is a curvature that varies continuously from the center of the lens to the periphery of the lens. Unlike a spherical lens having a constant curvature from the center of the lens to the periphery of the lens, an aspheric lens has better curvature radius characteristics, and has advantages of improving a distortion aberration and an astigmatic aberration. After the aspheric lens is used, the aberration occurring during imaging can be eliminated as much as possible, thereby improving the imaging quality.

The viewing angle $Fov_3$ of the third imaging lens is greater than the viewing angle $Fov_1$ of the first imaging lens, and the viewing angle $Fov_3$ of the third imaging lens is greater than the viewing angle $Fov_2$ of the second imaging lens. Such arrangement can improve the image height of an image formed by the imaging lenses, and can also avoid the situation that the aberration of the viewing angle at the edge of the imaging lenses is too large, so that the imaging lenses has the characteristics of a wide imaging range and a high imaging quality, thereby effectively increasing the viewing angle range of the imaging lenses during imaging, and improving the shooting experience effect of a user.

In an exemplary embodiment, any two adjacent lenses of the first imaging lens have an air interval on an optical axis of the first imaging lens; any two adjacent lenses of the second imaging lens have an air interval on an optical axis of the second imaging lens; any two adjacent lenses of the third imaging lens have an air interval on an optical axis of the third imaging lens. Air intervals between adjacent lenses in the three imaging lenses are reasonably configured, so that deflection of light between the lenses can be alleviated, collisions between adjacent lenses can also be reduced during assembly, and damage to the lenses can be reduced. Of course, a space piece or a space ring may be added at an air interval between adjacent lenses according to requirements, so that the stability of the structure of the imaging lens can be enhanced, and the imaging lens can keep being miniaturized while also improving the stray light of the system.

An object distance $P_2$ of the second imaging lens is greater than or equal to 500 millimeters and less than or equal to 1500 millimeters. Since the distance between the scenes is from near to far. The dispersed spots of the optical pattern are expanding continuously, this is extremely prone to out-of-focus and errors, reasonably controlling the distance from an object in a second imaging lens 20 to a first lens object-side surface of the second lens on an optical axis of the second imaging lens, so that the initial weight of the second imaging lens 20 is relatively large, according to the depth of field measured by the second imaging lens 20 in real time, the weights of the first imaging lens 10 and the third imaging lens are increased and decreased in real time, In order to effectively improve the imaging efficiency and a number of frames, increasing the definition of imaging.

An effective focal length $F_2$ of the second imaging lens, an effective focal length $f_{21}$ of the first lens of the second imaging lens, an effective focal length $f_{25}$ of the fifth lens of the second imaging lens and an effective focal length $f_{26}$ of the sixth lens of the second imaging lens satisfy $0.7<F_2/(f_{21}+f_{25}+f_{26})<1.0$. By reasonably controlling the range of this conditional expression, excessive concentration of optical power can be avoided, the aberration correction capability of the system can be improved well, and at the same time, the size of the second imaging lens can also be effectively reduced, so that the second imaging lens can be lighter and thinner.

Specifically, a curvature radius $R_{23}$ of a second lens object-side surface of second lens of the second imaging lens, a curvature radius $R_{24}$ of a second lens image-side surface of the second lens of the second imaging lens, a curvature radius $R_{21}$ of a first lens object-side surface of a first lens of the second imaging lens, and a curvature radius $R_{22}$ of a first lens image-side surface of the first lens of the second imaging lens satisfy $0.4<(R_{23}+R_{24})/(R_{21}+R_{22})<0.8$. By controlling curvature radius of the first lens of the second imaging lens and a curvature radius the second lens of the second imaging lens, the second imaging lens 20 can better achieve the deflection of the light path, so as to balance the advanced spherical aberration generated by the second imaging lens 20.

A distance $TTL_2$ between a first lens object-side surface of a first lens of the second imaging lens and an imaging surface of the second imaging lens on an optical axis of the second imaging lens, $ImgH_2$ is a half of a diagonal length of an effective pixel area on an imaging surface of the second imaging lens, $TTL_2$ and $ImgH_2$ satisfy $TTL_2/ImgH_2<1.65$. By controlling the ratio of the distance between the first lens object-side surface of the first lens of the second imaging lens 20 and the imaging surface of the second imaging lens on the optical axis of the second imaging lens to the half of the diagonal length of an effective pixel area on an imaging surface of the second imaging lens within a reasonable range, under the condition that the optical system of the second imaging lens has a relatively short length, It can be ensured that the optical system of the second imaging lens has a sufficiently large image surface, so as to present more detailed information about the shot object, this makes the imaging clearer.

An effective focal length $f_{31}$ of a first lens of the third imaging lens, an effective focal length $f_{32}$ of a second lens of the third imaging lens, an effective focal length $f_{33}$ of a third lens of the third imaging lens, an effective focal length $f_{34}$ of a fourth lens of the third imaging lens, an effective focal length $f_{35}$ of a fifth lens of the third imaging lens and an effective focal length $f_{36}$ of a sixth lens of the third imaging lens satisfy the following condition: $-1.0<(f_{31}+f_{34}+f_{36})/(f_{32}+f_{33}+f_{35})<-0.4$. By reasonably distributing the focal power of each lens of the third imaging lens, the contribution amount of field curvature of each lens can be rationally controlled, so that the field curvature of the third imaging lens is controlled within a reasonable range.

curvature radius $R_{39}$ of a fifth lens object-side surface of a fifth lens of the imaging lens and a curvature radius $R_{310}$ of a fifth lens image-side surface of the fifth lens of the third imaging lens satisfy the following condition: $0.6<(R_{39}+R_{310})/(R_{39}+R_{310})<0.9$. In this way, the deflection angle of the marginal ray of the optical imaging system of the third imaging lens can be reasonably controlled, and the sensitivity of the optical imaging system of the third imaging lens can be effectively reduced.

An optical axis of the first imaging lens, an optical axis of the second imaging lens and an optical axis of the third imaging lens are all not coaxial, t. Such arrangement facilitates comparison of height differences of three imaging lenses, and facilitates assembly of a module. During assembly, the three imaging lenses select a suitable total length of TTL, so that the height differences of the three imaging lenses are within a reasonable range.

The imaging lenses in the disclosure can improve the resolution of optical depth detection of 3D structure the imaging device in a distant scene, thereby achieving a more accurate and effective depth image.

Alternatively, the imaging device includes the above-described imaging lenses. The imaging device can shoot objects with a plurality of depth of field, increasing the imaging clarity of the imaging device. The imaging device may be a mobile phone, a PAD, or a computer.

Examples of specific surface types and parameters applicable to the imaging lenses of the above-described embodiment will be further described below with reference to the drawings. It should be noted that, Embodiment 1 to Embodiment 3 are mainly examples of the first imaging lens 10, Embodiment 4 to Embodiment 6 are mainly examples of the second imaging lens 20, and Embodiment 7 to Embodiment 9 are mainly examples of the third imaging lens 30. The first imaging lens 10, the second imaging lens 20, and the third imaging lens 30 in the embodiments may be combined arbitrarily. Of course, they can also be combined with other embodiments not mentioned in the present application, as long as some of the described conditional expressions are satisfied.

Embodiment 1

It should be noted that, in the embodiment, the first imaging lens 10 is defined.

As shown in FIG. 1, the first imaging lens 10 includes a first lens E11 of the first imaging lens, a second lens E12 of the first imaging lens, a diaphragm STO1 of the first imaging lens, a third lens E13 of the first imaging lens, a fourth lens E14 of the first imaging lens, a fifth lens E15 of the first imaging lens, a sixth lens E16 of the first imaging lens, a filter E17 of the first imaging lens and an imaging surface S115 of the first imaging lens in order from an object-side to the image-side along the optical axis.

The first lens E11 of the first imaging lens has a negative optical power, a first lens object-side surface S11 of the first lens of the first imaging lens is a convex surface, and a first lens image-side surface S12 of the first lens of the first imaging lens is a concave surface; a second lens E12 of the first imaging lens has a positive focal power, a second lens object-side surface S13 of the second lens of the first imaging lens is a convex surface, and a second lens image-side surface S14 of the second lens of the first imaging lens is a concave surface; the third lens E13 of the first imaging lens has a positive focal power, the third lens object-side surface S15 of the third lens of the first imaging lens is convex surface, and the third lens image-side surface S16 of the third lens of the first imaging lens is convex surface; a fourth lens E14 of the first imaging lens has a negative optical power, a fourth lens object-side surface S17 of the fourth lens of the first imaging lens is a concave surface, and a fourth lens image-side surface S18 of the fourth lens of the first imaging lens is a concave surface; the fifth lens E15 of the first imaging lens has a positive focal power, a fifth lens object-side surface 819 of the fifth lens of the first imaging lens is a convex surface, and a fifth lens image-side surface S110 of the fifth lens of the first imaging lens is a convex surface; The sixth lens E16 of the first imaging lens has a positive focal power, a sixth lens object-side surface S111 of the sixth lens of the first imaging lens is a convex surface, and a sixth lens image-side surface S112 of the sixth lens of the first imaging lens is a concave surface. The filter E17 of the first imaging lens has a filter object-side surface S113 the first imaging lens and a filter image-side surface S114 of the first imaging lens. Light from an object sequentially passes through the respective surfaces and is finally imaged on the imaging surface S115 of the first imaging lens. Table 1 shows the surface type, a curvature radius, a thickness, material and conic coefficient of each lens of the first imaging lens in the embodiment, in which the units of the curvature radius and the thickness are all millimeters.

TABLE 1

Detailed optical data of the first imaging lens in the embodiment

| Surface Number | Surface Type | Curvature radius | Thickness | Materials | Material | Conic Coefficient |
|---|---|---|---|---|---|---|
| OBJ | sphere | none | 125.0000 | | | |
| S11 | aspheric surface | 203.8253 | 0.7155 | 1.55, 56.1 | plastic | 0.0000 |
| S12 | aspheric surface | 4.0951 | 1.9622 | | | −0.3795 |
| S13 | aspheric surface | 3.9799 | 0.8023 | 1.62, 25.9 | plastic | 0.2138 |
| S14 | aspheric surface | 5.5537 | 1.2328 | | | 6.6372 |
| STO1 | sphere | none | 0.1449 | | | 0.0000 |
| S15 | aspheric surface | 9.9565 | 1.5633 | 1.55, 56.1 | plastic | 9.3748 |
| S16 | aspheric surface | −4.1987 | 0.9177 | | | 1.6145 |
| S17 | aspheric surface | −8.5542 | 0.5875 | 1.68, 19.2 | plastic | 5.1264 |
| S18 | aspheric surface | 21.5077 | 0.1746 | | | 0.0000 |
| S19 | aspheric surface | 17.3420 | 2.1748 | 1.55, 56.1 | plastic | −71.1483 |
| S110 | aspheric surface | −5.0220 | 0.8877 | | | 0.3090 |
| S111 | aspheric surface | 2.1324 | 0.9307 | 1.64, 24.0 | plastic | −3.3479 |
| S112 | aspheric surface | 1.8162 | 1.0338 | | | −2.3649 |
| S113 | sphere | none | 0.2750 | 1.52, 64.2 | glass | |
| S114 | sphere | none | 1.4474 | | | |
| S115 | sphere | none | | | | |

In the embodiment, each lens can be an aspheric lens, each aspheric surface type x defined by the formula:

$$x = \frac{ch^2}{1+\sqrt{1-(k+1)c^2h^2}} + \sum A_i h^i \quad \text{formula 1}$$

where x is the distance sagittal height of the aspheric surface from the apex of the aspheric surface at a position of height h along the optical axis direction; c is a near-axis curvature of an aspheric surface;

$$c = \frac{1}{R}$$

(i. e. the near-axis curvature c is the reciprocal of the curvature radius R in table 1 above); k is the conic coefficient (given in Table 1); Ai is a correction coefficient of an aspheric i-th order.

Table 2 shows higher order coefficients of the respective aspherical surfaces of the respective aspherical lenses that can be used for the first imaging lens in the embodiment.

image acquisition quality is improved, and a stable imaging effect is acquired. Note that the larger the aperture value is, the smaller the aperture is, and the smaller the aperture value is, the larger the aperture is.

Figure 2:
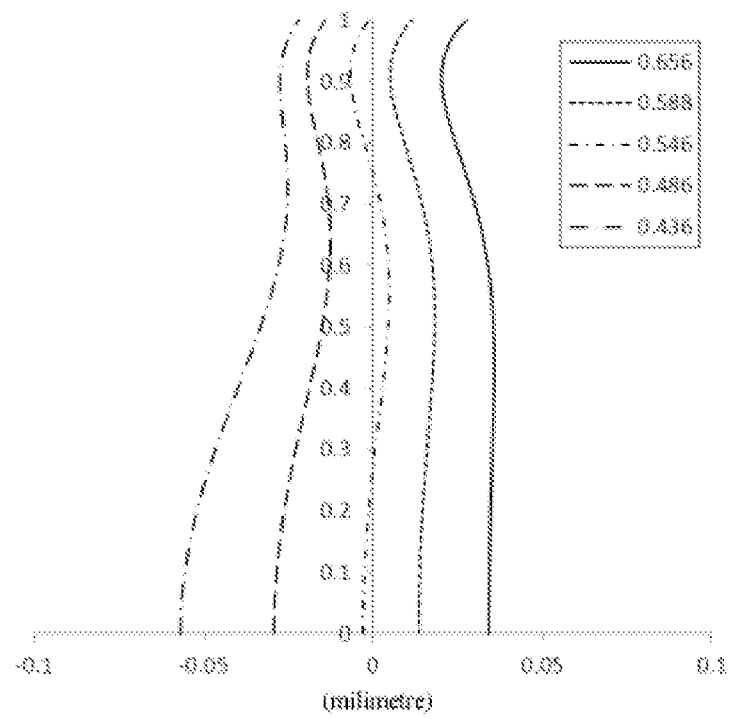
FIG. 2 shows an axial chromatic aberration curve of the first imaging lens in FIG. 1.

FIG. 2 shows an axis chromatic aberration curve on the first imaging lens 10 in the present embodiment, which indicates that focuses of light with different wavelengths are

TABLE 2 the high order coefficients of the aspherical surfaces of the first imaging lens in the present embodiment

| Surface Number | A4 | A6 | A8 | A10 | A12 | □A14 | □A16 | A18 |
|---|---|---|---|---|---|---|---|---|
| S11 | 3.1845E−01 | −2.4964E−01 | 1.4422E−01 | −5.7906E−02 | 1.5901E−02 | −2.8300E−03 | 2.9300E−04 | −1.4000E−05 |
| S12 | 7.7940E−03 | −8.6000E−04 | −1.7000E−05 | 9.1053E−06 | −6.7076E−07 | 1.5308E−08 | 0.0000E+00 | 0.0000E+00 |
| S13 | −6.8000E−04 | 5.5100E−04 | −2.0000E−04 | 5.6110E−05 | −4.8774E−06 | 0.0000E+00 | 0.0000E+00 | 0.0000E+00 |
| S14 | 3.9100E−03 | 2.7800E−04 | 2.1300E−04 | −2.1053E−05 | 7.8463E−06 | 0.0000E+00 | 0.0000E+00 | 0.0000E−00 |
| S15 | −9.5000E−04 | −2.2000E−04 | −2.1000E−06 | −1.8620E−05 | 0.0000E+00 | 0.0000E+00 | 0.0000E+00 | 0.0000E+00 |
| S16 | −8.6290E−02 | 1.3765E−02 | 1.9792E−01 | −1.0014E+00 | 1.2750E+00 | 1.0369E+00 | −3.4444E+00 | 1.9606E+00 |
| S17 | −2.9654E−01 | −9.3142E−01 | 5.2641E+00 | −1.4012E+01 | 2.1609E+01 | −2.0168E+01 | 1.0530E+01 | −2.3184E+00 |
| S18 | −1.0726E−01 | −1.4407E+00 | 4.7781E+00 | −8.0142E+00 | 8.1749E+00 | −5.0581E+00 | 1.7430E+00 | −2.5635E−01 |
| S19 | 1.5441E−01 | −1.3405E+00 | 2.8239E+00 | −3.5770E+00 | 2.9570E+00 | −1.5127E+00 | 4.3100E−01 | −5.2460E−02 |
| S110 | −7.9276E−01 | 1.9889E+00 | −3.3304E+00 | 3.7208E+00 | −2.6976E+00 | 1.2138E+00 | −3.0118E−01 | 3.0980E−02 |
| S111 | −4.4433E−01 | −2.2900E−03 | 4.6742E−02 | 2.3050E−03 | −1.2896E−02 | 5.2770E−03 | −8.9000E−04 | 5.6500E−05 |
| S112 | −5.2543E−01 | 2.4845E−01 | −8.1480E−02 | 1.6561E−02 | −1.8501E−03 | 7.6800E−05 | 3.7200E−06 | −3.5000E−07 |

Table 3 shows an effective focal length $F_1$ of the first imaging lens in the present embodiment, an effective focal lengths $f_{11}$ to $f_{16}$ of each lens of the first imaging lens, the distance $TTL_1$ on the optical axis from the first lens object-side surface S11 of the first imaging lens to the imaging surface S115 of the first imaging lens, and $ImgH_2$ is a half of a diagonal length of an effective pixel area on an imaging surface of the first imaging lens, the apertures number $Fno_1$ of the first imaging lens, an object distance $P_1$ of the first imaging lens, and the maximum half viewing angle Semi-FOV1 of the first imaging lens.

TABLE 3

Parameters of optical imaging lenses

| Embodiment Parameters | 1 |
|---|---|
| f11 (mm) | −7.66 |
| f12 (mm) | 18.93 |
| f13 (mm) | 5.62 |
| f14 (mm) | −8.94 |
| f15 (mm) | 7.38 |
| f16 (mm) | 126.89 |
| F1 (mm) | 4.25 |
| TTL1 (mm) | 14.85 |
| ImgH1 (mm) | 7.62 |
| Fno1 | 1.94 |
| P1 (mm) | 125.00 |
| Semi-FOV1(°) | 60.2 |

Figure 3:
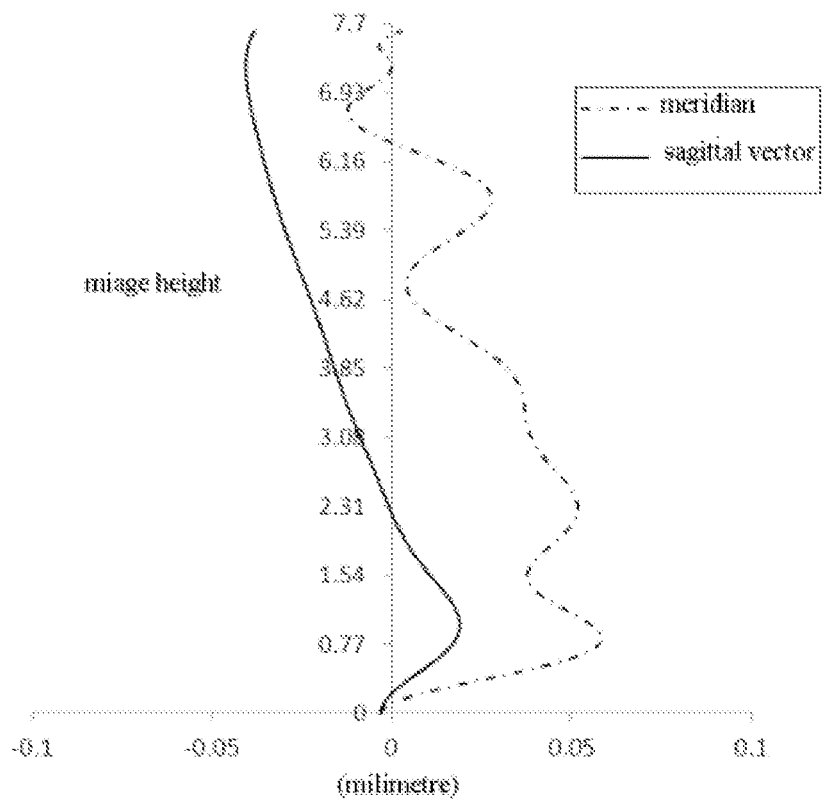
FIG. 3 shows the astigmatism curve of the first imaging lens in FIG. 1.
Figure 4:
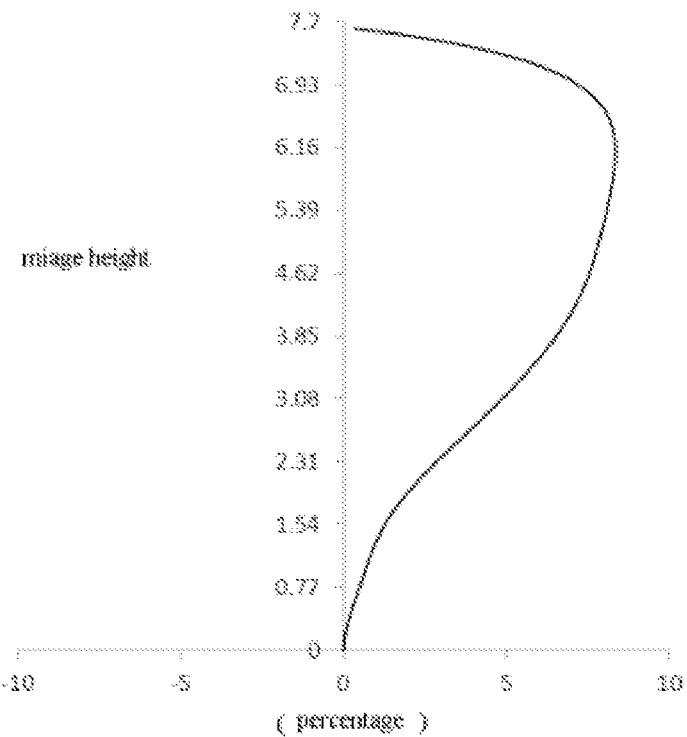
FIG. 4 shows the distortion curve of the first imaging lens in FIG. 1.
Figure 5:
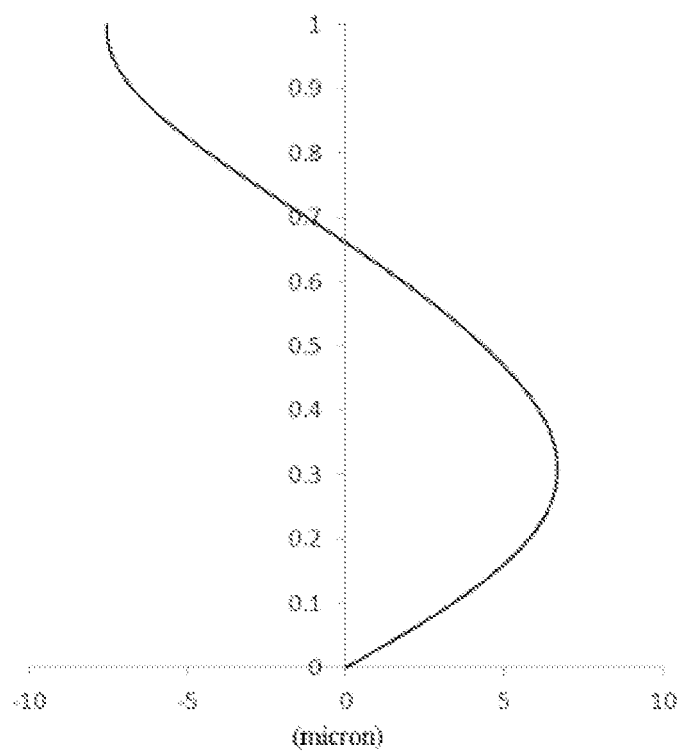
FIG. 5 shows the magnification chromatic aberration curves of the first imaging lens in FIG. 1.

In the embodiment, the length of the first imaging lens 10 on the optical axis from the first lens object-side surface S11 of the first lens of the first imaging lens to the imaging surface S115 of the first imaging lens is 14.85 mm, and an effective focal length of the first imaging lens is 4.25 mm, the image height of the first imaging lens is 7.62 mm, the maximum half viewing angle of the first imaging lens is 60.2 degrees, the aperture value of the first imaging lens is 1.94, and an object distance of the first imaging lens is 125 mm. In the present embodiment, while the optical imaging lens is ensured to be miniaturized, a larger aperture can be ensured, and more light entering quantities can be acquired. When the light is insufficient, the optical aberration is reduced, the deviated after passing through an optical system, so that the focal planes of the light with different wavelengths cannot coincide at the time of the last imaging, and the polychromatic light is spread to form dispersion. FIG. 3 shows a stigmatic curve of the first imaging lens in the embodiment, which represents a meridional image surface curvature and a sagittal image surface curvature. FIG. 4 shows distortion curves of the first imaging lens in the embodiment, which represents distortion magnitude values for different viewing angles. FIG. 5 shows the magnification chromatic aberration curves of the first imaging lens in the embodiment, which represents the phase differences of the different image heights on the imaging surface after the light passes through the optical imaging lens. It can be seen from FIG. 2 to FIG. 5 that the first imaging lens 10 in the embodiment is applicable to a convenient electronic product, and has a large aperture and good imaging quality.

Embodiment 2

It should be noted that the second embodiment defines the first imaging lens 10.

Figure 6:
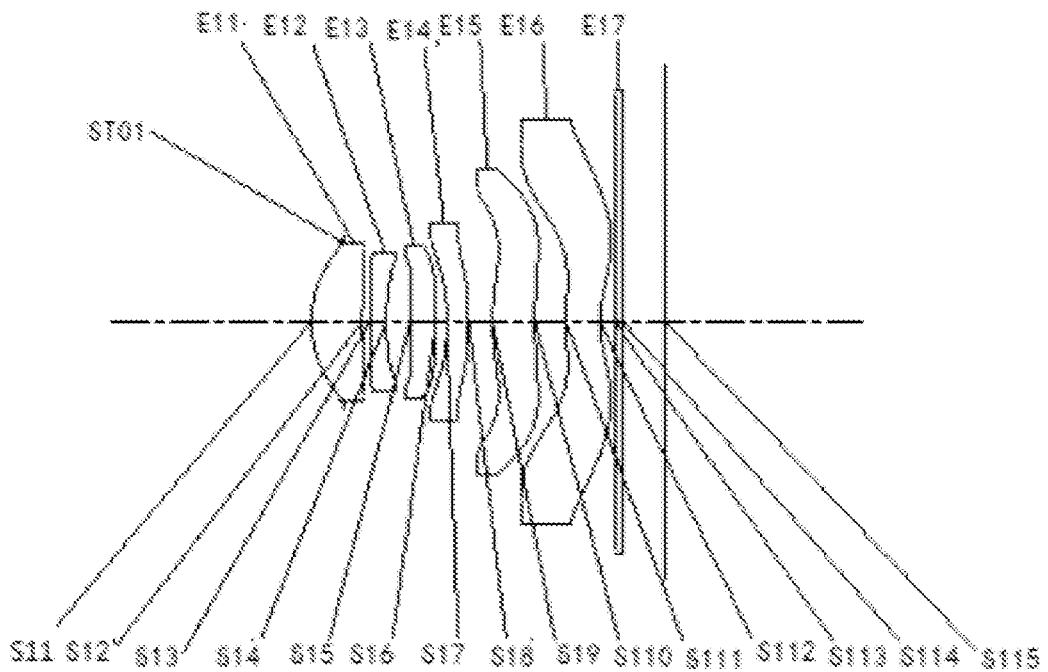
FIG. 6 is a schematic structural view of a first imaging lens according to a second embodiment of the disclosure.

As shown in FIG. 6, the first imaging lens 10 includes a diaphragm STO1 of the first imaging lens, a first lens E11 of the first imaging lens, a second lens E12 of the first imaging lens, a third lens E13 of the first imaging lens, a fourth lens E14 of the first imaging lens, a fifth lens E15 of the first imaging lens, a sixth lens E16 of the first imaging lens, a filter E17 of the first imaging lens and an image-side surface S115 of the first imaging lens in order from an object-side to the image-side along the optical axis.

The first lens E11 of the first imaging lens has a positive focal power, a first lens object-side surface S11 of the first lens of the first imaging lens is a convex surface, and a first lens image-side surface S12 of the first lens of the first imaging lens is a concave surface; a second lens E12 of the first imaging lens has a negative optical power, a second lens object-side surface S13 of the second lens of the first imaging lens is a convex surface, and a second lens image-side surface S14 of the second lens of the first imaging lens is a concave surface; a third lens E13 of the first imaging lens has a positive focal power, the third lens object-side surface S15 of the third lens of the first imaging lens is convex surface, and the third lens image-side surface S16 of the third lens of the first imaging lens is convex surface; a fourth lens E14 of the first imaging lens has a negative optical power, a fourth lens object-side surface S17 of the fourth lens of the first imaging lens is a concave surface, and a fourth lens image-side surface S18 of the fourth lens of the first imaging lens is a convex surface; a fifth lens E15 of the first imaging lens has a positive focal power, a fifth lens object-side surface S19 of the fifth lens of the first imaging lens is a convex surface, and a fifth lens image-side surface S110 of the fifth lens of the first imaging lens is a concave surface; a sixth lens E16 of the first imaging lens has a negative focal power, a sixth lens object-side surface S111 of the sixth lens of the first imaging lens is a convex surface, and a sixth lens image-side surface S112 of the sixth lens of the first imaging lens is a concave surface. The filter E17 of the first imaging lens has a filter object-side surface S113 of the first imaging lens and a filter image-side surface S114 of the first imaging lens. Light from an object sequentially passes through the respective surfaces and is finally imaged on the imaging surface S115 of the first imaging lens. Table 4 shows the surface type, a curvature radius, a thickness, material and conic coefficient of each lens of the first imaging lens in the embodiment, wherein the units of the curvature radius and the thickness are all millimeters.

TABLE 4

Detailed optical data of the first imaging lens in the embodiment

| Surface Number | Surface Type | Curvature radius | Thickness | Materials | Material | Conic Coefficient |
|---|---|---|---|---|---|---|
| OBJ | Sphere | None | 105.0000 | | | |
| ST01 | Sphere | None | −0.4744 | | | |
| S11 | Aspheric Surface | 1.6572 | 0.7657 | 1.55, 56.1 | plastic | −2.3008 |
| S12 | Aspheric Surface | 6.9810 | 0.1181 | | | 1.6816 |
| S13 | Aspheric Surface | 7.1038 | 0.2472 | 1.67, 20.4 | plastic | −47.2537 |
| S14 | Aspheric Surface | 3.4138 | 0.3632 | | | −4.8908 |
| S15 | Aspheric Surface | 12.9804 | 0.3851 | 1.55, 56.1 | plastic | 81.6701 |
| S16 | Aspheric Surface | −30.1591 | 0.1629 | | | 99.0000 |
| S17 | Aspheric Surface | −5.0641 | 0.3256 | 1.67, 20.4 | plastic | 13.9814 |
| S18 | Aspheric Surface | −16.7759 | 0.3633 | | | −35.1105 |
| S19 | Aspheric Surface | 3.0291 | 0.6350 | 1.64, 24.0 | plastic | 0.0000 |
| S110 | Aspheric Surface | 7.2497 | 0.4704 | | | 2.1719 |
| S111 | Aspheric Surface | 3.0615 | 0.5097 | 1.55, 56.1 | plastic | −0.3167 |
| S112 | Aspheric Surface | 1.4868 | 0.2307 | | | −5.5559 |
| S113 | Sphere | None | 0.1155 | 1.52, 64.2 | plastic | |
| S114 | Sphere | None | 0.6416 | | | |
| S115 | Sphere | None | | | | |

Table 5 shows higher order coefficients of the respective aspherical surfaces of the respective aspherical lenses that can be used for the first imaging lens in the embodiment.

TABLE 5 the high order coefficients of the aspherical surfaces of the first imaging lens in the present embodiment

| Surface Number | A4 | A6 | A8 | A10 | A12 |
|---|---|---|---|---|---|
| S11 | 7.5922E−02 | 5.9110E−03 | −6.3790E−02 | 2.2741E−01 | −4.4463E−01 |
| S12 | −9.6610E−02 | 8.6615E−02 | −5.2858E−02 | 2.0801E−02 | −4.1650E−02 |
| S13 | −1.5950E−01 | 2.3906E−01 | −2.8853E−01 | 9.1258E−01 | −2.3990E+00 |
| S14 | −8.8890E−02 | 2.1674E−01 | −3.0903E−01 | 1.0098E+00 | −2.2780E+00 |
| S15 | −9.5190E−02 | 3.5466E−02 | −2.6797E−01 | 2.6353E−01 | 7.7197E−01 |
| S16 | −1.1818E−01 | 3.6250E−02 | 1.7945E−01 | −1.1608E+00 | 2.5723E+00 |
| S17 | −2.1277E−01 | 1.6408E−01 | 4.6623E−01 | −1.8017E+00 | 3.1395E+00 |
| S18 | −2.5568E−01 | 1.7308E−01 | 1.5204E−01 | −5.8505E−01 | 8.7158E−01 |
| S19 | −8.9010E−02 | −2.5310E−02 | 4.7413E−02 | −5.0680E−02 | 3.4693E−02 |
| S110 | −6.7800E−03 | −2.1740E−02 | −5.3825E−03 | 1.2792E−02 | −7.8900E−03 |

TABLE 5-continued the high order coefficients of the aspherical surfaces
of the first imaging lens in the present embodiment

| | | | | | |
|---|---|---|---|---|---|
| S111 | −3.3742E−01 | 1.9049E−01 | −8.8770E−02 | 3.1305E−02 | −7.4600E−03 |
| S112 | −1.6231E−01 | 9.3393E−02 | −4.3358E−02 | 1.4023E−02 | −2.9900E−03 |

| Surface Number | A14 | A16 | A18 | A20 |
|---|---|---|---|---|
| S11 | 5.1562E−01 | −3.5577E−01 | 1.3365E−01 | −2.1580E−02 |
| S12 | 5.2897E−02 | −3.2630E−02 | 1.0187E−02 | −1.6100E−03 |
| S13 | 3.7090E+00 | −3.3005E+00 | 1.5910E+00 | −3.2235E−01 |
| S14 | 2.7218E+00 | −1.2338E−00 | −3.4508E−01 | 3.9453E−01 |
| S15 | −3.4584E+00 | 5.5847E+00 | 4.3002E+00 | 1.3274E+00 |
| S16 | −3.2040E+00 | 2.4475E+00 | −1.0939E+00 | 2.2009E−01 |
| S17 | −2.9786E+00 | 1.5461E+00 | 4.0599E−01 | 4.0585E−02 |
| S18 | −7.0276E−01 | 3.1419E−01 | −7.3640E−02 | 7.0930E−03 |
| S19 | −1.4810E−02 | 3.7950E−03 | −5.3000E−04 | 3.0300E−05 |
| S110 | 2.6910E−03 | −5.4000E−04 | 6.0000E−05 | −2.8000E−06 |
| S111 | 1.1550E−03 | −1.1000E−04 | 6.2500E−06 | −1.5000E−07 |
| S112 | 4.1200E−04 | −3.6000E−05 | 1.7800E−06 | −3.9000E−08 |

Table 6 shows an effective focal length $F_1$ of the first imaging lens in the present embodiment, an effective focal lengths $f_{11}$ to $f_{16}$ of each lens of the first imaging lens, the distance $TTTL_1$ on the optical axis from the first lens object-side surface S11 of the first imaging lens to the imaging surface S115 of the first imaging lens, and $ImgH_2$ is a half of a diagonal length of an effective pixel area on an imaging surface of the first imaging lens, an apertures number $Fno_1$ of the first imaging lens, an object distance $P_1$ of the first imaging lens, and the maximum half viewing angle Semi-FOV1 of the First Imaging Lens.

TABLE 6

Parameters of optical imaging lenses

| Embodiment Parameters | 2 |
|---|---|
| f11 (mm) | 3.79 |
| f12 (mm) | −10.14 |
| f13 (mm) | 16.67 |
| f14 (mm) | −11.02 |
| f15 (mm) | 7.69 |
| f16 (mm) | −5.98 |
| F1 (mm) | 4.31 |
| TTL1 (mm) | 5.33 |
| ImgH1 (mm) | 3.89 |
| Fno1 | 1.80 |
| P1 (mm) | 105.00 |
| Semi-FOV1(°) | 38.9 |

In the embodiment, the length of the first imaging lens 10 on the optical axis from the first lens object-side surface S11 of the first lens of the first imaging lens to the imaging surface S115 of the first imaging lens is 5.33 mm, and an effective focal length of the first imaging lens is 4.31 mm, the image height of the first imaging lens is 3.89 mm, the maximum half viewing angle of the first imaging lens is 38.9 degrees, the aperture value of the first imaging lens is 1.80, and an object distance of the first imaging lens is 105 mm. In the present embodiment, while the optical imaging lens is ensured to be miniaturized, a larger aperture is ensured, and more light entering quantities can be acquired. When the light is insufficient, the optical aberration is reduced, the image acquisition quality is improved, and a stable imaging effect is acquired. Note that the larger the aperture value is, the smaller the aperture is, and the smaller the aperture value is, the larger the aperture is.

Figure 7:
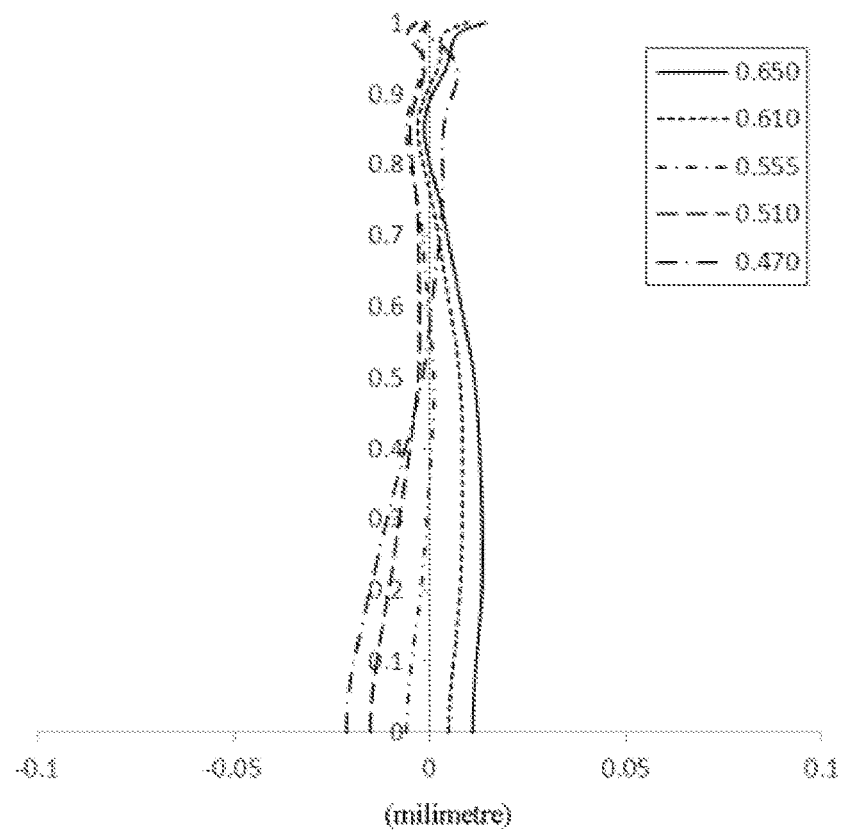
FIG. 7 shows an axial chromatic aberration curve of the first imaging lens in FIG. 6.
Figure 8:
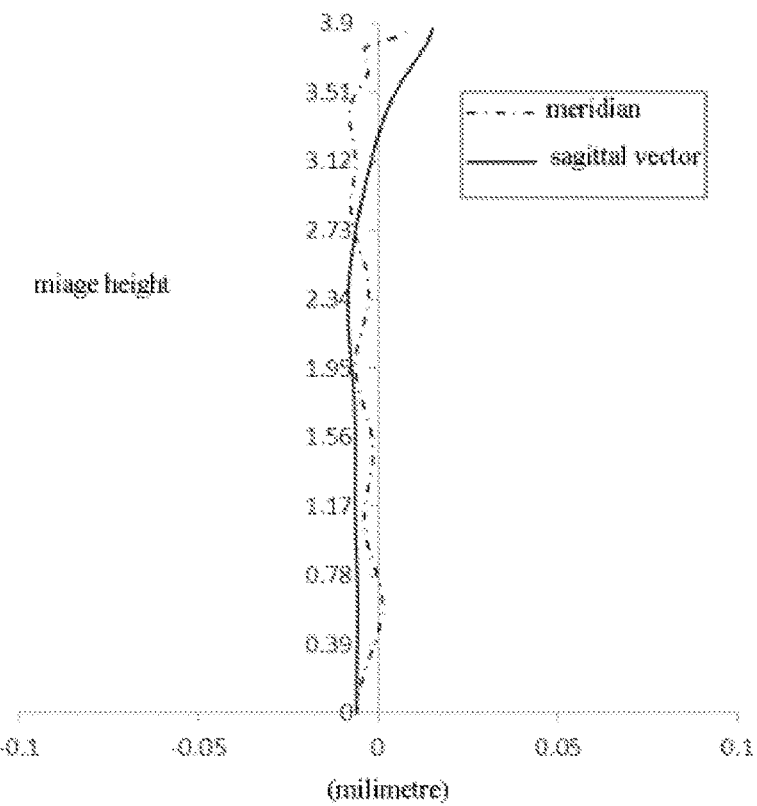
FIG. 8 shows the astigmatism curve of the first imaging lens in FIG. 6.
Figure 9:
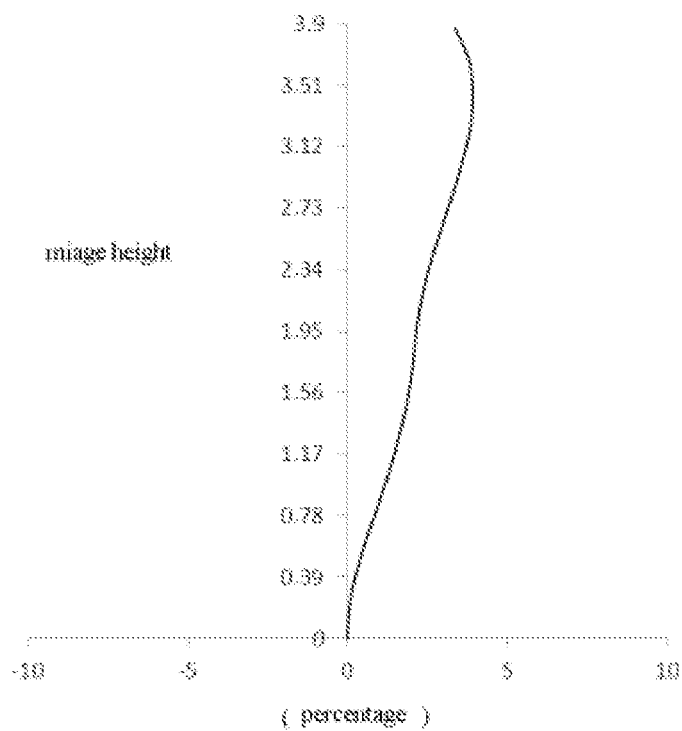
FIG. 9 shows the distortion curve of the first imaging lens in FIG. 6.
Figure 10:
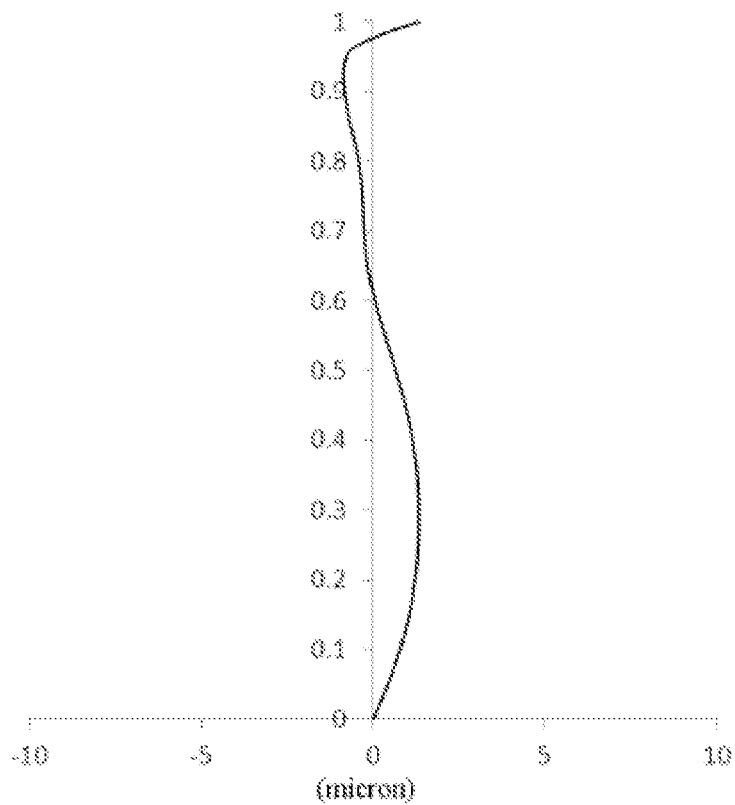
FIG. 10 shows the magnification chromatic aberration curves of the first imaging lens of FIG. 6.

FIG. 7 shows an axis chromatic aberration curve on the first imaging lens 10 in the embodiment, which indicates that focuses of light with different wavelengths are deviated after passing through an optical system, so that the focal planes of the light with different wavelengths cannot coincide at the time of the last imaging, and the polychromatic light is spread to form dispersion. FIG. 8 illustrates a stigmatic curve of the first imaging lens in the embodiment, which represents meridional image surface curvature and sagittal image surface curvature. FIG. 9 shows distortion curves of the first imaging lens in the embodiment, which represents distortion magnitude values for different viewing angles. FIG. 10 shows the magnification chromatic aberration curves of the first imaging lens in the embodiment, which represents the phase differences of the different image heights on the imaging surface after the light passes through the optical imaging lens. It can be seen from FIG. 6 to FIG. 10 that the first imaging lens 10 in the embodiment is applicable to a convenient electronic product, and has a large aperture and good imaging quality.

Embodiment 3

It should be noted that, in the embodiment, the first imaging lens 10 is defined.

Figure 11:
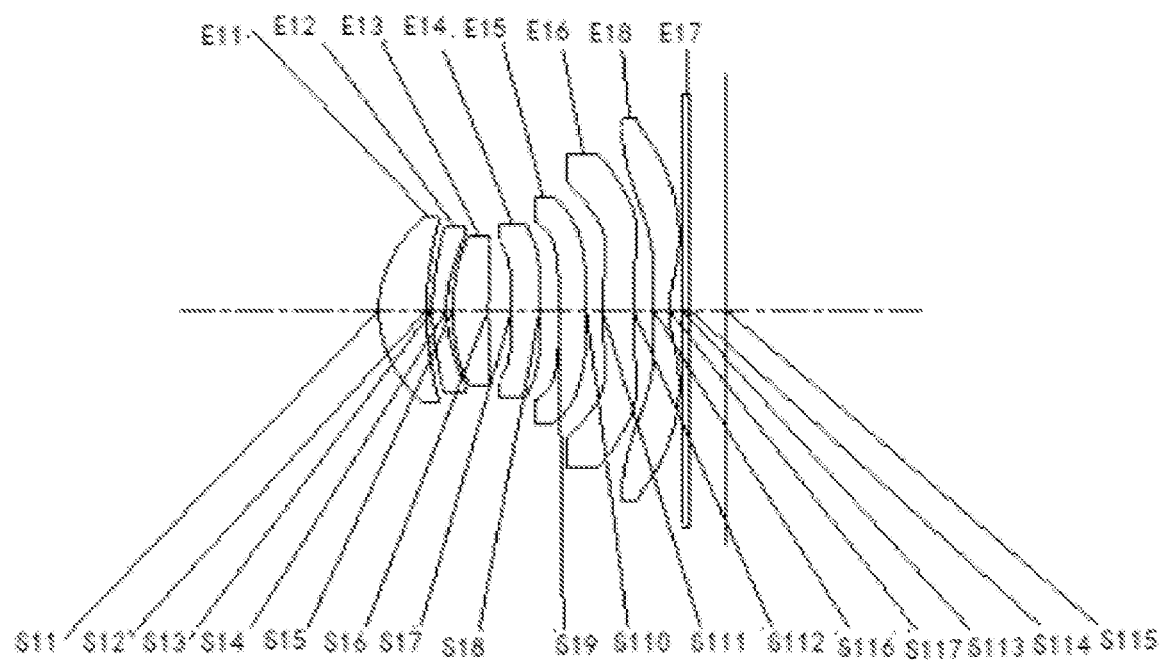
FIG. 11 is a schematic structural view of a first imaging lens according to a third embodiment of the disclosure.

As shown in FIG. 11, the first imaging lens 10 includes a first lens E11 of the first imaging lens, a second lens E12 of the first imaging lens, a third lens E13 of the first imaging lens, a fourth lens E14 of the first imaging lens, a fifth lens E15 of the first imaging lens, a sixth lens E16 of the first imaging lens, a seventh lens E18 of the first imaging lens, a filter E17 of the first imaging lens and an imaging surface S115 of the first imaging lens in order from an object-side to the image-side along the optical axis. It is to be noted that, in the present embodiment, the third lens image-side surface S16 of the third lens of the first imaging lens serves as the diaphragm STO1 of the first imaging lens.

The first lens E11 of the first imaging lens has a positive focal power, a first lens object-side surface S11 of the first lens of the first imaging lens is a convex surface, and a first lens image-side surface S12 of the first lens of the first imaging lens is a concave surface; a second lens E12 of the first imaging lens has a negative optical power, a second object-side surface S13 of the second lens of the first imaging lens is a convex surface, and a second lens image-side surface S14 of the second lens of the first imaging lens is a concave surface; a third lens E13 of the first imaging lens has a positive focal power, a third lens object-side surface S15 of the third lens of the first imaging lens is a convex surface, and a third lens image-side surface S16 of the third lens of the first imaging lens is a concave surface; a fourth lens E14 of the first imaging lens has a negative optical power, a fourth lens object-side surface S17 of the fourth lens of the first imaging lens is a concave surface, and a fourth lens image-side surface S18 of the fourth lens of the first imaging lens is a convex surface; the fifth lens E15 of the first imaging lens has a positive focal power, a fifth lens object-side surface S19 of the fifth lens of the first imaging lens is a concave surface, and a fifth lens image-side surface S110 of the fifth lens of the first imaging lens is a convex surface; the sixth lens E16 of the first imaging lens has a positive focal power, a sixth lens object-side surface S111 of the sixth lens of the first imaging lens is a convex surface, and a sixth lens image-side surface S112 of the sixth lens of the first imaging lens is a convex surface; the seventh lens E18 of the first imaging lens has a negative optical power, a seventh lens object-side surface S116 of the seventh lens of the first imaging lens is a convex surface, and a seventh lens image-side surface S117 of the seventh lens of the first imaging lens is a concave surface; the filter E17 of the first imaging lens has a filter object-side surface S113 of the first imaging lens and a filter image-side surface S114 of the first imaging lens. Light from an object sequentially passes through the respective surfaces and is finally imaged on the imaging surface S115 of the first imaging lens. Table 7 shows the surface type, a curvature radius, thickness, material and the conical coefficient of each lens of the first imaging lens in the embodiment, in which the units of a curvature radius and the thickness are all millimeters.

TABLE 7

Detailed optical data of the first imaging lens in the embodiment

| Surface Number | Surface Type | Curvature radius | Thickness | Materials | Material | Conic Coefficient |
|---|---|---|---|---|---|---|
| OBJ | Sphere | None | 58.8000 | | | |
| S11 | Aspheric Surface | 1.7274 | 0.7221 | 1.55, 56.1 | Plastic | −0.2584 |
| S12 | Aspheric Surface | 4.7592 | 0.0811 | | | −0.8037 |
| S13 | Aspheric Surface | 2.7861 | 0.2156 | 1.67, 20.4 | Plastic | −18.6301 |
| S14 | Aspheric Surface | 1.7505 | 0.0945 | | | −4.4023 |
| S15 | Aspheric Surface | 2.5849 | 0.5398 | 1.55, 56.1 | Plastic | −0.4658 |
| S16(ST0) | Aspheric Surface | 12.6138 | 0.3583 | | | 0.0000 |
| S17 | Aspheric Surface | −17.0146 | 0.4267 | 1.67, 20.4 | Plastic | 97.3264 |
| S18 | Aspheric Surface | −3185.9400 | 0.2831 | | | 99.0000 |
| S19 | Aspheric Surface | −20.9991 | 0.4210 | 1.66, 21.5 | Plastic | 99.0000 |
| S110 | Aspheric Surface | −13.9313 | 0.2374 | | | 49.5587 |
| S111 | Aspheric Surface | 4.5013 | 0.4684 | 1.55, 56.1 | Plastic | −0.1782 |
| S112 | Aspheric Surface | −869.7100 | 0.3134 | | | 99.0000 |
| S116 | Aspheric Surface | 5.0191 | 0.2373 | 1.55, 56.1 | Plastic | −0.4644 |
| S117 | Aspheric Surface | 1.3821 | 0.2032 | | | −7.2797 |
| S113 | Sphere | None | 0.1078 | 1.52, 64.2 | Glass | |
| S114 | Sphere | None | 0.5429 | | | |
| S115 | Sphere | None | | | | |

Table 8 shows higher order coefficients of the respective aspherical surfaces of the respective aspherical lenses that can be used for the first imaging lens in the embodiment.

TABLE 8 the high order coefficients of the aspherical surfaces of first imaging lens in the embodiment

| Surface Number | A4 | A6 | A8 | A10 | A12 |
|---|---|---|---|---|---|
| S11 | 6.0140E−03 | 8.6398E−04 | −1.0120E−02 | 3.2354E−02 | −5.1790E−02 |
| S12 | 1.3440E−03 | 1.6632E−02 | −6.5720E−02 | 8.0595E−02 | −3.9920E−02 |
| S13 | 1.4640E−02 | −8.3191E−03 | −9.8080E−02 | 2.5346E−01 | −3.2867E−01 |
| S14 | −2.4890E−02 | 8.7649E−02 | −2.5107E−01 | 4.0797E−01 | −3.3694E−01 |
| S15 | −1.9540E−02 | 1.3046E−02 | 5.8465E−02 | −3.9818E−01 | 1.0036E+00 |
| S16 | −5.3000E−04 | −1.0060E−01 | 3.2948E−01 | −6.0082E−01 | 5.2905E−01 |

TABLE 8-continued the high order coefficients of the aspherical surfaces
of first imaging lens in the embodiment

| | | | | |
|---|---|---|---|---|
| S17 | −7.1040E−02 | −8.2782E−02 | 1.6722E−01 | −1.8633E−01 | −2.6216E−01 |
| S18 | −5.6890E−02 | −2.2348E−02 | −1.2600E−02 | 5.8332E−02 | −1.0669E−01 |
| S19 | −1.4920E−02 | −4.8469E−02 | 1.4602E−01 | −3.9592E−01 | 6.0401E−01 |
| S110 | −3.6130E−02 | −7.3929E−03 | −3.2000E−03 | 4.9333E−02 | −7.7870E−02 |
| S111 | 2.4373E−02 | −1.3636E−01 | 5.5555E−02 | 2.3777E−02 | −4.1170E−02 |
| S112 | 1.9724E−01 | −2.5974E−01 | 1.7125E−01 | −7.5080E−02 | 2.2189E−01 |
| S116 | −2.3447E−01 | 1.5384E−01 | −6.4510E−02 | 1.7630E−02 | −3.1000E−03 |
| S117 | −1.4993E−01 | 9.3089E−02 | −4.3160E−02 | 1.4316E−02 | −3.2400E−03 |

| Surface Number | A14 | A16 | A18 | A20 |
|---|---|---|---|---|
| S11 | 4.6076E−02 | −2.3330E−02 | 6.1290E−03 | −6.4000E−04 |
| S12 | −1.3460E−02 | 2.7181E−02 | −1.2340E−02 | 1.9360E−03 |
| S13 | 2.5731E−01 | −1.1945E−01 | 3.0605E−02 | −3.4300E−03 |
| S14 | 4.1220E−02 | 1.6168E−01 | −1.1721E−01 | 2.4781E−02 |
| S15 | −1.3908E+00 | 1.1115E+00 | −4.7125E−01 | 8.1858E−02 |
| S16 | −4.5090E−02 | −3.1704E−01 | 2.5033E−01 | −6.1480E−02 |
| S17 | 1.0369E+00 | −1.2947E+00 | 7.5447E−01 | −1.7366E−01 |
| S18 | 1.1411E−01 | −6.6300E−02 | 1.9297E−02 | −2.0700E−03 |
| S19 | −5.7412E−01 | 3.3227E−01 | −1.0612E−01 | 1.4203E−02 |
| S110 | 5.6487E−02 | −2.1610E−02 | 4.2140E−03 | −3.3000E−04 |
| S111 | 2.2827E−02 | −6.5400E−03 | 9.6000E−04 | −5.7000E−05 |
| S112 | −4.3400E−03 | 5.4200E−04 | −3.9000E−05 | 1.2900E−06 |
| S116 | 3.4600E−04 | −2.4000E−05 | 8.8300E−07 | −1.4000E−08 |
| S117 | 4.8300E−04 | −4.5000E−05 | 2.3700E−06 | −5.4000E−08 |

Table 9 gives an effective focal length $F_1$ of the first imaging lens in the embodiment, an effective focal lengths $f_{11}$ to $f_{17}$ of each lens of the first imaging lens, the distance $TTL_1$ on the optical axis from the first lens object-side surface S11 of the first imaging lens to the imaging surface S115 of the first imaging lens, and $ImgH_2$ is a half of a diagonal length of an effective pixel area on an imaging surface of the first imaging lens, the apertures number $Fno_1$ of the first imaging lens, an object distance $P_1$ of the first imaging lens, and the maximum half viewing angle Semi-FOV1 of the first imaging lens. It should be noted that $f_{17}$ is an effective focal length of the seventh lens E18 of the first imaging lens.

TABLE 9

Parameters of optical imaging lenses

| Embodiment Parameters | 3 |
|---|---|
| f11 (mm) | 4.58 |
| f12 (mm) | −7.70 |
| f13 (mm) | 5.84 |
| f14 (mm) | −25.63 |
| f15 (mm) | 61.45 |
| f16 (mm) | 8.20 |
| f17 (mm) | −3.57 |
| F1 (mm) | 4.05 |
| TTL1 (mm) | 5.25 |
| ImgH1 (mm) | 3.58 |
| Fno1 | 1.48 |
| P1 (mm) | 58.80 |
| Semi-FOV1(°) | 36.8 |

In the embodiment, the length of the first imaging lens 10 on the optical axis from the first lens object-side surface S11 of the first lens of the first imaging lens to the imaging surface S115 of the first imaging lens is 5.25 mm, and an effective focal length of the first imaging lens is 4.05 mm, the image height of the first imaging lens is 3.58 mm, the maximum half viewing angle of the first imaging lens is 36.8 degrees, the aperture value of the first imaging lens is 1.48, and an object distance of the first imaging lens is 58.8 mm. In the present embodiment, while the optical imaging lens is ensured to be miniaturized, a larger aperture is ensured, and more light entering quantities can be acquired. When the light is insufficient, the optical aberration is reduced, the image acquisition quality is improved, and a stable imaging effect is acquired. Note that the larger the aperture value is, the smaller the aperture is, and the smaller the aperture value is, the larger the aperture is.

Figure 12:
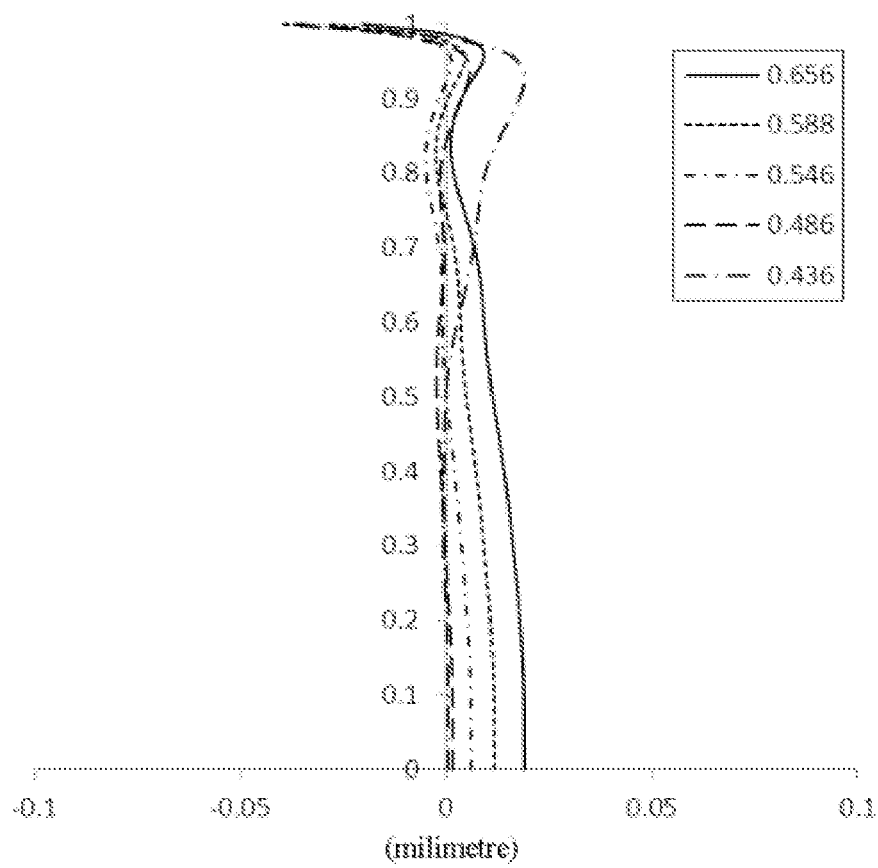
FIG. 12 shows an axis chromatic aberration curve of the first imaging lens of FIG. 11.
Figure 13:
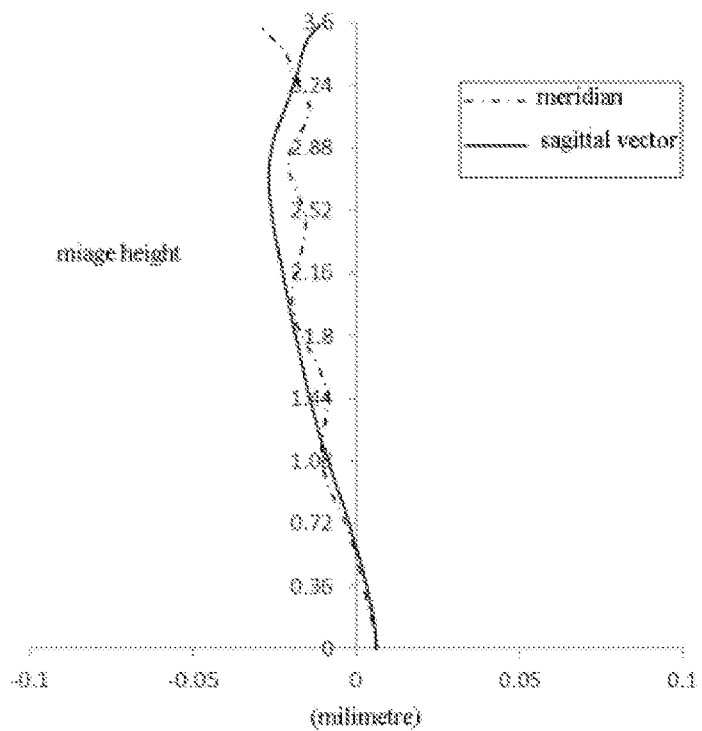
FIG. 13 shows the astigmatism curve of the first imaging lens of FIG. 11.
Figure 14:
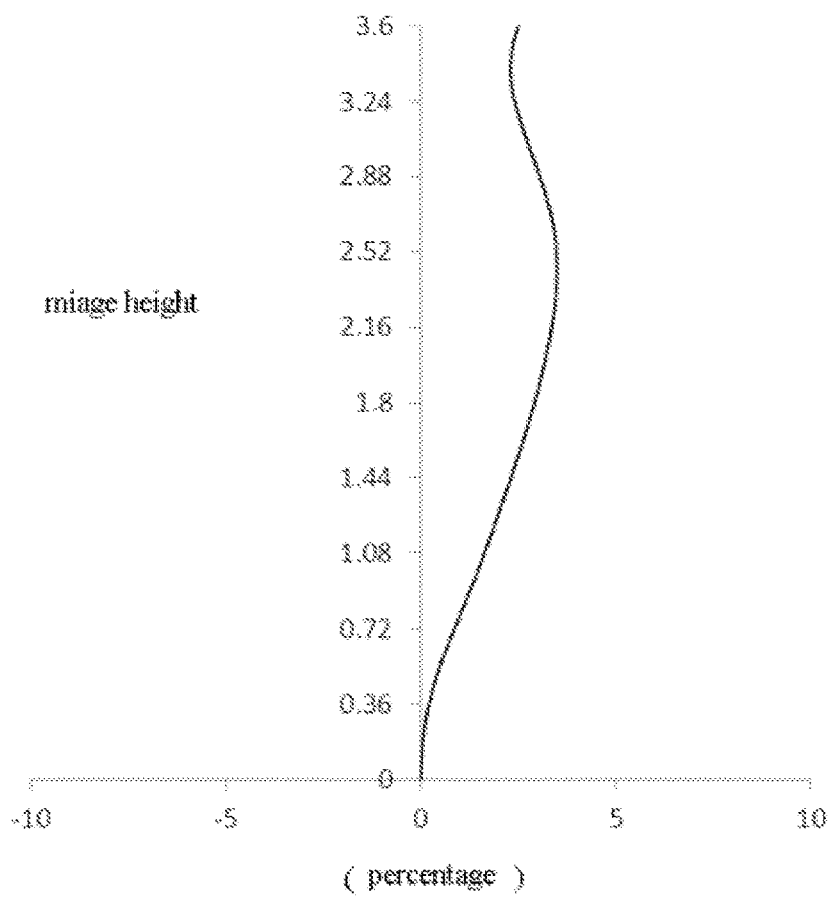
FIG. 14 shows distortion curves of the first imaging lens of FIG. 11.
Figure 15:
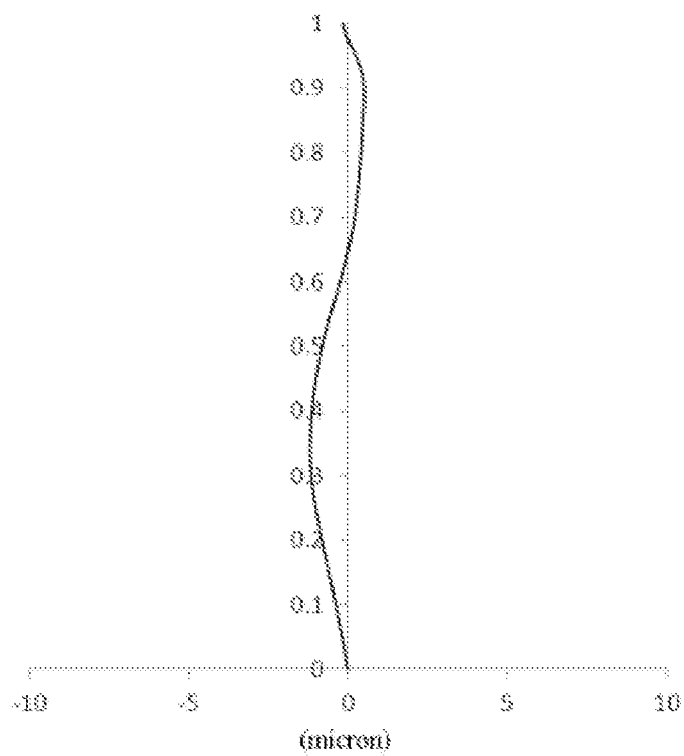
FIG. 15 shows the magnification chromatic aberration curves of the first imaging lens of FIG. 11.

FIG. 12 shows an axis chromatic aberration curve on the first imaging lens 10 in the present embodiment, which indicates that focuses of light with different wavelengths are deviated after passing through an optical system, so that the focal planes of the light with different wavelengths cannot coincide at the time of the last imaging, and the polychromatic light is spread to form dispersion. FIG. 13 illustrates a stigmatic curve of the first imaging lens in the embodiment, which represents meridional image surface curvature and sagittal image surface curvature. FIG. 14 shows distortion curves of the first imaging lens in the embodiment, which represents distortion magnitude values for different viewing angles. FIG. 15 shows the magnification chromatic aberration curves of the first imaging lens in the embodiment, which represents the phase differences for different image heights on the imaging surface after light passes through the optical imaging lens. It can be seen from FIG. 12 to FIG. 15 that the first imaging lens 10 in the embodiment is applicable to a convenient electronic product, and has a large aperture and good imaging quality.

Embodiment 4

It should be noted that the second imaging lens 20 is defined in the present embodiment.

Figure 16:
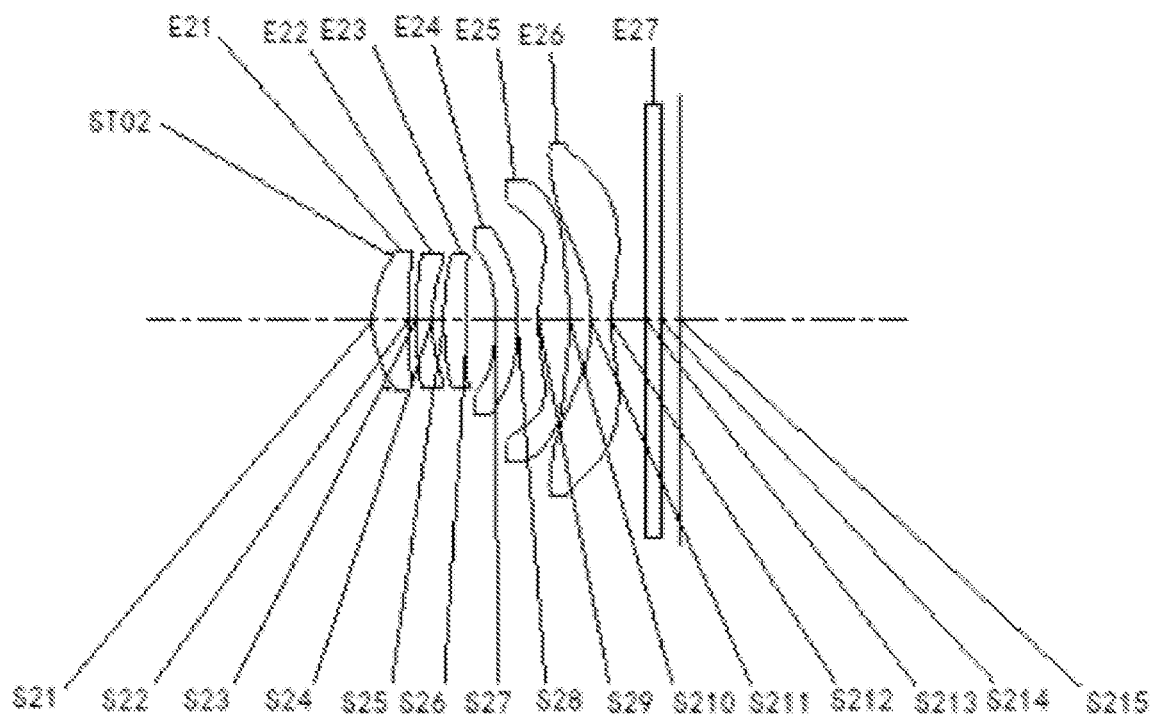
FIG. 16 is a schematic structural view of a second imaging lens according to a fourth embodiment of the disclosure.

As shown in FIG. 16, the second imaging lens 20 includes a diaphragm STO2 of the second imaging lens, a first lens E21 of the second imaging lens, a second lens E22 of the second imaging lens, a third lens E23 of the second imaging lens, a fourth lens E24 of the second imaging lens, a fifth lens E25 of the second imaging lens, a sixth lens E26 of the second imaging lens, a filter E27 of the second imaging lens and an imaging surface S215 of the second imaging lens in order from an object-side to the image-side along the optical axis.

The first lens E21 of the second imaging lens has a positive focal power, a first lens object-side surface S21 of the first lens of the second imaging lens is a convex surface, and a first lens image-side surface S22 of the first lens of the second imaging lens is a concave surface; a second lens E22 of the second imaging lens has a negative focal power, a second lens object-side surface S23 of the second lens of the second imaging lens is a convex surface, and a second lens image-side surface S24 of the second lens of the second imaging lens is a concave surface; the third lens E23 of the second imaging lens has a positive focal power, the third lens object-side surface S25 of the third lens of the second imaging lens is a convex surface, and the third lens image-side surface S26 of the third lens of the second imaging lens is a concave surface; the fourth lens E24 of the second imaging lens has a negative focal power, the fourth lens object-side surface S27 of the fourth lens of the second imaging lens is a concave surface, and the fourth lens image-side surface S28 of the fourth lens of the second imaging lens is a convex surface; a fifth lens E25 of the second imaging lens has a positive focal power, a fifth lens object-side surface S29 of the fifth lens of the second imaging lens is a convex surface, and a fifth lens image-side surface S210 of the fifth lens of the second imaging lens is a convex surface; a sixth lens E26 of the second imaging lens has a negative focal power, a sixth lens object-side surface S211 of the sixth lens of the second imaging lens is a concave surface, and a sixth lens image-side surface S212 of the sixth lens of the second imaging lens is a concave surface. The filter E27 of the second imaging lens has a filter object-side surface S213 of the second imaging lens and a filter image-side surface S214 of the second imaging lens. Light from an object sequentially passes through the respective surfaces and is finally imaged on an imaging surface S215 of the second imaging lens. Table 10 shows the surface type, a curvature radius, a thickness, material and conic coefficient of each lens of the second imaging lens in the embodiment, wherein the units of the curvature radius and the thickness are all millimeters.

TABLE 10

Detailed optical data of second imaging lens in the embodiment

| Surface Number | Surface Type | Curvature radius | Thickness | Materials | Material | Conic Coefficient |
| --- | --- | --- | --- | --- | --- | --- |
| OBJ | sphere | None | 1000.0000 | | | |
| ST02 | sphere | None | −0.1973 | | | |
| S21 | aspheric surface | 1.4868 | 0.4648 | 1.55, 56.1 | plastic | −1.0909 |
| S22 | aspheric surface | 5.9829 | 0.1029 | | | −73.4794 |
| S23 | aspheric surface | 3.0757 | 0.2185 | 1.66, 21.5 | plastic | 0.0000 |
| S24 | aspheric surface | 1.7002 | 0.1543 | | | −0.3666 |
| S25 | aspheric surface | 3.0822 | 0.3141 | 1.55, 56.1 | plastic | −7.9316 |
| S26 | aspheric surface | 41.2161 | 0.3668 | | | −99.9900 |
| S27 | aspheric surface | −4.5335 | 0.2824 | 1.66, 21.5 | plastic | −99.9900 |
| S28 | aspheric surface | −31.9368 | 0.2886 | | | 0.0000 |
| S29 | aspheric surface | 2.6381 | 0.4172 | 1.55, 56.1 | plastic | −0.0181 |
| S210 | aspheric surface | −2.2768 | 0.2748 | | | −20.9515 |
| S211 | aspheric surface | −3.5799 | 0.2694 | 1.54, 55.7 | plastic | −5.6518 |
| S212 | aspheric surface | 1.5115 | 0.4725 | | | −13.0858 |
| S213 | sphere | None | 0.1995 | 1.52, 64.2 | glass | |
| S214 | sphere | None | 0.2375 | | | |
| S215 | sphere | None | | | | |

Table 12 shows higher order coefficients of the respective aspherical surfaces of the respective aspherical lenses that can be used for the second imaging lens in the embodiment.

TABLE 11 the high order coefficients of the aspherical surfaces of second imaging lens in the embodiment

| Surface Number | A4 | A6 | A8 | A10 | A12 | A14 |
| --- | --- | --- | --- | --- | --- | --- |
| S21 | 2.7720E−02 | 3.7457E−02 | −8.1150E−02 | 6.7547E−02 | 5.8721E−02 | −9.3900E−02 |
| S22 | −8.0540E−02 | 3.3312E−01 | −5.0322E−01 | 4.8797E−01 | −3.1062E−01 | 0.0000E+00 |
| S23 | −3.3067E−01 | 8.6489E−01 | −1.2527E+00 | 1.1610E+00 | −6.6182E−01 | 0.0000E+00 |

TABLE 11-continued the high order coefficients of the aspherical surfaces of second imaging lens in the embodiment

| Surface Number | A4 | A6 | A8 | A10 | A12 | A14 |
|---|---|---|---|---|---|---|
| S24 | −3.4912E−01 | 8.3518E−01 | −1.4680E+00 | 1.7863E+00 | −1.0559E+00 | 0.0000E+00 |
| S25 | −8.6970E−02 | 6.5614E−02 | 2.5149E−01 | −1.4813E+00 | 2.9719E+00 | −1.7162E+00 |
| S26 | −1.8250E−02 | −8.6060E−02 | 3.8853E−01 | −9.1571E−01 | 8.6067E−01 | 0.0000E+00 |
| S27 | −3.8621E−01 | 3.7411E−01 | −2.4549E−01 | −3.3328E−01 | 4.6168E−02 | 0.0000E+00 |
| S28 | −3.1029E−01 | 1.7829E−01 | 1.3384E−02 | −1.0567E−01 | 8.1164E−02 | −2.1063E−02 |
| S29 | −1.5940E−01 | 4.7359E−02 | 5.9400E−04 | −1.2359E−02 | 3.4350E−03 | 0.0000E+00 |
| S210 | 2.0223E−01 | −5.3640E−02 | 6.5200E−03 | 4.5276E−04 | 6.5000E−04 | −1.6550E−04 |
| S211 | 4.3749E−02 | 1.0070E−03 | −1.5900E−03 | −1.4130E−04 | 3.4600E−05 | −5.4696E−07 |
| S212 | 5.1409E−02 | −3.9000E−03 | 1.6300E−04 | −3.8730E−05 | 6.7900E−06 | 5.4017E−07 |

Table 12 gives an effective focal length $F_2$ of the second imaging lens in the present embodiment, an effective focal lengths $f_{21}$, to $f_{26}$ of each lens of the second imaging lens, the distance $TTL_2$ on the optical axis from the first lens object-side surface S21 of the second imaging lens to the imaging surface S215 of the second imaging lens, and $ImgH_2$ is a half of a diagonal length of an effective pixel area on an imaging surface of the second imaging lens, an apertures number $Fno_2$ of the second imaging lens, an object distance $P_2$ of the second imaging lens, and the maximum half viewing angle Semi-FOV2 of the second imaging lens.

TABLE 12

Parameters of second imaging lens

| Embodiment Parameters | 4 |
|---|---|
| f21 (mm) | 3.50 |
| f22 (mm) | −6.18 |
| f23 (mm) | 6.08 |
| f24 (mm) | −8.08 |
| f25 (mm) | 2.31 |
| f26 (mm) | −1.94 |
| F2 (mm) | 3.48 |
| TTL2 (mm) | 4.06 |
| ImgH2 (mm) | 2.99 |
| Fno2 | 1.98 |
| P2 (mm) | 1000.00 |
| Semi-FOV2(°) | 40.4 |

In the embodiment, the length of the second imaging lens 20 on the optical axis from the first lens object-side surface S21 of the first lens of the second imaging lens to the imaging surface S215 of the second imaging lens is 4.06 mm, and an effective focal length of the second imaging lens is 3.48 mm, the image height of the second imaging lens is 2.99 mm, the maximum half viewing angle of the second imaging lens is 40.4 degrees, the aperture value of the second imaging lens is 1.98, and an object distance of the second imaging lens is 1000 mm. In the present embodiment, while the optical imaging lens is ensured to be miniaturized, a larger aperture is ensured, and more light entering quantities can be acquired. When the light is insufficient, the optical aberration is reduced, the image acquisition quality is improved, and a stable imaging effect is acquired. Note that the larger the aperture value is, the smaller the aperture is, and the smaller the aperture value is, the larger the aperture is.

In the embodiment, $P_2$=1000 mm an object distance of the second imaging lens is between 500 mm and 1500 mm, and the weights of the first imaging lens 10 and the third imaging lens can be increased and reduced in real time according to the depth of field measured by the second imaging lens 20 in real time, effectively improving the imaging efficiency and the frame number of the imaging lenses, and increasing the imaging clarity.

$F_2/(f_{21}+f_{25}<f_{26})=F_2/(f_{21}+f_{25}+f_{26})$ belongs to the range of 0.7 to 1.0, which can avoid excessive focusing of optical power can well improve the aberration correction capability of the imaging system of the second imaging lens, effectively reduce the size of the second imaging lens, and realize lightening and thinning.

$(R_{23}+R_{24})/(R_{21}+R_{22})=0.64$, $(R_{23}+R_{24})/(R_{21}+R_{22})$ between 0.4 to 0.8, so that the second imaging lens 20 can better achieve the deflection of the optical path, and balance the advanced spherical aberration generated by the second imaging lens 20.

$TTL_2/ImgH_2=1.36$, $TTL_2/ImgH_2$ between 0 and 1.65, so that under the condition that the optical system of the second imaging lens has a relatively short length, it can be ensured that the optical system of the second imaging lens has a sufficiently large image surface, so as to present more detailed information about an object to be shot, thereby making the imaging more clear.

Figure 17:
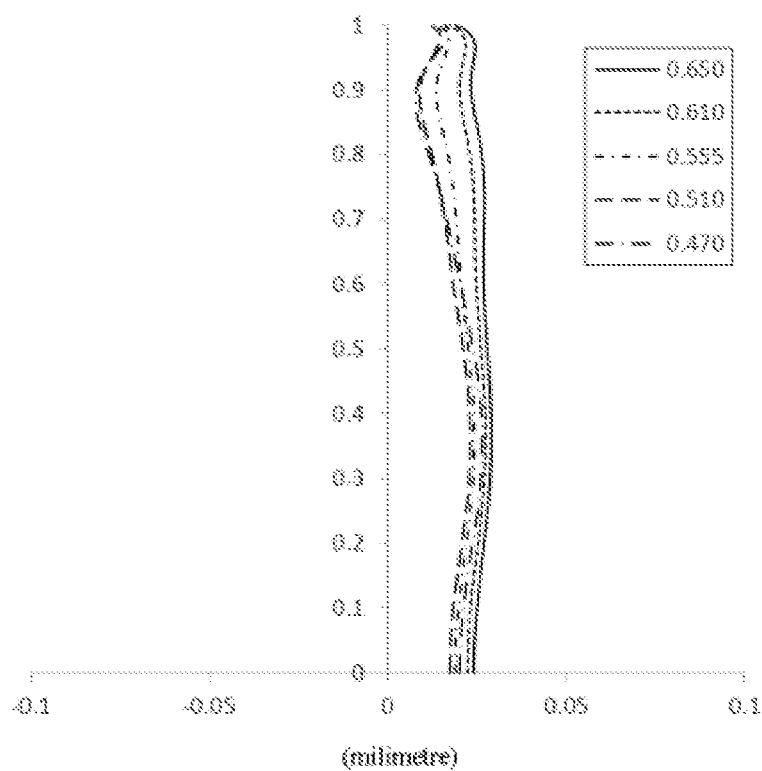
FIG. 17 shows an axis chromatic aberration curve of the second imaging lens of FIG. 16.
Figure 18:
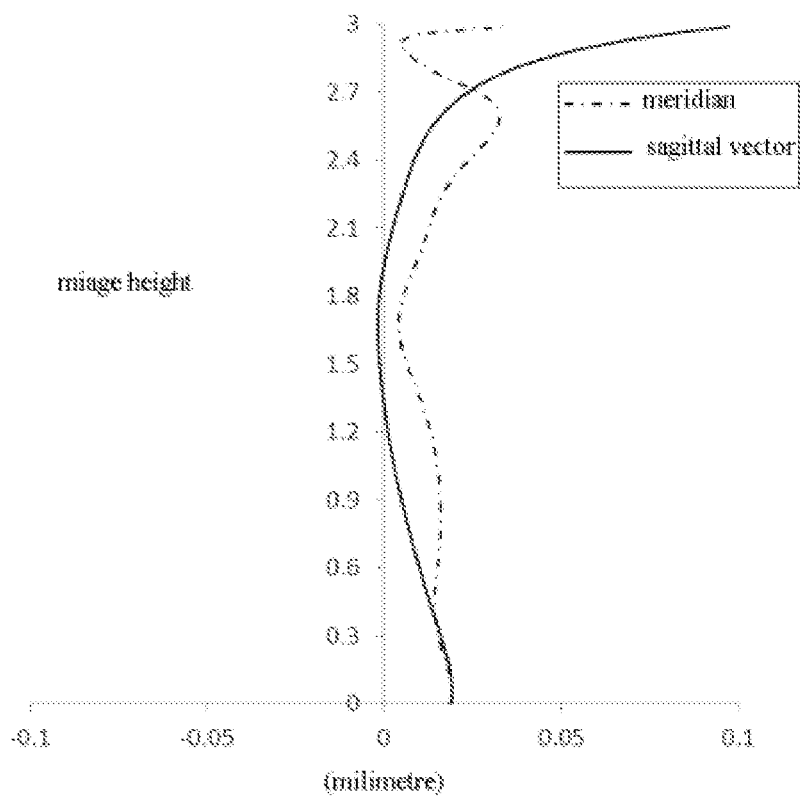
FIG. 18 shows the astigmatism curve of the second imaging lens in FIG. 16.
Figure 19:
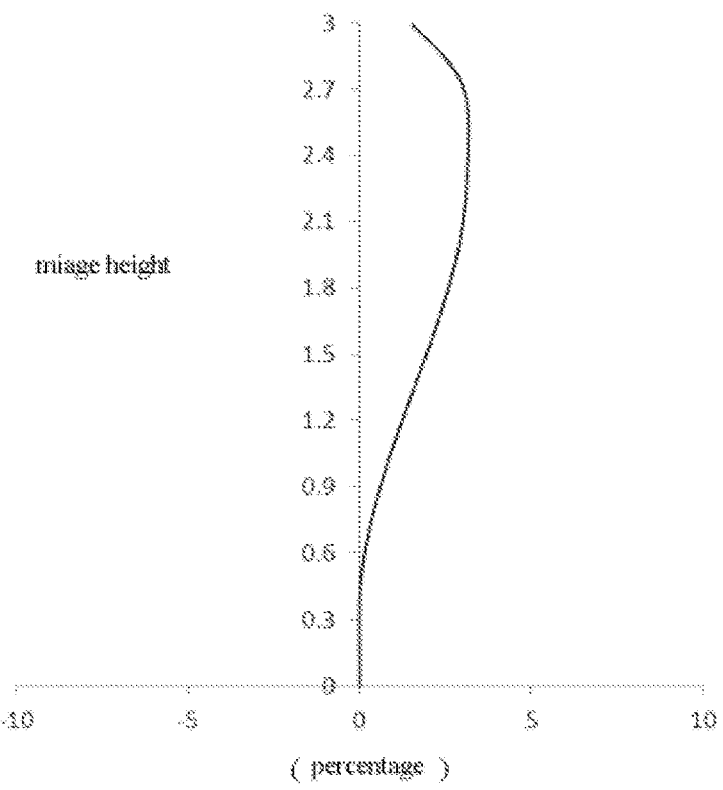
FIG. 19 shows the distortion curve of the second imaging lens in FIG. 16.
Figure 20:
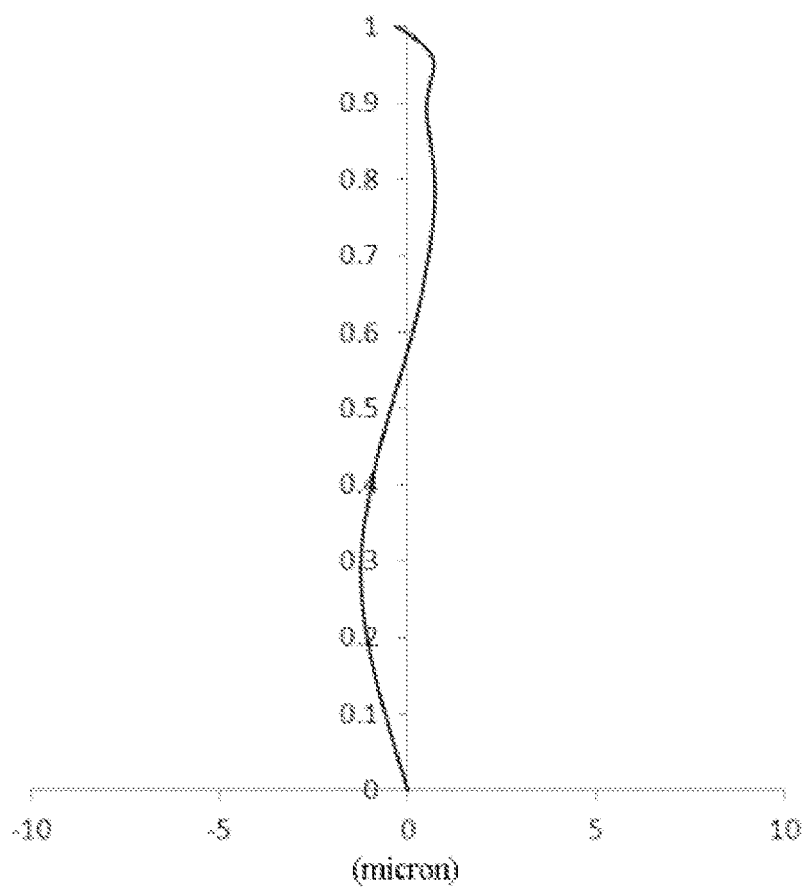
FIG. 20 shows the magnification chromatic aberration curves of the second imaging lens of FIG. 16.

FIG. 17 shows an axis chromatic aberration curve on the second imaging lens 20 in the present embodiment, which indicates that focusing points of light with different wavelengths after passing through an optical system are deviated, so that focal planes of the light with different wavelengths cannot coincide at the time of the last imaging, and the color light is spread to form dispersion. FIG. 18 shows a stigmatic curve of the second imaging lens in the embodiment, which represents meridional image surface curvature and sagittal image surface curvature. FIG. 19 shows distortion curves of the second imaging lens in the embodiment, which represents distortion magnitude values for different viewing angles. FIG. 20 shows the magnification chromatic aberration curves of the second imaging lens in the embodiment, which represents the phase differences for different image heights on the imaging surface after light passes through the optical imaging lens. It can be seen from FIG. 17 to FIG. 20 that the second imaging lens 20 in the embodiment is applicable to a convenient electronic product, and has a large aperture and good imaging quality.

Embodiment 5

It should be noted that the second imaging lens 20 is defined in the present embodiment.

Figure 21:
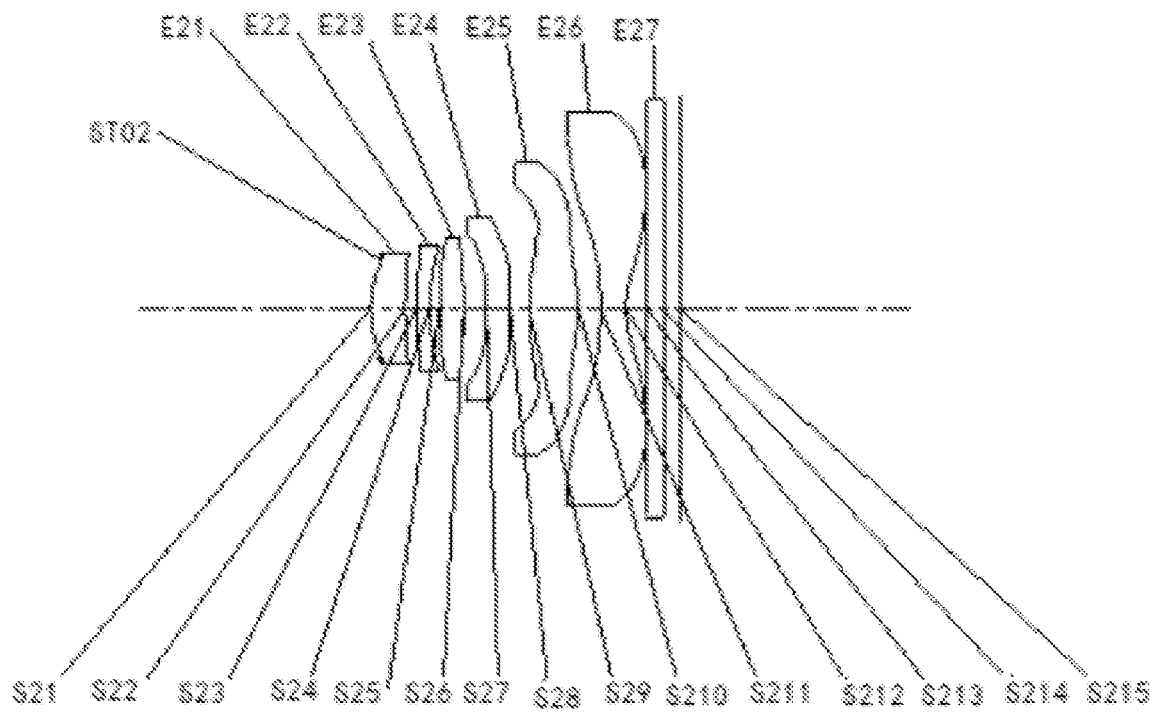
FIG. 21 is a schematic structural view of the second imaging lens according to the fifth embodiment of the disclosure.

As shown in FIG. 21, the second imaging lens 20 includes a diaphragm ST02 of the second imaging lens, a first lens E21 of the second imaging lens, a second lens E22 of the second imaging lens, a third lens E23 of the second imaging lens, a fourth lens E24 of the second imaging lens, a fifth lens E25 of the second imaging lens, a sixth lens E26 of the second imaging lens, a filter E27 of the second imaging lens and an imaging surface S215 of the second imaging lens in order from an object-side to the image-side along the optical axis.

The first lens E21 of the second imaging lens has a positive focal power, a first lens object-side surface S21 of the first lens of the second imaging lens is a convex surface, and a first lens image-side surface S22 of the first lens of the second imaging lens is a concave surface; a second lens E22 of the second imaging lens has a negative focal power, a second lens object-side surface S23 of the second lens of the second imaging lens is a convex surface, and a second lens image-side surface S24 of the second lens of the second imaging lens is a concave surface; the third lens E23 of the second imaging lens has a positive focal power, the third lens object-side surface S25 of the third lens of the second imaging lens is a convex surface, and the third lens image-side surface S26 of the third lens of the second imaging lens is a convex surface; a fourth lens E24 of the second imaging lens has a negative focal power, a fourth lens object-side surface S27 of the fourth lens of the second imaging lens is a concave surface, and a fourth lens image-side surface S28 of the fourth lens of the second imaging lens is a concave surface; a fifth lens E25 of the second imaging lens has a positive focal power, a fifth lens object-side surface S29 of the fifth lens of the second imaging lens is a convex surface, and a fifth lens image-side surface S210 of the fifth lens of the second imaging lens is a convex surface; a sixth lens E26 of the second imaging lens has a negative focal power, a sixth lens object-side surface S211 of the sixth lens of the second imaging lens is a convex surface, and a sixth lens image-side surface S212 of the sixth lens of the second imaging lens is a concave surface. The filter E27 of the second imaging lens has a filter object-side surface S213 of the second imaging lens and a filter image-side surface S214 of the second imaging lens. Light from an object sequentially passes through the respective surfaces and is finally imaged on an imaging surface S215 of the second imaging lens. Table 13 shows the surface type, a curvature radius, a thickness, material and conic coefficient of each lens of the second imaging lens in the embodiment, in which the units of the curvature radius and the thickness are all millimeters.

TABLE 13

Detailed optical data of second imaging lens in the embodiment

| Surface Number | Surface Type | Curvature radius | Thickness | Materials | Material | Conic Coefficient |
|---|---|---|---|---|---|---|
| OBJ | Sphere | None | 800.0000 | | | |
| ST0 | Sphere | None | −0.1250 | | | |
| S21 | Aspheric Surface | 1.4968 | 0.4444 | 1.55, 56.1 | Plastic | −0.7624 |
| S22 | Aspheric Surface | 5.9965 | 0.1497 | | | −17.6728 |
| S23 | Aspheric Surface | 3.6065 | 0.1640 | 1.66, 21.5 | Plastic | −12.0444 |
| S24 | Aspheric Surface | 1.9595 | 0.1333 | | | −0.8031 |
| S25 | Aspheric Surface | 5.3974 | 0.3150 | 1.55, 56.1 | Plastic | 6.2828 |
| S26 | Aspheric Surface | −9.4148 | 0.2909 | | | 37.1568 |
| S27 | Aspheric Surface | −7.5026 | 0.3104 | 1.66, 21.5 | Plastic | −200.0000 |
| S28 | Aspheric Surface | 14.6687 | 0.2482 | | | −200.0000 |
| S29 | Aspheric Surface | 2.8878 | 0.6397 | 1.55, 56.1 | Plastic | 0.3322 |
| S210 | Aspheric Surface | −1.9131 | 0.2861 | | | −10.3261 |
| S211 | Aspheric Surface | 17.0129 | 0.3337 | 1.54, 55.7 | Plastic | −200.0000 |
| S212 | Aspheric Surface | 0.9663 | 0.2700 | | | −5.5109 |
| S213 | Sphere | None | 0.2205 | 1.52, 64.2 | Glass | |
| S214 | Sphere | None | 0.2205 | | | |
| S215 | Sphere | None | | | | |

Table 14 shows higher order coefficients of the respective aspherical surfaces of the respective aspherical lenses that can be used for the second imaging lens in the embodiment.

TABLE 14 the high order coefficients of the aspherical surfaces of second imaging lens in the embodiment

| Surface Number | A4 | A6 | A8 | A10 | A12 | □A14 | □A16 |
|---|---|---|---|---|---|---|---|
| S21 | 3.1727E−02 | 8.8552E−03 | 6.7254E−02 | −1.6713E−01 | 2.2517E−01 | −1.1671E−01 | −7.4738E−11 |
| S22 | −4.9990E−02 | 1.9041E−01 | −3.4751E−01 | 3.8439E−01 | −2.1418E−01 | −1.9140E−02 | 1.0449E−10 |
| S23 | −2.5696E−01 | 5.1748E−01 | −7.3433E−01 | 5.6756E−01 | −2.9813E−01 | −2.6000E−10 | −2.1722E−10 |
| S24 | −2.6881E−01 | 6.0610E−01 | −9.5714E−01 | 9.2736E−01 | −4.7306E−01 | −7.4000E−04 | 1.9573E−10 |

TABLE 14-continued the high order coefficients of the aspherical surfaces of second imaging lens in the embodiment

| Surface Number | A4 | A6 | A8 | A10 | A12 | A14 | A16 |
|---|---|---|---|---|---|---|---|
| S25 | −5.5410E−02 | 5.0061E−02 | 2.5449E−01 | −1.0621E+00 | 1.6476E+00 | −8.0732E−01 | 5.4969E−09 |
| S26 | −3.7030E−02 | −7.2696E−02 | 4.3756E−01 | −8.5473E−01 | 6.2211E−01 | 1.5818E−02 | −1.6873E−07 |
| S27 | −3.4944E−01 | 2.8991E−01 | −1.8466E−01 | −7.4000E−03 | 2.8766E−02 | 0.0000E+00 | 0.0000E+00 |
| S28 | −4.1531E−01 | 2.4570E−01 | 1.9230E−02 | −2.0042E−01 | 1.7641E−01 | −4.7140E−02 | 0.0000E+00 |
| S29 | −2.1800E−03 | 6.9711E−02 | 1.6168E−03 | −2.1462E−02 | 6.3190E−03 | 0.0000E+00 | 0.0000E+00 |
| S210 | 2.9004E−01 | −7.4639E−02 | 7.2129E−03 | −4.9543E−04 | 1.4580E−03 | −3.2000E−04 | 0.0000E+00 |
| S211 | 4.3932E−02 | 4.7924E−03 | −2.7379E−03 | −2.8588E−04 | 7.2300E−05 | −3.3000E−06 | 0.0000E+00 |
| S212 | 8.0624E−02 | −8.2978E−03 | 3.6876E−04 | 7.3650E−05 | 7.5900E−07 | −1.8000E−06 | 0.0000E+00 |

Table 15 shows an effective focal length $F_2$ of the second imaging lens in the present embodiment, an effective focal lengths $f_{21}$ to $f_{26}$ of each lens of the second imaging lens, the distance $TTL_2$ on the optical axis from the first lens object-side surface S21 of the second imaging lens to the imaging surface S215 of the second imaging lens, and $ImgH_2$ is a half of a diagonal length of an effective pixel area on an imaging surface of the second imaging lens, an apertures number $Fno_2$ of the second imaging lens, an object distance $P_2$ of the second imaging lens, and the maximum half viewing angle Semi-FOV2 of the second imaging lens.

TABLE 15

Parameters of second imaging lens

| Embodiment Parameters | 5 |
|---|---|
| f21 (mm) | 3.53 |
| f22 (mm) | −6.81 |
| f23 (mm) | 6.33 |
| f24 (mm) | −7.52 |
| f25 (mm) | 2.21 |
| f26 (mm) | −1.92 |
| F2 (mm) | 3.06 |
| TTL2 (mm) | 4.03 |
| ImgH2 (mm) | 2.79 |
| Fno2 | 2.40 |
| P2 (mm) | 800.00 |
| Semi-FOV2(°) | 42.8 |

In the embodiment, the length of the second imaging lens 20 on the optical axis from the first lens object-side surface S21 of the first lens of the second imaging lens to the imaging surface S215 of the second imaging lens is 4.03 mm, and an effective focal length of the second imaging lens is 3.06 mm, the image height of the second imaging lens is 2.79 mm, the maximum half viewing angle of the second imaging lens is 42.8 degrees, the aperture value of the second imaging lens is 2.40, and an object distance of the second imaging lens is 800 mm.

In the embodiment, $P_2$=800 mm, an object distance of the second imaging lens is between 500 mm and 1500 mm. According to the depth of field measured by the second imaging lens 20 in real time, the weights of the first imaging lens 10 and the third imaging lens can be increased and reduced in real time, effectively improving the imaging efficiency and the frame number of the imaging lenses, and increasing the imaging clarity.

$F_2/(f_{21}+f_{25}+f_{26})$=0.80, $F_2/(f_{21}+f_{25}+f_{26})$ belongs to the range of 0.7 to 1.0, which can avoid excessive focusing of optical power, can well improve the aberration correction capability of the imaging system of the second imaging lens, effectively reduce the size of the second imaging lens, and realize lightening and thinning.

$(R_{23}+R_{24})/(R_{21}+R_{22})$=0.74, $(R_{23}+R_{24})/(R_{21}+R_{22})$ between 0.4 to 0.8, so that the second imaging lens 20 can better achieve the deflection of the optical path, and balance the advanced spherical aberration generated by the second imaging lens 20.

$TTL_2/ImgH_2$=1.44 $TTL_2/ImgH_2$ between 0 and 1.65, so that under the condition that the optical system of the second imaging lens has a relatively short length, it can be ensured that the optical system of the second imaging lens has a sufficiently large image surface, so as to present more detailed information about an object to be shot, thereby making the imaging more clear.

Figure 22:
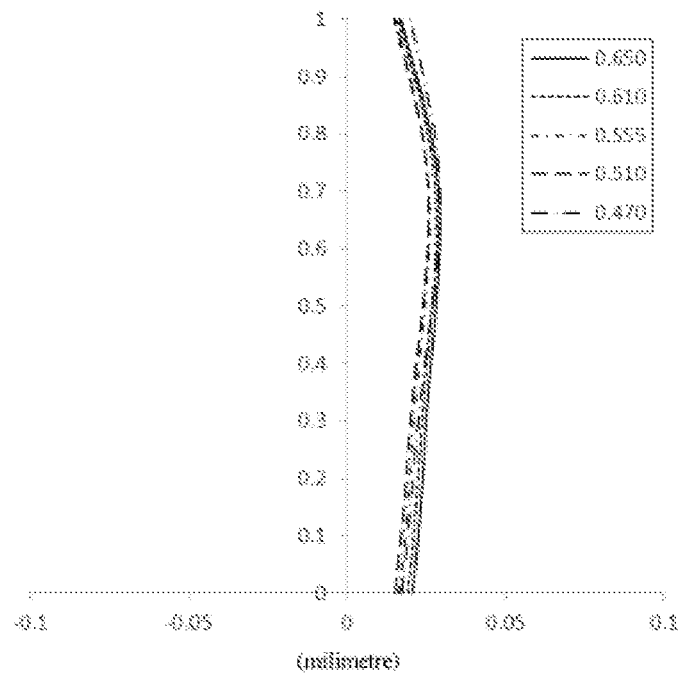
FIG. 22 shows an axis chromatic aberration curve of the second imaging lens of FIG. 21.
Figure 23:
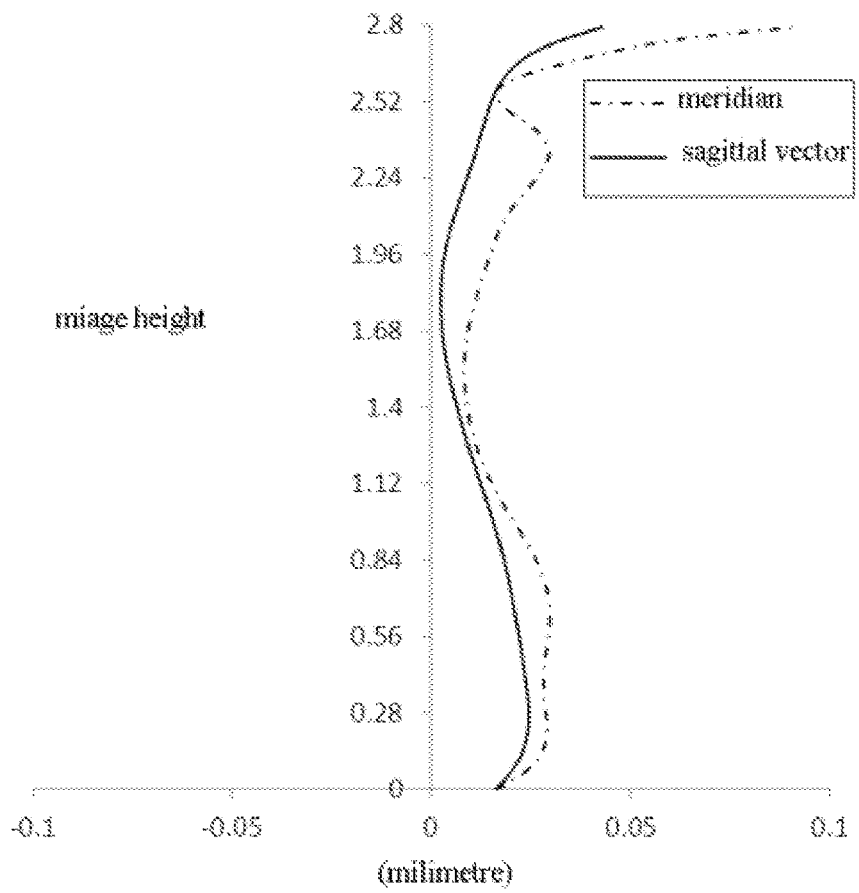
FIG. 23 shows an astigmatic curve of the second imaging lens in FIG. 21.
Figure 24:
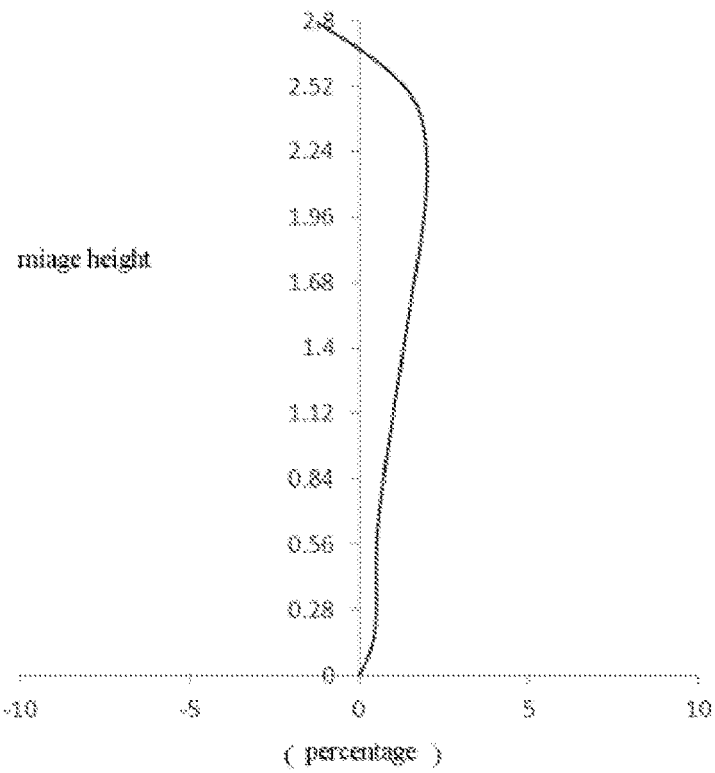
FIG. 24 shows distortion curves of the second imaging lens of FIG. 21.
Figure 25:
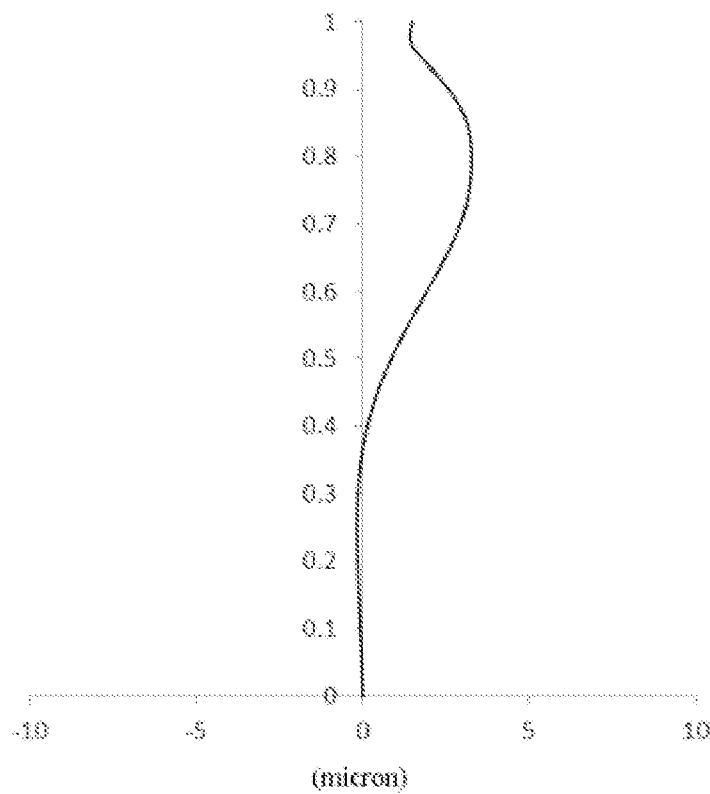
FIG. 25 shows the chromatic aberration curves of the second imaging lens of FIG. 21.

FIG. 22 shows an axis chromatic aberration curve on the second imaging lens 20 in the present embodiment, which indicates that focusing points of light with different wavelengths after passing through an optical system are deviated, so that the focal planes of the light with different wavelengths cannot coincide at the time of the last imaging, and the polychromatic light is spread to form dispersion. FIG. 23 illustrates a stigmatic curve of the second imaging lens in the embodiment, which represents meridional image surface curvature and sagittal image surface curvature. FIG. 24 shows distortion curves of the second imaging lens in the embodiment, which represents distortion magnitude values for different viewing angles. FIG. 25 shows the magnification chromatic aberration curves of the second imaging lens in the embodiment, which represents the phase differences for different image heights on the imaging surface after light passes through the optical imaging lens. It can be seen from FIG. 22 to FIG. 25 that the second imaging lens 20 in the embodiment is applicable to a convenient electronic product, and has a large aperture and good imaging quality.

Embodiment 6

It should be noted that the second imaging lens 20 is defined in the present embodiment.

Figure 26:
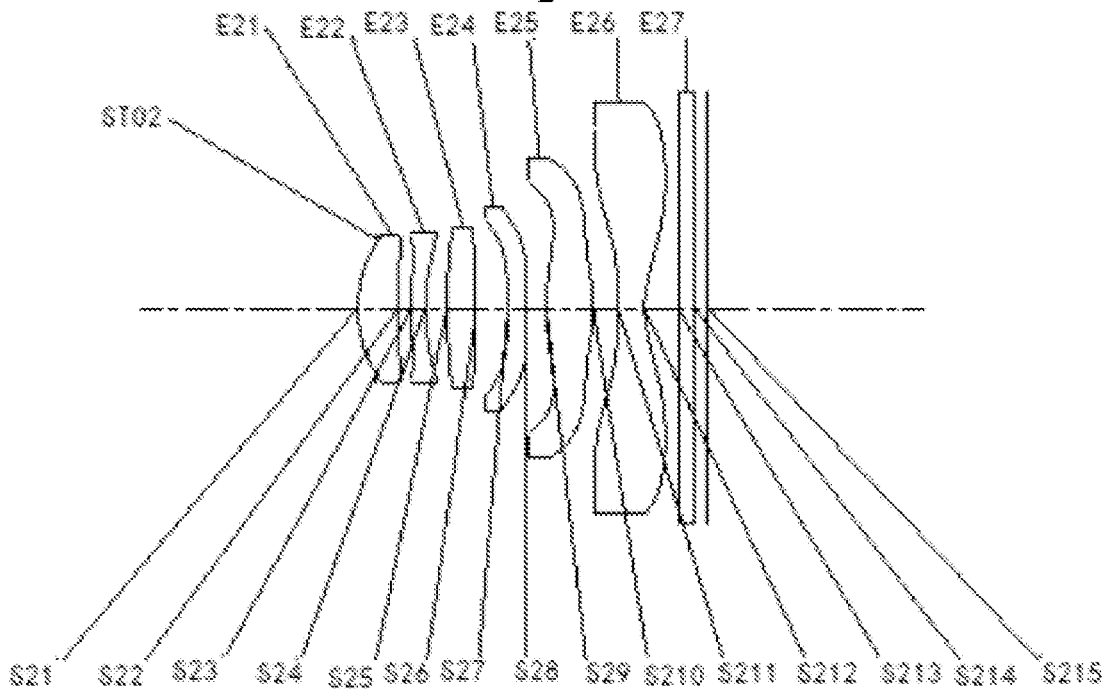
FIG. 26 is a schematic structural view of a second imaging lens according to a sixth embodiment of the disclosure.

As shown in FIG. 26, the second imaging lens 20 includes a diaphragm ST02 of the second imaging lens, a first lens E21 of the second imaging lens, a second lens E22 of the second imaging lens, a third lens E23 of the second imaging lens, a fourth lens E24 of the second imaging lens, a fifth lens E25 of the second imaging lens, a sixth lens E26 of the second imaging lens, a filter E27 of the second imaging lens and an imaging surface S215 of the second imaging lens in order from an object-side to the image-side along the optical axis.

The first lens E21 of the second imaging lens has a positive focal power, a first lens object-side surface S21 of the first lens of the second imaging lens is a convex surface, and a first lens image-side surface S22 of the first lens of the second imaging lens is a concave surface; a second lens E22 of the second imaging lens has a negative focal power, a second lens object-side surface S23 of the second lens of the second imaging lens is a convex surface, and a second lens image-side surface S24 of the second lens of the second imaging lens is a concave surface; the third lens E23 of the second imaging lens has a positive focal power, the third lens object-side surface S25 of the third lens of the second imaging lens is a convex surface, and the third lens image-side surface S26 of the third lens of the second imaging lens is a convex surface; a fourth lens E24 of the second imaging lens has a negative focal power, a fourth lens object-side surface S27 of the fourth lens of the second imaging lens is a concave surface, and a fourth lens image-side surface S28 of the fourth lens of the second imaging lens is a concave surface; a fifth lens E25 of the second imaging lens has a positive focal power, a fifth lens object-side surface S29 of the fifth lens of the second imaging lens is a convex surface, and a fifth lens image-side surface S210 of the fifth lens of the second imaging lens is a convex surface; a sixth lens E26 of the second imaging lens has a negative focal power, a sixth lens object-side surface S211 of the sixth lens of the second imaging lens is a convex surface, and a sixth lens image-side surface S212 of the sixth lens of the second imaging lens is a concave surface. The filter E27 of the second imaging lens has a filter object-side surface S213 of the second imaging lens and a filter image-side surface S214 of the second imaging lens. Light from an object sequentially passes through the respective surfaces and is finally imaged on an imaging surface S215 of the second imaging lens. Table 16 shows the surface type, a curvature radius, the thickness, the material and the conical coefficient of each lens of the second imaging lens in the embodiment, in which the units of the curvature radius and the thickness are all millimeters.

TABLE 16

Detailed optical data of second imaging lens in the embodiment

| Surface Number | Surface Type | Curvature radius | Thickness | Materials | Material | Conic Coefficient |
|---|---|---|---|---|---|---|
| OBJ | Sphere | None | 1200.0000 | | | |
| ST0 | Sphere | None | −0.2371 | | | |
| S21 | Aspheric Surface | 1.7665 | 0.5599 | 1.55, 56.1 | Plastic | −0.5492 |
| S22 | Aspheric Surface | 11.9794 | 0.1785 | | | −14.8529 |
| S23 | Aspheric Surface | 4.6655 | 0.1914 | 1.66, 21.5 | Plastic | −23.3705 |
| S24 | Aspheric Surface | 2.1898 | 0.2987 | | | −1.2145 |
| S25 | Aspheric Surface | 6.4502 | 0.4047 | 1.55, 56.1 | Plastic | −49.3887 |
| S26 | Aspheric Surface | −20.2646 | 0.4347 | | | −200.0000 |
| S27 | Aspheric Surface | −24.5203 | 0.2640 | 1.66, 21.5 | Plastic | 100.0000 |
| S28 | Aspheric Surface | 7.8647 | 0.2664 | | | −156.3322 |
| S29 | Aspheric Surface | 3.2874 | 0.6470 | 1.55, 56.1 | Plastic | −1.8728 |
| S210 | Aspheric Surface | −2.3135 | 0.3426 | | | −12.0310 |
| S211 | Aspheric Surface | 59.8925 | 0.3594 | 1.54, 55.7 | Plastic | −200.0000 |
| S212 | Aspheric Surface | 1.1881 | 0.4645 | | | −6.2968 |
| S213 | Sphere | None | 0.2398 | 1.52, 64.2 | Glass | |
| S214 | Sphere | None | 0.1723 | | | |
| S215 | Sphere | None | | | | |

Table 17 shows higher order coefficients of the respective aspherical surfaces of the respective aspherical lenses that can be used for the second imaging lens in the embodiment.

TABLE 17 the high order coefficients of the aspherical surfaces of second imaging lens in the embodiment

| Surface Number | A4 | A6 | A8 | A10 | A12 | A14 | A16 |
|---|---|---|---|---|---|---|---|
| S21 | 1.0852E−02 | 4.1404E−02 | −8.5260E−02 | 1.1792E−01 | −7.4223E−02 | 1.7543E−02 | −1.0169E−14 |
| S22 | −2.8216E−02 | 6.4086E−02 | −6.7839E−02 | 4.5724E−02 | −2.2841E−02 | −7.0800E−14 | 7.0162E−16 |
| S23 | −1.7996E−01 | 2.5047E−01 | −2.5398E−01 | 1.3598E−01 | −4.6089E−02 | 5.4170E−13 | 6.8029E−15 |
| S24 | −1.9017E−01 | 2.7611E−01 | −2.8476E−01 | 1.7443E−01 | −5.0107E−02 | 1.4340E−12 | 3.8206E−14 |
| S25 | 4.3501E−03 | −7.7347E−02 | 1.7676E−01 | −2.3303E−01 | 1.7994E−01 | −5.0861E−02 | −2.7279E−13 |
| S26 | −1.3191E−02 | −6.2883E−02 | 1.0366E−01 | −9.9148E−02 | 4.6704E−02 | −2.7400E−12 | −3.4090E−13 |
| S27 | −1.9335E−01 | 1.0842E−01 | −5.9963E−02 | 3.9100E−03 | 6.7503E−03 | −1.2450E−03 | 3.7189E−08 |
| S28 | −9.6649E−01 | 7.5106E−01 | 6.7996E−02 | −1.1698E+00 | 1.4036E+00 | −5.2424E−01 | 0.0000E+00 |
| S29 | −1.0973E−01 | 2.5809E−01 | −1.1850E−02 | −1.3285E−01 | 5.6834E−02 | 0.0000E+00 | 0.0000E+00 |

TABLE 17-continued the high order coefficients of the aspherical surfaces of second imaging lens in the embodiment

| Surface Number | A4 | A6 | A8 | A10 | A12 | □A14 | □A16 |
|---|---|---|---|---|---|---|---|
| S210 | 6.4169E−01 | −2.5699E−01 | 4.0879E−02 | 4.8386E−03 | 1.1838E−02 | −5.2800E−03 | 0.0000E+00 |
| S211 | 1.0761E−01 | 1.2213E−02 | −1.1274E−02 | −1.6830E−03 | 5.6050E−04 | −2.8000E−05 | 0.0000E+00 |
| S212 | 1.0653E−01 | −1.5518E−02 | 1.6998E−03 | 2.3010E−04 | 8.3090E−05 | −4.0000E−05 | 0.0000E+00 |

Table 18 shows an effective focal length $F_2$ of the second imaging lens in the present embodiment, an effective focal lengths $f_{21}$ to $f_{26}$ of each lens of the second imaging lens, the distance $TTL_2$ on the optical axis from the first lens object-side surface S21 of the second imaging lens to the imaging surface S215 of the second imaging lens, and $ImgH_2$ is a half of a diagonal length of an effective pixel area on an imaging surface of the second imaging lens, an apertures number $Fno_2$ of the second imaging lens, an object distance $P_2$ of the second imaging lens, and the maximum half viewing angle Semi-FOV2 of the second imaging lens.

TABLE 18

Parameters of second imaging lens

| Embodiment Parameters | 6 |
|---|---|
| f21 (mm) | 3.72 |
| f22 (mm) | −6.49 |
| f23 (mm) | 9.01 |
| f24 (mm) | −9.04 |
| f25 (mm) | 2.59 |
| f26 (mm) | −2.26 |
| F2 (mm) | 3.86 |
| TTL2 (mm) | 4.82 |
| ImgH2 (mm) | 2.98 |
| Fno2 | 2.00 |
| P2 (mm) | 1200.00 |
| Semi-FOV2(°) | 37.9 |

In the embodiment, the length of the second imaging lens 20 on the optical axis from the first lens object-side surface S21 of the first lens of the second imaging lens to the imaging surface S215 of the second imaging lens is 4.82 mm, and an effective focal length of the second imaging lens is 3.86 mm, the image height of the second imaging lens is 2.98 mm, the maximum half viewing angle of the second imaging lens is 37.9 degrees, the aperture value of the second imaging lens is 2.00, and an object distance of the second imaging lens is 1200 mm.

In the embodiment, $P_2$=1200 mm an object distance of the second imaging lens is between 500 mm and 1500 mm. According to the depth of field measured by the second imaging lens 20 in real time, the weights of the first imaging lens 10 and the third imaging lens can be increased and reduced in real time. The imaging efficiency and the frame number of the imaging lenses are effectively improved, and the imaging definition is increased.

$F_2/(f_{21}+f_{25}+f_{26})$=0.95, $F_2/(f_{21}+f_{25}+f_{26})$ belongs to the range of 0.7 to 1.0, which can avoid excessive focusing of optical power, can well improve the aberration correction capability of the imaging system of the second imaging lens, effectively reduce the size of the second imaging lens, and realize lightening and thinning.

$(R_{23}+R_{24})/(R_{21}+R_{22})$=0.50, $(R_{23}+R_{24})/(R_{21}+R_{22})$ between 0.4 and 0.8, so that the second imaging lens 20 can better achieve the deflection of the optical path, and balance the advanced spherical aberration generated by the second imaging lens 20.

$TTL_2/ImgH_2$=1.62, $TTL_2/ImgH_2$ between 0 and 1.65, under the condition that the optical system of the second imaging lens has a relatively short length, it can be ensured that the optical system of the second imaging lens has a sufficiently large image surface, so as to present more detail information about an object to be shot, thereby making the imaging more clear.

Figure 27:
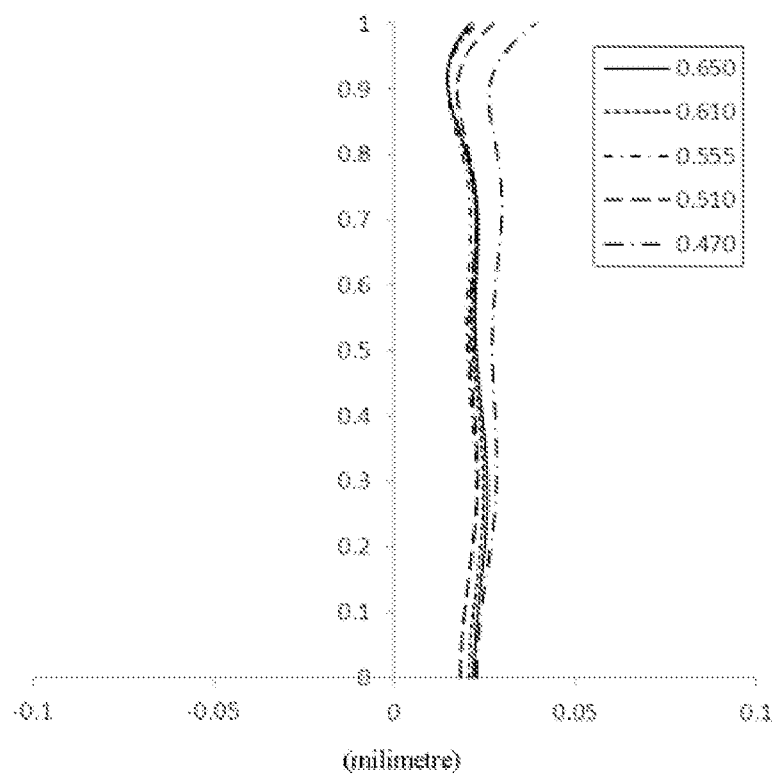
FIG. 27 shows an axis chromatic aberration curve of the second imaging lens of FIG. 26.
Figure 28:
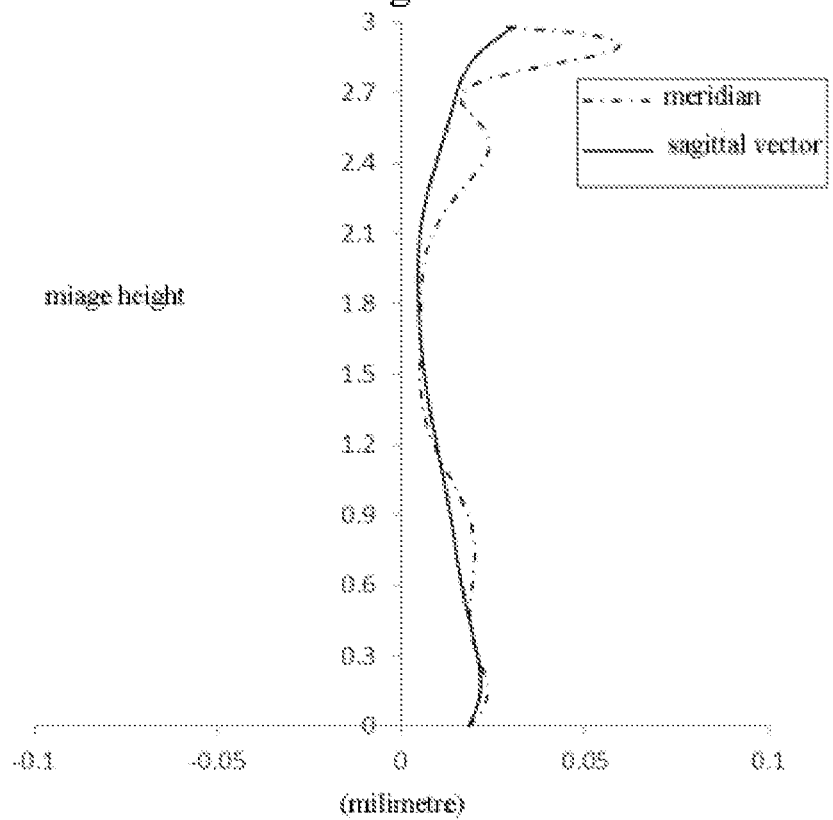
FIG. 28 shows an astigmatic curve of the second imaging lens in FIG. 26.
Figure 29:
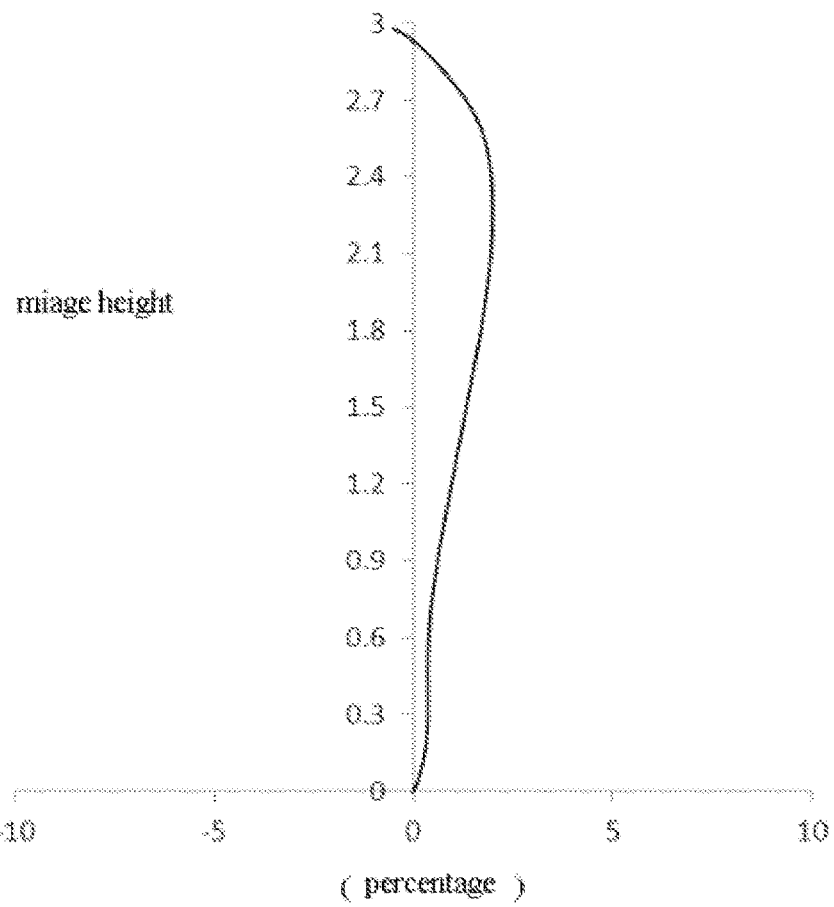
FIG. 29 shows the distortion curve of the second imaging lens in FIG. 26.
Figure 30:
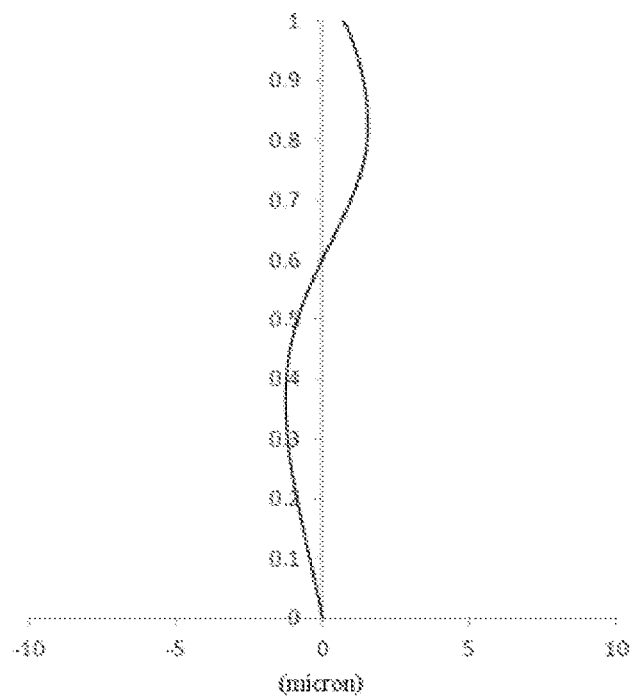
FIG. 30 shows the magnification chromatic aberration curves of the second imaging lens of FIG. 26.

FIG. 27 shows an axis chromatic aberration curve on the second imaging lens 20 in the present embodiment, which indicates that focusing points of light with different wavelengths after passing through an optical system are deviated, so that focal planes of light with different wavelengths cannot coincide at the time of final imaging, and the color light is spread to form dispersion. FIG. 28 illustrates a stigmatic curve of the second imaging lens in the embodiment, which represents meridional image surface curvature and sagittal image surface curvature. FIG. 29 shows distortion curves of the second imaging lens in the embodiment, which represents distortion magnitude values for different viewing angles. FIG. 30 shows the magnification chromatic aberration curves of the second imaging lens in the embodiment, which represents the phase differences for different image heights on the imaging surface after light passes through the optical imaging lens. It can be seen from FIG. 27 to FIG. 30 that the second imaging lens 20 in the embodiment is applicable to a convenient electronic product, and has a large aperture and good imaging quality.

Embodiment 7

It should be noted that the third imaging lens 30 is defined in the present embodiment.

Figure 31:
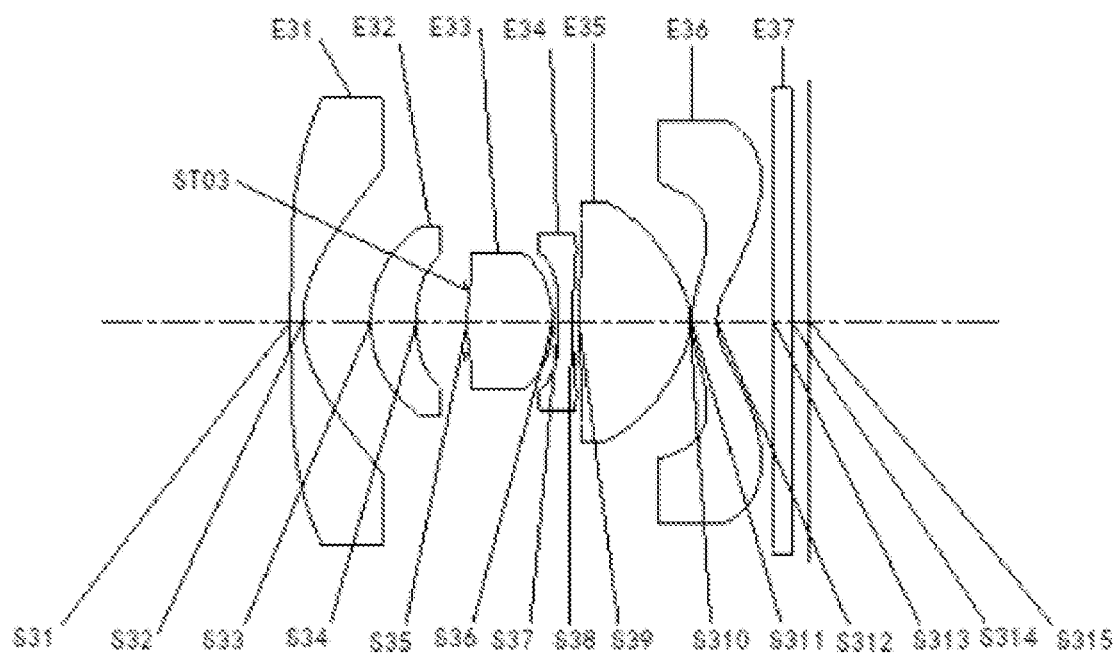
FIG. 31 is a schematic structural view of a third imaging lens according to a seventh embodiment of the disclosure.

As shown in FIG. 31, the third imaging lens 30 includes a first lens E31 of the third imaging lens, a second lens E32 of the third imaging lens, a diaphragm ST03 of the third imaging lens, a third lens E33 of the third imaging lens, a fourth lens E34 of the third imaging lens, a fifth lens E35 of the third imaging lens, a sixth lens E36 of the third imaging lens, a filter E37 of the third imaging lens, and an imaging surface S315 of the third imaging lens in order from an object-side to the image-side along the optical axis.

The first lens E31 of the third imaging lens has a negative optical power, a first lens object-side surface S31 of the first lens of the third imaging lens is a concave surface, and a first lens image-side surface S32 of the first lens of the third imaging lens is a concave surface; the second lens E32 of the third imaging lens has a positive focal power, a second lens object-side surface S33 of the second lens of the third imaging lens is a convex surface, and a second lens image-side surface S34 of the second lens of the third imaging lens is a concave surface; the third lens E33 of the third imaging lens has a positive focal power, the third lens object-side surface S35 of the third lens of the third imaging lens is a convex surface, and the third lens image-side surface S36 of the third lens of the third imaging lens is a convex surface; a fourth lens E34 of the third imaging lens has a negative optical power, a fourth lens object-side surface S37 of the fourth lens of the third imaging lens is a concave surface, and a fourth lens image-side surface S38 of the fourth lens of the third imaging lens is a concave surface; the fifth lens E35 of the third imaging lens has a positive focal power, a fifth lens object-side surface S39 of the fifth lens of the third imaging lens is a convex surface, and a fifth lens image-side surface S310 of the fifth lens of the third imaging lens is a convex surface; the sixth lens E36 of the third imaging lens has negative optical power, a sixth lens object-side surface S311 of the sixth lens of the third imaging lens is a convex surface, and a sixth lens image-side surface S312 of the sixth lens of the third imaging lens is a concave surface. The filter E37 of the third imaging lens has a filter object-side surface S313 of the third imaging lens and a filter image-side surface S314 of the third imaging lens. Light from an object sequentially passes through the respective surfaces and is finally imaged on an imaging surface S315 of the third imaging lens. Table 19 shows the surface type, a curvature radius, a thickness, material and conic coefficient of each lens of the third imaging lens in the present embodiment, wherein the units of the curvature radius and the thickness are all millimeters.

TABLE 19

Detailed optical data of the third imaging lens in the embodiment

| Surface Number | Surface Type | A Curvature radius | Thickness | Materials | Material | Conic Coefficient |
|---|---|---|---|---|---|---|
| OBJ | Sphere | None | None | | | |
| S31 | Aspheric Surface | −950.0000 | 0.1901 | 1.55, 56.1 | Plastic | −392501.2000 |
| S32 | Aspheric Surface | 1.6880 | 1.0786 | | | −3.0225 |
| S33 | Aspheric Surface | 1.8756 | 0.7232 | 1.65, 23.5 | Plastic | −0.6604 |
| S34 | Aspheric Surface | 2.4718 | 0.7576 | | | 1.9870 |
| ST03 | Sphere | None | 0.0495 | | | 0.0000 |
| S35 | Aspheric Surface | 3.8204 | 1.3558 | 1.55, 56.1 | Plastic | 4.9162 |
| S36 | Aspheric Surface | −1.5791 | 0.0865 | | | −0.0350 |
| S37 | Aspheric Surface | −17.0507 | 0.1993 | 1.65, 23.5 | Plastic | 171.0850 |
| S38 | Aspheric Surface | 2.8098 | 0.1252 | | | −21.2946 |
| S39 | Aspheric Surface | 14.5135 | 1.7574 | 1.55, 56.1 | Plastic | −413.2824 |
| S310 | Aspheric Surface | −1.1504 | 0.0285 | | | −0.7153 |
| S311 | Aspheric Surface | 1.4183 | 0.3942 | 1.65, 23.5 | Plastic | −6.2760 |
| S312 | Aspheric Surface | 0.7997 | 0.9008 | | | −2.8339 |
| S313 | Sphere | None | 0.2850 | 1.52, 64.2 | Glass | |
| S314 | Sphere | None | 0.2848 | | | |
| S315 | Sphere | None | | | | |

Table 20 shows higher order coefficients of the respective aspherical surfaces of the respective aspherical lenses that can be used for the third imaging lens in the embodiment.

TABLE 20 the high order coefficients of the aspherical surfaces of the third imaging lens in the present embodiment

| Surface Number | A4 | A6 | A8 | A10 | A12 | □A14 | □A16 |
|---|---|---|---|---|---|---|---|
| S31 | 1.0268E−02 | −3.3370E−03 | 7.5700E−04 | −9.7000E−05 | 7.1800E−06 | −2.9000E−07 | 5.0300E−09 |
| S32 | 1.5417E−02 | 4.8610E−04 | −1.8460E−03 | 5.5360E−04 | −7.5097E−05 | 4.4026E−06 | −6.6669E−08 |
| S33 | −1.5780E−03 | 2.6353E−02 | −2.3100E−03 | −2.9100E−03 | 5.7900E−04 | −4.0000E−07 | −1.8000E−07 |
| S34 | 4.0005E−02 | 9.1240E−02 | −7.2030E−02 | 3.7619E−02 | −2.5000E−04 | −2.1000E−04 | −2.1000E−04 |
| S35 | −5.2230E−03 | −2.8798E−02 | 3.6437E−02 | −2.9930E−02 | −1.1704E−01 | 1.2657E−01 | −1.9320E−02 |
| S36 | 4.8039E−02 | −1.4433E−01 | 2.4787E−01 | −3.2044E−01 | 2.0248E−01 | −5.4840E−02 | 1.8910E−03 |
| S37 | −1.9847E−01 | 1.2471E−02 | 1.6256E−01 | −2.2146E−01 | 9.0116E−02 | −1.3510E−02 | −9.5000E−04 |
| S38 | −6.0678E−02 | −3.8962E−02 | 1.0329E−01 | −8.0490E−02 | 3.0583E−02 | −5.5600E−03 | 3.6900E−04 |
| S39 | 8.4766E−02 | −1.3306E−01 | 8.9162E−02 | −3.0070E−02 | 4.0880E−03 | 1.7300E−04 | −7.1000E−05 |
| S310 | 1.4193E−01 | −7.8360E−02 | 5.6467E−02 | −2.9620E−02 | 9.1180E−03 | −1.4800E−03 | 9.9400E−05 |
| S311 | −2.2851E−02 | −3.8838E−02 | 3.1019E−02 | −1.1200E−02 | 1.8730E−03 | −1.2000E−04 | −1.3000E−08 |
| S312 | −5.5388E−02 | 1.2155E−02 | −1.2900E−03 | −1.4000E−06 | 1.0000E−05 | −5.3000E−07 | −1.1000E−11 |

Table 21 gives an effective focal length $F_3$ of the third imaging lens in the embodiment, an effective focal lengths $f_{31}$ to $f_{36}$ of each lens of the third imaging lens, the distance $TTL_3$ on the optical axis from the first lens object-side surface S31 of the third imaging lens to the imaging surface S315 of the third imaging lens, and $ImgH_2$ is a half of a diagonal length of an effective pixel area on an imaging surface of the third imaging lens, an apertures number $Fno_3$ of the third imaging lens, an object distance $P_3$ of the third imaging lens, and the maximum half viewing angle Semi-FOV3 of the third imaging lens.

TABLE 21

| Parameters of the third imaging lens | |
|---|---|
| Embodiment Parameters | 7 |
| f31 (mm) | −3.09 |
| f32 (mm) | 8.18 |
| f33 (mm) | 2.25 |
| f34 (mm) | −3.73 |
| f35 (mm) | 2.03 |
| f36 (mm) | −3.79 |
| F3 (mm) | 1.75 |
| TTL3 (mm) | 8.22 |
| ImgH3 (mm) | 3.85 |
| Fno3 | 2.43 |
| P3 (mm) | None |
| Semi-FOV3(°) | 68.5 |

In the embodiment, the length of the third imaging lens 30 on the optical axis from the first lens object-side surface S31 of the first lens of the third imaging lens to the imaging surface S315 of the third imaging lens is 8.22 mm, and an effective focal length of the third imaging lens is 1.75 mm, the image height of the third imaging lens is 3.85 mm, the maximum half viewing angle of the third imaging lens is 68.5 degrees, and the aperture value of the third imaging lens is 2.43.

In the embodiment, $(f_{31}+f_{34}+f_{36})/(f_{32}+f_{33}+f_{35})=−0.85$, $(f_{31}+f_{34}+f_{36})/(f_{32}+f_{33}+f_{35})$ belongs to the range of −1.0 to −0.4, and the contribution amount of field curvature of each lens of the third imaging lens can be rationally controlled, so that the field curvature of the third imaging lens can be controlled within a reasonable range.

$(R_{39}+R_{310})/(R_{39}-R_{310})=0.85$, $(R_{39}+R_{310})/(R_{39}-R_{310})$ within the range of 0.6 to 0.9. In this way, the deflection angle of the light at the edge of the optical imaging system of the third imaging lens can be rationally controlled, and the sensitivity of the optical imaging system of the third imaging lens can be effectively reduced.

Figure 32:
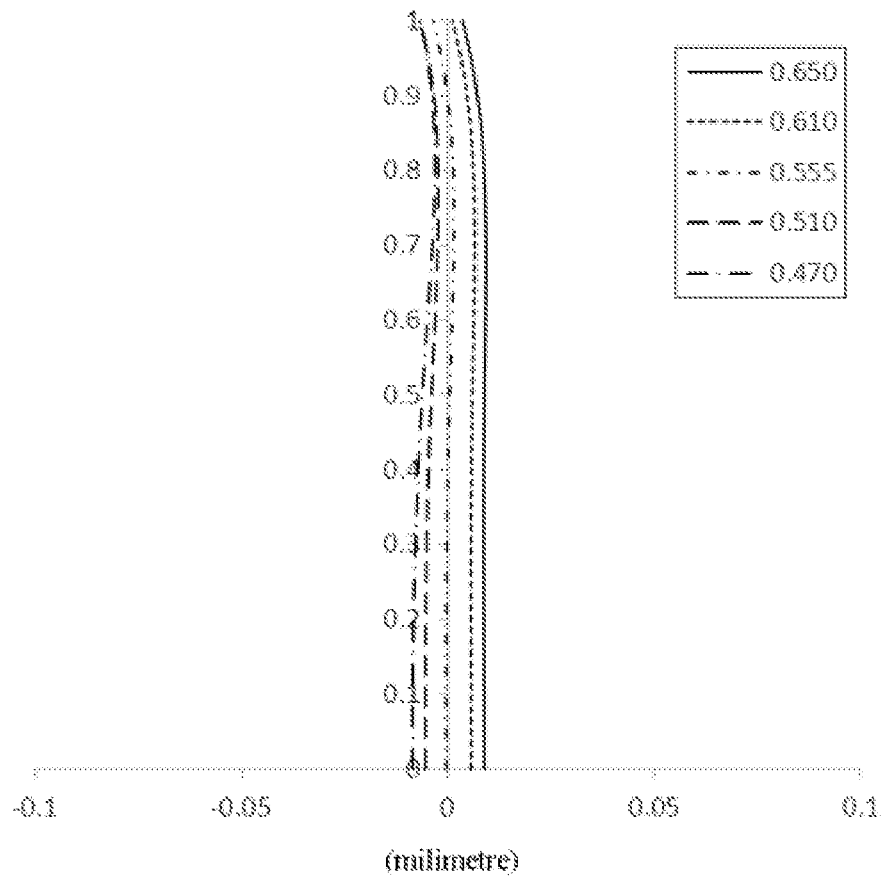
FIG. 32 shows an axis chromatic aberration curve for the third imaging lens of FIG. 31.
Figure 33:
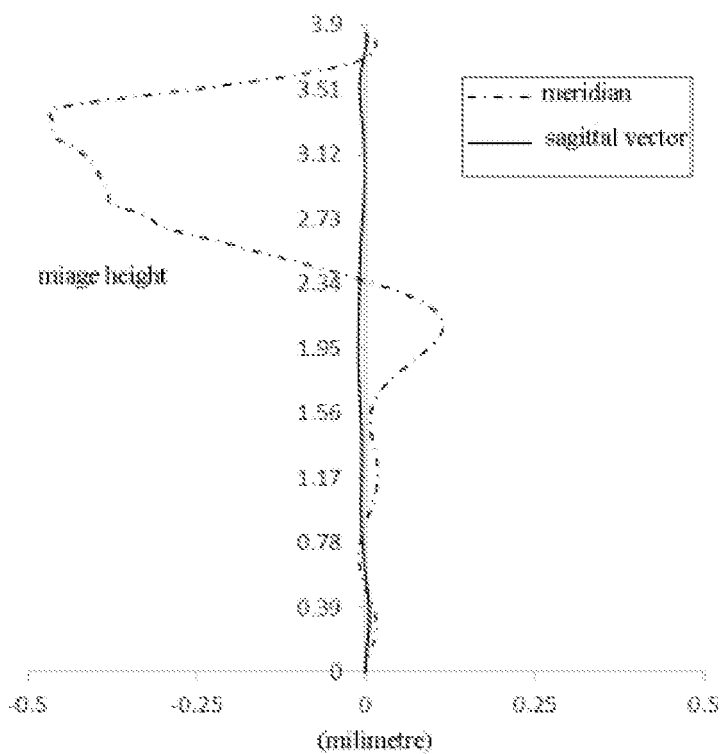
FIG. 33 shows the astigmatism curve of the third imaging lens of FIG. 31.
Figure 34:
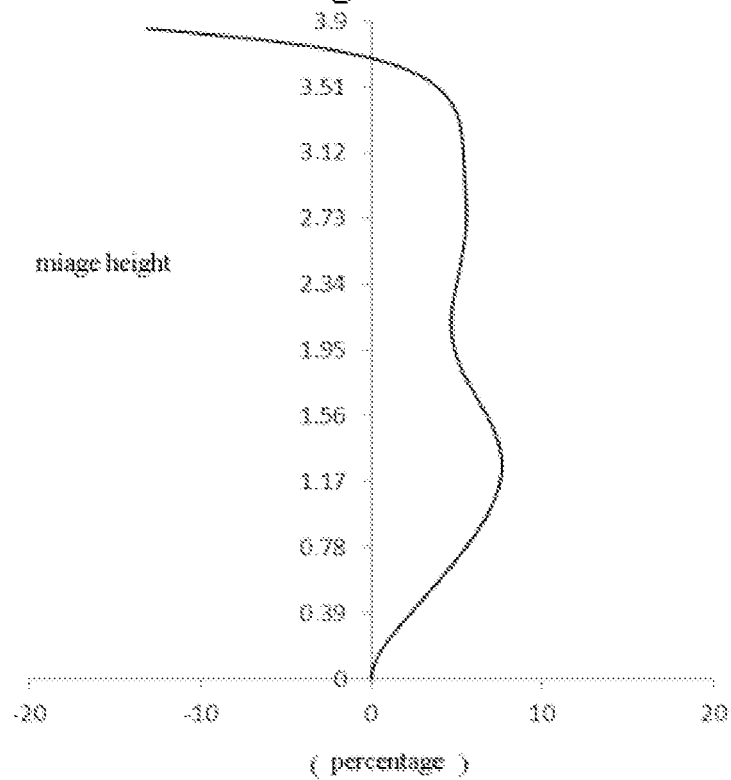
FIG. 34 shows a distortion curve for the third imaging lens of FIG. 31.
Figure 35:
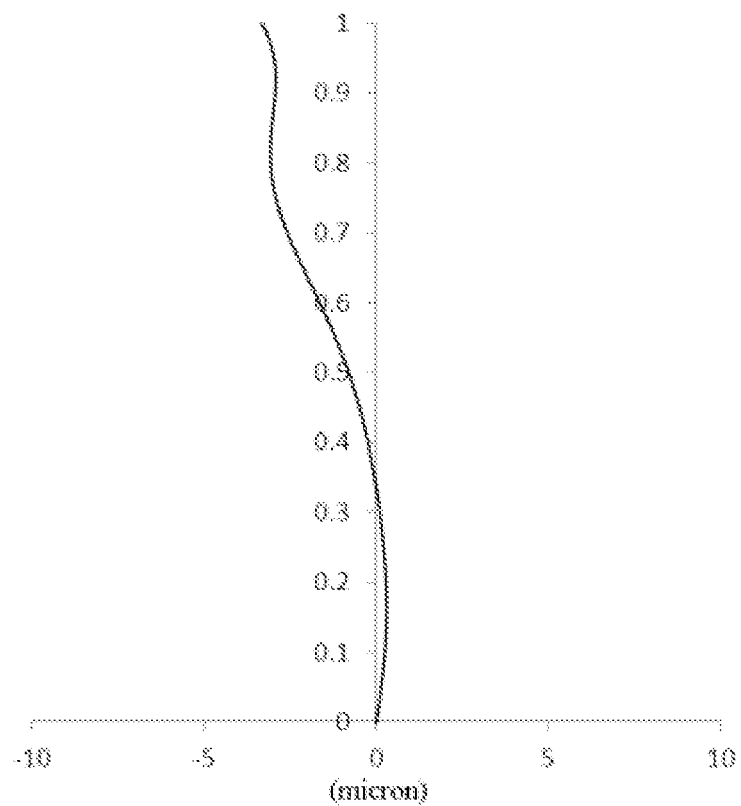
FIG. 35 shows the magnification chromatic aberration curves of the third imaging lens of FIG. 31.

FIG. 32 shows an axis chromatic aberration curve of the third imaging lens 30 in the embodiment, which indicates that focuses of light with different wavelengths are deviated after passing through an optical system, so that the focal planes of the light with different wavelengths cannot coincide at the time of the last imaging, and the polychromatic light is spread to form dispersion. FIG. 33 illustrates the astigmatism curve of the third imaging lens in the present embodiment, which represents meridional image surface curvature and sagittal image surface curvature. FIG. 34 shows distortion curves of the third imaging lens in the embodiment, which represents distortion magnitude values for different viewing angles. FIG. 35 illustrates the magnification chromatic aberration curves of the third imaging lens of the embodiment, which represents the phase differences for different image heights of light on the imaging surface after light passes through the optical imaging lens. It can be seen from FIG. 32 to FIG. 35 that the third imaging lens 30 in the embodiment is applicable to a convenient electronic product, and has a large aperture and good imaging quality.

Embodiment 8

It should be noted that the third imaging lens 30 is defined in the present embodiment.

Figure 36:
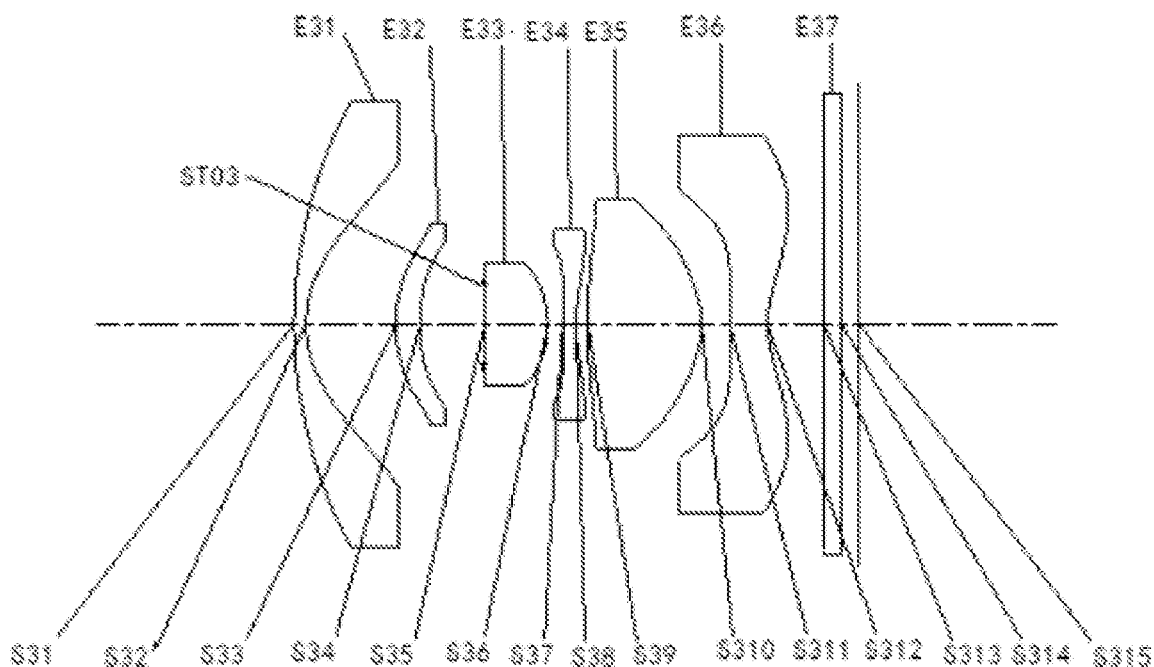
FIG. 36 is a schematic structural view of a third imaging lens according to the eighth embodiment of the disclosure.

As shown in FIG. 36, the third imaging lens 30 includes a first lens E31 of the third imaging lens, a second lens E32 of the third imaging lens, a diaphragm STO3 of the third imaging lens, a third lens E33 of the third imaging lens, a fourth lens E34 of the third imaging lens, a fifth lens E35 of the third imaging lens, a sixth lens E36 of the third imaging lens, a filter E37 of the third imaging lens, and an imaging surface S315 of the third imaging lens in order from an object-side to the image-side along the optical axis.

The first lens E31 of the third imaging lens has a negative optical power, a first lens object-side surface S31 of the first lens of the third imaging lens is a convex surface, and a first lens image-side surface S32 of the first lens of the third imaging lens is a concave surface; the second lens E32 of the third imaging lens has a positive focal power, a second lens object-side surface S33 of the second lens of the third imaging lens is a convex surface, and a second lens image-side surface S34 of the second lens of the third imaging lens is a concave surface; the third lens E33 of the third imaging lens has a positive focal power, the third lens object-side surface S35 of the third lens of the third imaging lens is a convex surface, and the third lens image-side surface S36 of the third lens of the third imaging lens is a convex surface; a fourth lens E34 of the third imaging lens has a negative optical power, a fourth lens object-side surface S37 of the fourth lens of the third imaging lens is a convex surface, and a fourth lens image-side surface S38 of the fourth lens of the third imaging lens is a concave surface; the fifth lens E35 of the third imaging lens has a positive focal power, a fifth lens object-side surface S39 of the fifth lens of the third imaging lens is a convex surface, and a fifth lens image-side surface S310 of the fifth lens of the third imaging lens is a convex surface; the sixth lens E36 of the third imaging lens has negative optical power, a sixth lens object-side surface S311 of the sixth lens of the third imaging lens is concave surface, and a sixth lens image-side surface S312 of the sixth lens of the third imaging lens is convex surface. The filter E37 of the third imaging lens has a filter object-side surface S313 of the third imaging lens and a filter image-side surface S314 of the third imaging lens. Light from an object sequentially passes through the respective surfaces and is finally imaged on an imaging surface S315 of the third imaging lens. Table 22 shows the surface type, a curvature radius, thickness, material, and conic coefficient of each lens of the third imaging lens in the embodiment, in which the units of the curvature radius and the thickness are all millimeters.

TABLE 22

Detailed optical data of the third imaging lens in the embodiment

| Surface Number | Surface Type | Curvature radius | Thickness | Materials | Material | Conic Coefficient |
|---|---|---|---|---|---|---|
| OBJ | Sphere | None | None | | | |
| S1 | Aspheric Surface | 6.9406 | 0.1803 | 1.55, 56.1 | Plastic | −2.8367 |
| S2 | Aspheric Surface | 1.7487 | 1.3641 | | | −1.3493 |
| S3 | Aspheric Surface | 2.2805 | 0.3669 | 1.65, 23.5 | Plastic | −0.8386 |
| S4 | Aspheric Surface | 3.2170 | 0.9491 | | | −4.5177 |
| ST0 | Sphere | None | 0.0270 | | | 0.0000 |
| S5 | Aspheric Surface | −900.0000 | 0.9543 | 1.55, 56.1 | Plastic | −5817.5982 |
| S6 | Aspheric Surface | −1.4423 | 0.2271 | | | −0.0914 |
| S7 | Aspheric Surface | 7.5233 | 0.2009 | 1.65, 23.5 | Plastic | −17.5686 |
| S8 | Aspheric Surface | 2.1161 | 0.1825 | | | −10.3337 |
| S9 | Aspheric Surface | 13.3381 | 1.7224 | 1.55, 56.1 | Plastic | −955.4503 |
| S10 | Aspheric Surface | −1.4259 | 0.4246 | | | −0.6669 |
| S11 | Aspheric Surface | 11.4238 | 0.5754 | 1.65, 23.5 | Plastic | 17.7527 |
| S12 | Aspheric Surface | 1.5136 | 0.8534 | | | −4.7866 |
| S13 | Sphere | None | 0.2700 | 1.52, 64.2 | Glass | |
| S14 | Sphere | None | 0.2698 | | | |
| S15 | Sphere | None | | | | |

Table 23 shows higher order coefficients of the respective aspherical surfaces of the respective aspherical lenses that can be used for the third imaging lens in the embodiment.

TABLE 23 the high order coefficients of the aspherical surfaces of the third imaging lens in the embodiment

| Surface Number | A4 | A6 | A8 | A10 | A12 | A14 | A16 |
|---|---|---|---|---|---|---|---|
| S1 | 7.6029E−03 | −4.2624E−03 | 1.1132E−03 | −1.5766E−04 | 1.3000E−05 | −5.9000E−07 | 1.1600E−08 |
| S2 | 1.3632E−02 | 4.1028E−04 | −4.0308E−03 | 1.5156E−03 | −2.5000E−04 | 1.8500E−05 | −4.2000E−07 |
| S3 | 7.6976E−03 | 2.5253E−02 | −1.0261E−02 | −3.1566E−03 | 1.0490E−03 | −8.1000E−07 | −4.0000E−07 |
| S4 | 4.3130E−02 | 6.6672E−02 | −5.8566E−02 | 1.8858E−02 | −4.5000E−04 | −4.3000E−04 | −4.7000E−04 |
| S5 | −5.3186E−02 | −3.2329E−02 | −4.4324E−02 | 4.6407E−02 | −2.1214E−01 | 2.5561E−01 | −4.3480E−02 |
| S6 | 5.5637E−02 | −1.7175E−01 | 3.5830E−01 | −5.2122E−01 | 3.6701E−01 | −1.1076E−01 | 4.2550E−03 |
| S7 | −1.6310E−01 | −5.7877E−03 | 2.4797E−01 | −3.2134E−01 | 1.6334E−01 | −2.7280E−02 | −2.1400E−03 |
| S8 | −6.5909E−02 | −4.9909E−02 | 1.5016E−01 | −1.3163E−01 | 5.5433E−02 | −1.1220E−02 | 8.3000E−04 |
| S9 | 1.1669E−01 | −1.7526E−01 | 1.2973E−01 | −4.8721E−02 | 7.4090E−03 | 3.5000E−04 | −1.6000E−04 |
| S10 | 1.2677E−01 | −9.9817E−02 | 8.2553E−02 | −4.8140E−02 | 1.6526E−02 | −3.0000E−03 | 2.2400E−04 |
| S11 | −4.6066E−02 | −4.4257E−02 | 4.1491E−02 | −1.7372E−02 | 3.3950E−03 | −2.5000E−04 | −2.9000E−08 |
| S12 | −5.8115E−02 | 1.4360E−02 | −1.7941E−03 | 1.1611E−06 | 1.8100E−05 | −1.1000E−06 | −3.2000E−11 |

Table 24 gives an effective focal length $F_3$ of the third imaging lens in the embodiment, an effective focal lengths $f_{31}$ to $f_{36}$ of each lens of the third imaging lens, the distance $TTL_3$ on the optical axis from the first lens object-side surface S31 of the third imaging lens to the imaging surface S315 of the third imaging lens, and $ImgH_2$ is a half of a diagonal length of an effective pixel area on an imaging surface of the third imaging lens, an apertures number $Fno_3$ of the third imaging lens, an object distance $P_3$ of the third imaging lens, and the maximum half viewing angle Semi-FOV3 of the third imaging lens.

TABLE 24

Parameters of the third imaging lens

| Embodiment Parameters | 8 |
|---|---|
| f31 (mm) | −4.34 |
| f32 (mm) | 10.54 |
| f33 (mm) | 2.65 |
| f34 (mm) | −4.64 |
| f35 (mm) | 2.46 |
| f36 (mm) | −2.77 |

TABLE 24-continued

Parameters of the third imaging lens

| Embodiment Parameters | 8 |
|---|---|
| F3 (mm) | 2.41 |
| TTL3 (mm) | 8.57 |
| ImgH3 (mm) | 3.68 |
| Fno3 | 2.90 |
| P3 (mm) | None |
| Semi-FOV3(°) | 68.5 |

In the embodiment, the length of the third imaging lens 30 on the optical axis from the first lens object-side surface S31 of the first lens of the third imaging lens to the imaging surface S315 of the third imaging lens is 8.57 mm, and an effective focal length of the third imaging lens is 2.41 mm, the image height of the third imaging lens is 3.68 mm, the maximum half viewing angle of the third imaging lens is 68.5 degrees, and the aperture value of the third imaging lens is 2.90.

In the embodiment, $(f_{31}+f_{34}+f_{36})/(f_{32}+f_{33}+f_{35})=-0.75$, $(f_{31}+f_{34}+f_{36})/(f_{32}+f_{33}+f_{35})$ belongs to the range of −1.0 to −0.4, and the contribution amount of field curvature of each lens of the third imaging lens can be rationally controlled, so that the field curvature of the third imaging lens can be controlled within a reasonable range.

$(R_{39}+R_{310})/(R_{39}-R_{310})=0.81$, $(R_{39}+R_{310})/(R_{39}-R_{310})$ belong to the range of 0.6 to 0.9, so that the deflection angle of the light at the edge of the optical imaging system of the third imaging lens can be rationally controlled, and the sensitivity of the optical imaging system of the third imaging lens can be effectively reduced.

Figure 37:
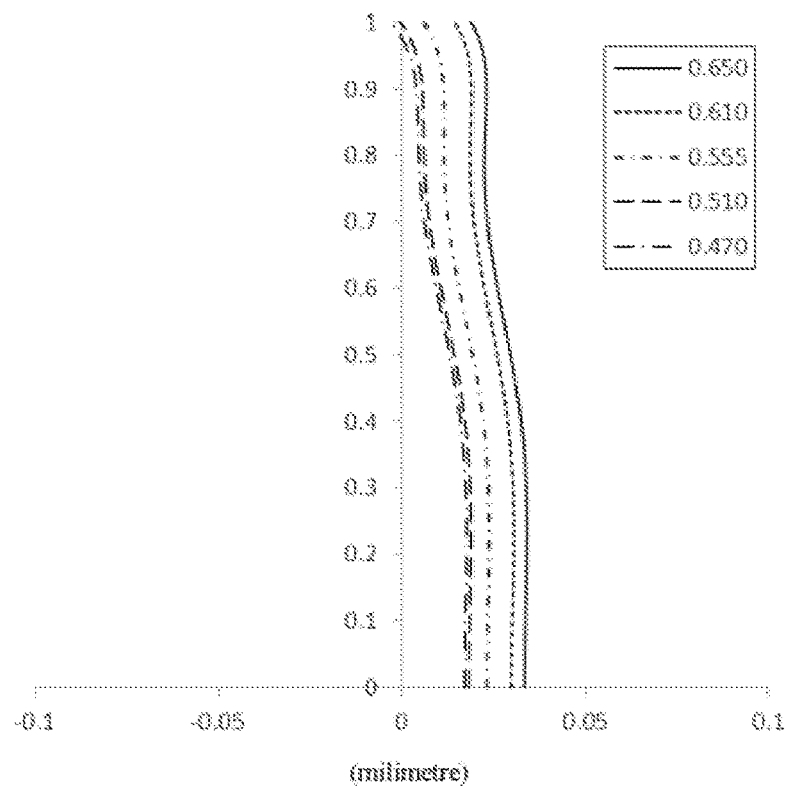
FIG. 37 shows an axis chromatic aberration curve for the third imaging lens of FIG. 36.
Figure 38:
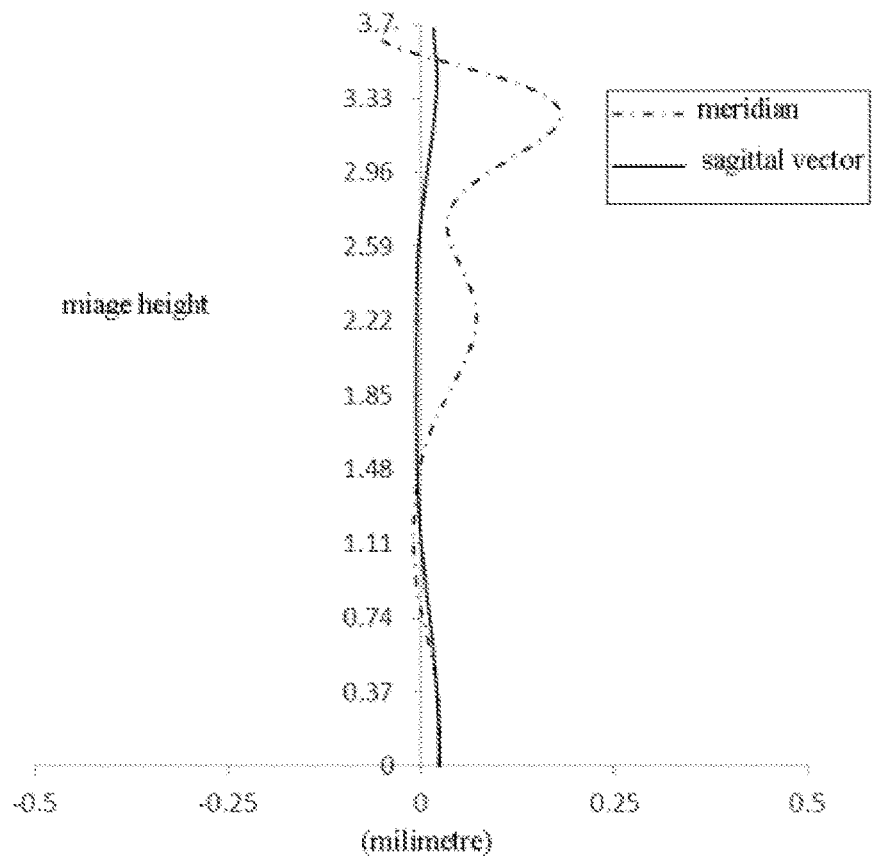
FIG. 38 shows the astigmatism curve of the third imaging lens of FIG. 36.
Figure 39:
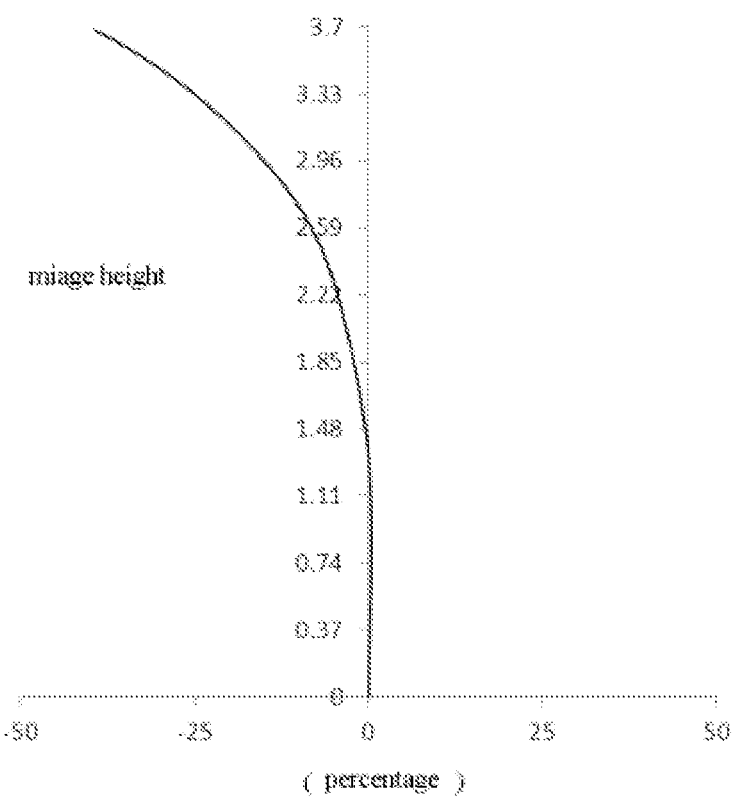
FIG. 39 shows a distortion curve for the third imaging lens of FIG. 36.
Figure 40:
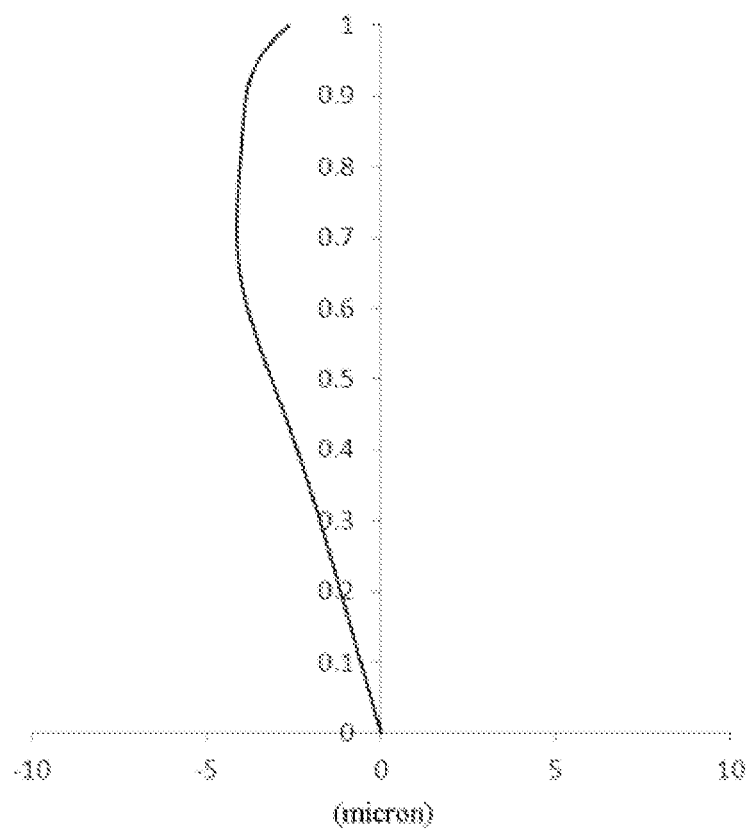
FIG. 40 shows the magnification chromatic aberration curves of the third imaging lens of FIG. 36.

FIG. 37 shows an axis chromatic aberration curve of the third imaging lens 30 in the embodiment, which indicates that focuses of light with different wavelengths are deviated after passing through an optical system, so that the focal planes of the light with different wavelengths cannot coincide at the time of the last imaging, and the polychromatic light is spread to form dispersion. FIG. 38 illustrates the astigmatism curve of the third imaging lens in the present embodiment, which represents the meridional image surface curvature and the sagittal image surface curvature. FIG. 39 shows distortion curves of the third imaging lens in the embodiment, representing distortion magnitude values for different viewing angles. FIG. 40 illustrates the magnification chromatic aberration curves of the third imaging lens of the embodiment, which represents the phase differences for different image heights on the imaging surface after light passes through the optical imaging lens. It can be seen from FIG. 37 to FIG. 40 that the third imaging lens 30 in the embodiment is applicable to a convenient electronic product, and has a large aperture and good imaging quality.

Embodiment 9

It should be noted that the third imaging lens 30 is defined in the present embodiment.

Figure 41:
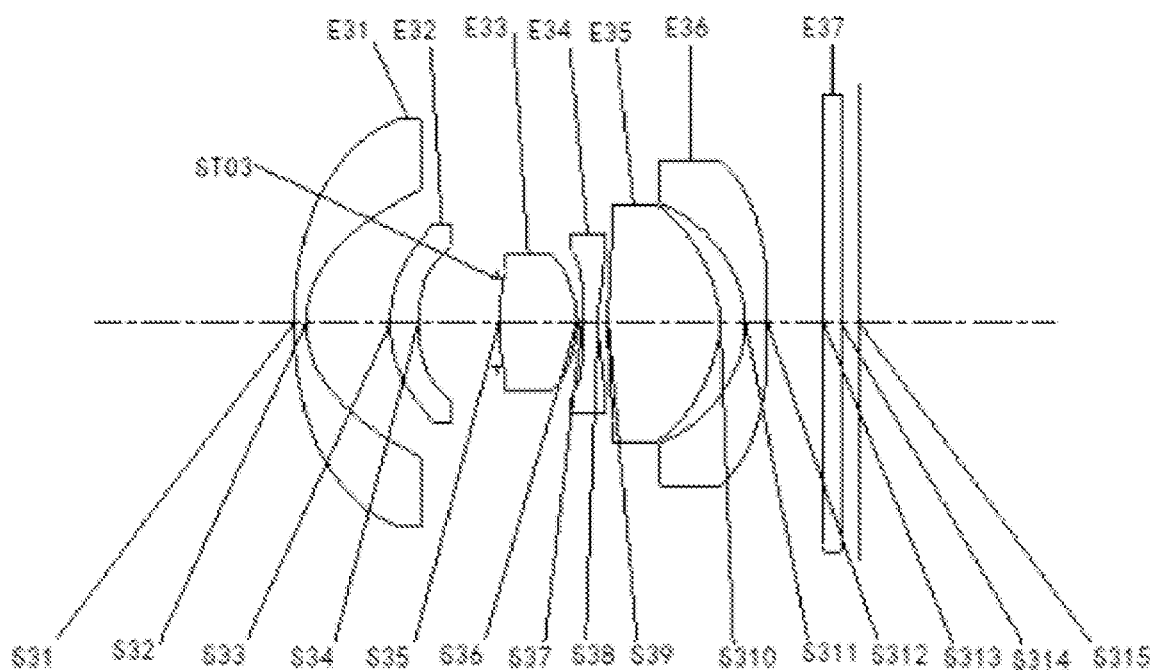
FIG. 41 is a schematic structural view of a third imaging lens according to a ninth embodiment of the disclosure.

As shown in FIG. 41, the third imaging lens 30 includes a first lens E31 of the third imaging lens, a second lens E32 of the third imaging lens, a diaphragm ST03 of the third imaging lens, a third lens E33 of the third imaging lens, a fourth lens E34 of the third imaging lens, a fifth lens E35 of the third imaging lens, a sixth lens E36 of the third imaging lens, a filter E37 of the third imaging lens, and an imaging surface S315 of the third imaging lens in order from an object-side to the image-side along the optical axis.

The first lens E31 of the third imaging lens has a negative optical power, a first lens object-side surface S31 of the first lens of the third imaging lens is a convex surface, and a first lens image-side surface S32 of the first lens of the third imaging lens is a concave surface; the second lens E32 of the third imaging lens has a positive focal power, a second lens object-side surface S33 of the second lens of the third imaging lens is a convex surface, and a second lens image-side surface S34 of the second lens of the third imaging lens is a concave surface; the third lens E33 of the third imaging lens has a positive focal power, the third lens object-side surface S35 of the third lens of the third imaging lens is a concave surface, and the third lens image-side surface S36 of the third lens of the third imaging lens is a convex surface; a fourth lens E34 of the third imaging lens has a negative optical power, a fourth lens object-side surface S37 of the fourth lens of the third imaging lens is a convex surface, and a fourth lens image-side surface S38 of the fourth lens of the third imaging lens is a concave surface; the fifth lens E35 of the third imaging lens has a positive focal power, a fifth lens object-side surface S39 of the fifth lens of the third imaging lens is a convex surface, and a fifth lens image-side surface S310 of the fifth lens of the third imaging lens is a convex surface; the sixth lens E36 of the third imaging lens has negative optical power, a sixth lens object-side surface S311 of the sixth lens of the third imaging lens is a convex surface, and a sixth lens image-side surface S312 of the sixth lens of the third imaging lens is a concave surface. The filter E37 of the third imaging lens has a filter object-side surface S313 of the third imaging lens and a filter image-side surface S314 of the third imaging lens. Light from an object sequentially passes through the respective surfaces and is finally imaged on an imaging surface S315 of the third imaging lens. Table 25 shows the surface type, a curvature radius, the thickness, the material, and the conical coefficient of each lens of the third imaging lens in the embodiment, wherein the units of the curvature radius and the thickness are all millimeters.

TABLE 25

Detailed optical data of the third imaging lens in the embodiment

| Surface Number | Surface Type | Curvature radius | Thickness | Materials | Material | Conic Coefficient |
|---|---|---|---|---|---|---|
| OBJ | Sphere | None | None | | | |
| S31 | Aspheric Surface | 6.2504 | 0.1801 | 1.55, 56.1 | Plastic | 2.8707 |
| S32 | Aspheric Surface | 1.4855 | 1.2759 | | | −1.3145 |
| S33 | Aspheric Surface | 2.0678 | 0.4272 | 1.65, 23.5 | Plastic | −0.4717 |

TABLE 25-continued

Detailed optical data of the third imaging lens in the embodiment

| Surface Number | Surface Type | Curvature radius | Thickness | Materials | Material | Conic Coefficient |
|---|---|---|---|---|---|---|
| S34 | Aspheric Surface | 2.3680 | 1.1931 | | | −1.2043 |
| ST03 | Sphere | None | 0.0270 | | | 0.0000 |
| S35 | Aspheric Surface | 3.1146 | 1.1874 | 1.55, 56.1 | Plastic | 4.6323 |
| S36 | Aspheric Surface | −1.6110 | 0.0769 | | | −0.1372 |
| S37 | Aspheric Surface | 7.4575 | 0.2361 | 1.65, 23.5 | Plastic | −90.3919 |
| S38 | Aspheric Surface | 2.0696 | 0.1585 | | | −12.0529 |
| S39 | Aspheric Surface | 7.9431 | 1.6995 | 1.55, 56.1 | Plastic | −376.2865 |
| S310 | Aspheric Surface | −1.4268 | 0.3862 | | | −0.7084 |
| S311 | Aspheric Surface | −1.4600 | 0.3313 | 1.65, 23.5 | Plastic | −3.9495 |
| S312 | Aspheric Surface | −900.0000 | 0.8534 | | | 75.4800 |
| S313 | Sphere | None | 0.2700 | 1.52, 64.2 | Glass | |
| S314 | Sphere | None | 0.2698 | | | |
| S315 | Sphere | None | | | | |

Table 26 shows higher order coefficients of the respective aspherical surfaces of the respective aspherical lenses that can be used for the third imaging lens in the embodiment.

TABLE 26 the high order coefficients of the aspherical surfaces of the third imaging lens in the embodiment

| Surface Number | A4 | A6 | A8 | A10 | A12 | A14 | A16 |
|---|---|---|---|---|---|---|---|
| S31 | 1.1395E−02 | −4.3918E−03 | 1.1065E−03 | −1.5704E−04 | 1.3000E−05 | −6.0000E−07 | 1.3000E−08 |
| S32 | 3.3346E−02 | 3.4040E−03 | −3.8398E−03 | 1.4951E−03 | −2.6000E−04 | 1.7300E−05 | −6.1000E−07 |
| S33 | 2.1464E−02 | 2.2895E−02 | −1.0544E−02 | −3.1783E−03 | 1.0490E−03 | −8.1000E−07 | −4.0000E−07 |
| S34 | 7.0574E−02 | 7.8477E−02 | −6.7707E−02 | 3.0233E−02 | −4.5000E−04 | −4.3000E−04 | −4.7000E−04 |
| S35 | −8.4260E−03 | −5.2840E−02 | 7.9719E−02 | −5.1933E−02 | −2.1214E−01 | 2.5561E−01 | −4.3480E−02 |
| S36 | 4.2439E−02 | −1.4971E−01 | 3.6693E−01 | −5.2983E−01 | 3.6701E−01 | −1.1076E−01 | 4.2550E−03 |
| S37 | −1.9448E−01 | −8.6994E−03 | 2.4960E−01 | −3.3841E−01 | 1.6334E−01 | −2.7280E−02 | −2.1400E−03 |
| S38 | −7.7204E−02 | −5.4622E−02 | 1.5115E−01 | −1.2996E−01 | 5.5433E−02 | −1.1220E−02 | 8.3000E−04 |
| S39 | 9.0500E−02 | −1.7185E−01 | 1.3063E−01 | −4.8674E−02 | 7.4090E−03 | 3.5000E−04 | −1.6000E−04 |
| S310 | 1.3137E−01 | −1.0106E−01 | 8.1529E−02 | −4.8159E−02 | 1.6527E−02 | −3.0000E−03 | 2.2400E−04 |
| S311 | −2.9447E−02 | −4.4443E−02 | 4.0996E−02 | −1.7595E−02 | 3.3950E−03 | −2.5000E−04 | −2.9000E−08 |
| S312 | −4.9899E−02 | 1.3239E−02 | −1.7593E−03 | −2.2131E−06 | 1.8200E−05 | −1.1000E−06 | −2.4000E−11 |

Table 27 gives an effective focal length $F_3$ of the third imaging lens in the embodiment, an effective focal lengths $f_{31}$ to $f_{36}$ of each lens of the third imaging lens, the distance $TTL_3$ on the optical axis from the first lens object-side surface S31 of the third imaging lens to the imaging surface S315 of the third imaging lens, and $IngH_2$ is a half of a diagonal length of an effective pixel area on an imaging surface of the third imaging lens, an apertures number $Fno_3$ of the third imaging lens, an object distance $P_3$ of the third imaging lens, and the maximum half viewing angle Semi-FOV3 of the third imaging lens.

TABLE 27

Parameters of the third imaging lens

| Embodiment Parameters | 9 |
|---|---|
| f31 (mm) | −3.62 |
| f32 (mm) | 16.25 |

TABLE 27-continued

Parameters of the third imaging lens

| Embodiment Parameters | 9 |
|---|---|
| f33 (mm) | 2.13 |
| f34 (mm) | −4.52 |
| f35 (mm) | 2.37 |
| f36 (mm) | −2.27 |
| F3 (mm) | 2.29 |
| TTL3 (mm) | 8.57 |
| ImgH3 (mm) | 3.63 |
| Fno3 | 2.76 |
| P3 (mm) | None |
| Semi-FOV3(°) | 68.5 |

In the embodiment, the length of the third imaging lens 30 on the optical axis from the first lens object-side surface S31 of the first lens of the third imaging lens to the imaging surface S315 of the third imaging lens is 8.57 mm, and an effective focal length of the third imaging lens is 2.29 mm, the image height of the third imaging lens is 3.63 mm, the maximum half viewing angle of the third imaging lens is 68.5 degrees, and the aperture value of the third imaging lens is 2.76.

In the embodiment, $(f_{31}+f_{34}+f_{36})/(f_{32}+f_{33}+f_{35})=0.50$, $(f_{31}+f_{34}+f_{36})/(f_{32}+f_{33}+f_{35})$ belongs to the range of −1.0 to −0.4, and the contribution amount of field curvature of each lens of the third imaging lens can be rationally controlled, so that the field curvature of the third imaging lens can be controlled within a reasonable range.

$(R_{39}+R_{310})/(R_{39}-R_{310})=0.70$, $(R_{39}+R_{310})/(R_{39}-R_{310})$ belongs to the range of 0.6 to 0.9, so that the deflection angle of the light at the edge of the optical imaging system of the third imaging lens can be rationally controlled, and the sensitivity of the optical imaging system of the third imaging lens can be effectively reduced.

Figure 42:
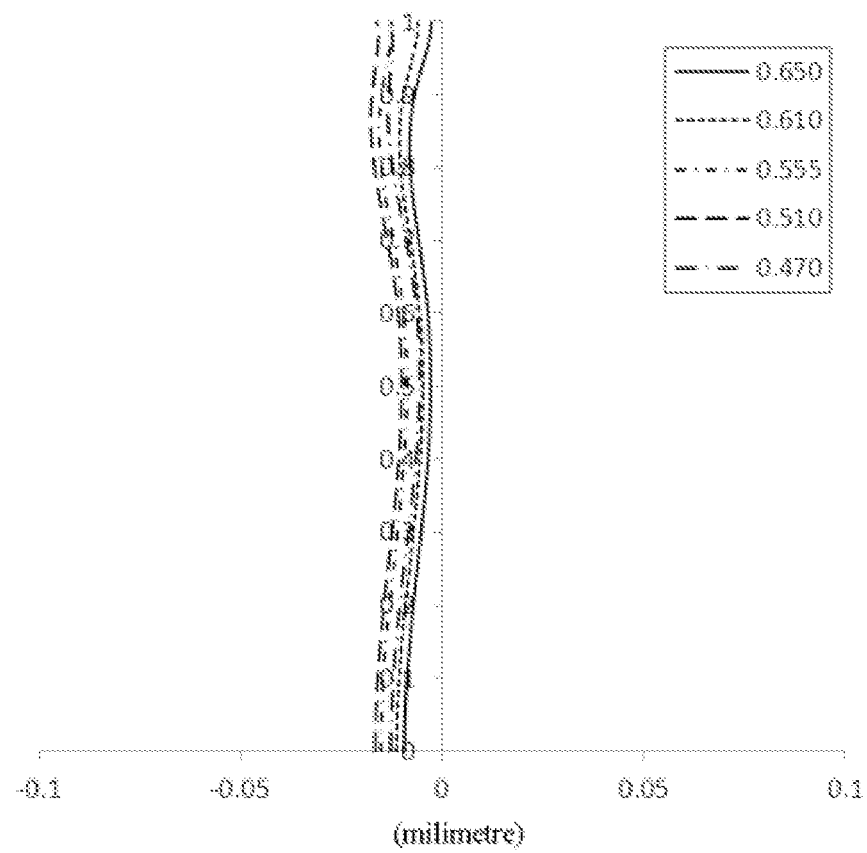
FIG. 42 shows an axis chromatic aberration curve of the third imaging lens of FIG. 41.
Figure 43:
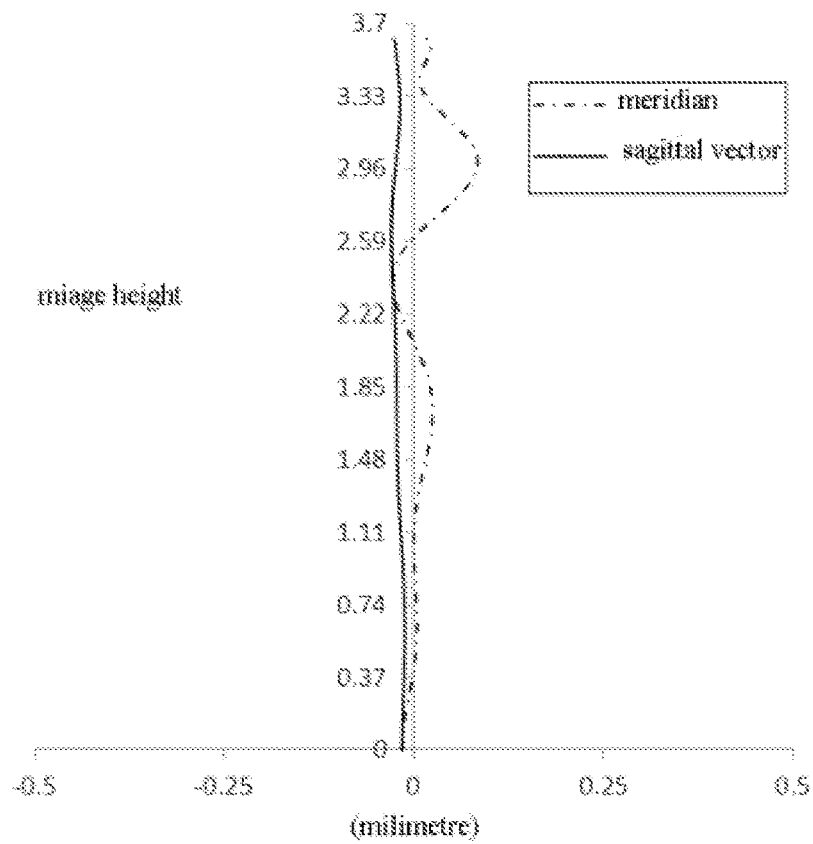
FIG. 43 shows the astigmatism curve of the third imaging lens of FIG. 41.
Figure 44:
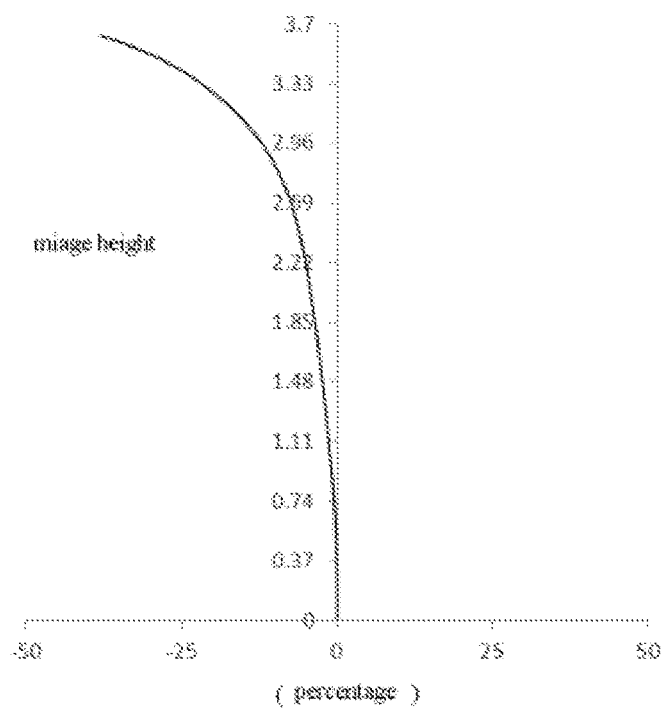
FIG. 44 shows a distortion curve for the third imaging lens of FIG. 41.
Figure 45:
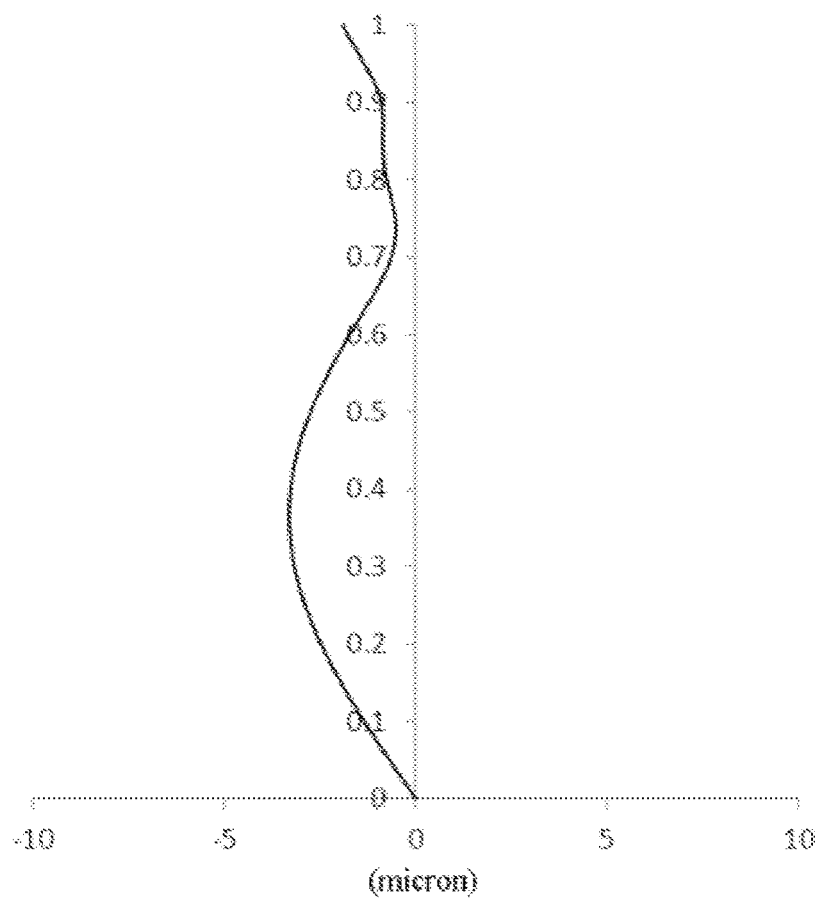
FIG. 45 shows the magnification chromatic aberration curves of the third imaging lens of FIG. 41.
Figure 46:
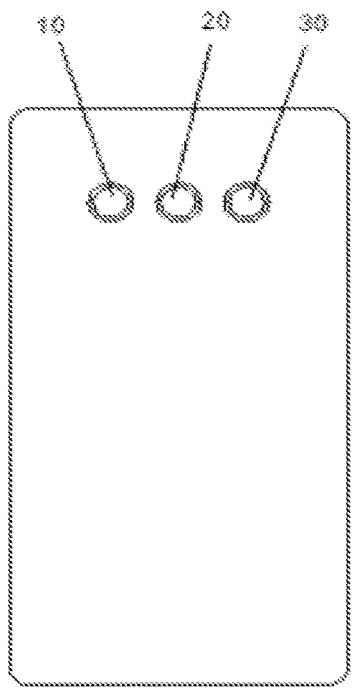
FIG. 46 is a schematic view showing a structure of an imaging device of the disclosure.

FIG. 42 shows an axis chromatic aberration curve of the third imaging lens 30 in the present embodiment, which indicates that convergence focal points of light with different wavelengths are deviated after passing through an optical system, so that focal planes of light with different wavelengths cannot be coincided at the time of the last imaging, and the colorized light is spread to form dispersion. FIG. 43 illustrates a stigmatic curve of the third imaging lens in the embodiment, which represents meridional image surface curvature and sagittal image surface curvature. FIG. 44 shows distortion curves of the third imaging lens in the embodiment, representing distortion magnitude values for different viewing angles. FIG. 45 shows the magnification chromatic aberration curves of the third imaging lens of the embodiment, which represents the phase differences for different image heights on the imaging surface after light passes through the optical imaging lens. It can be seen from FIG. 42 to FIG. 45 that the third imaging lens 30 in the embodiment is applicable to a convenient electronic product, and has a large aperture and good imaging quality.

The above description is only the preferred embodiments of the disclosure, and is not intended to limit the disclosure. For those skilled in the art, the disclosure may have various modifications and variations. Any modifications, equivalent replacements, improvements and the like made within the spirit and principle of the disclosure shall belong to the protection scope of the disclosure.

What is claimed is:

1. An imaging lenses, comprising a first imaging lens (10), a second imaging lens (20) and a third imaging lens (30) which are arranged at intervals in sequence, wherein the first imaging lens (10), the second imaging lens (20) and the third imaging lens (30) satisfy the following condition:

$1.0<Fno_1<Fno_2<Fno_3<3.0$;

$5.0\ mm>F_1>F_2>F_3>1.0\ mm$;

$P_1<P_2<P_3$;

wherein, $Fno_1$ is an apertures number of the first imaging lens, $Fno_2$ is an apertures number of the second imaging lens, $Fno_3$ is an apertures number of the third imaging lens, $F_1$ is an effective focal length of the first imaging lens, $F_2$ is an effective focal length of the second imaging lens, $F_3$ is an effective focal length of the third imaging lens, $P_1$ is an object distance of the first imaging lens, $P_2$ is an object distance of the second imaging lens, $P_3$ is an object distance of the third imaging lens, an optical axis of the first imaging lens, an optical axis of the second imaging lens and an optical axis of the third imaging lens are all not coaxial.

2. The imaging lenses as claimed in claim 1, wherein the first imaging lens (10) comprises at least three lenses with positive focal power;
the second imaging lens (20) comprises at least three lenses with positive focal power;
the third imaging lens (30) comprises at least three lenses with positive focal power.

3. The imaging lenses as, claimed in claim 2, wherein the first imaging lens (10), the second imaging lens (20) and the third imaging lens (30) each have at least one lens whose lens, surface is aspherical.

4. The imaging lenses as claimed in claim 1, wherein an object distance $P_2$ of the second imaging lens is greater than or equal to 500 mm and less than or equal to 1500 mm.

5. The imaging lenses as claimed in claim 1, wherein the effective focal length $F_2$ of the second imaging lens, an effective focal length $f_{21}$ of a first lens of the second imaging lens, an effective focal length $f_{25}$ of a fifth lens of the second imaging lens and an effective focal length $f_{26}$ of a sixth lens of the second imaging lens satisfy $0.7<F_2/(f_{21}+f_{25}+f_{26})<1.0$.

6. The imaging lenses as claimed in claim 1, wherein a distance $TTL_2$ between a first lens object-side surface of a first lens of the second imaging lens and an imaging surface of the second imaging lens on an optical axis of the second imaging lens, $ImgH_2$ is a half of a diagonal length of an effective pixel area on an imaging surface of the second imaging lens, $TTL_2$ and $ImgH_2$ satisfy $TTL_2/ImgH_2<1.65$.

7. The imaging lenses as claimed in claim 1, wherein, an effective focal length $f_{31}$ of a first lens of the third imaging lens an effective focal length $f_{32}$ of a second lens of the third imaging lens, an effective focal length $f_{33}$ of a third lens of the third imaging lens, an effective focal length $f_{34}$ of a fourth lens of the third imaging lens, an effective focal length $f_{35}$ of a fifth lens of the third imaging lens and an effective focal length $f_{36}$ of a sixth lens of the third imaging lens satisfy the following condition: $-1.0<(f_{31}+f_{34}+f_{36})/(f_{32}+f_{33}+f_{35})<-0.4$.

8. The imaging lenses as claimed in claim 1, wherein a curvature radius $R_{39}$ of a fifth lens object-side surface of a fifth lens of the imaging lens and a curvature radius $R_{310}$ of a fifth lens image-side surface of the fifth lens of the third imaging lens satisfy the following condition: $0.6<(R_{39}+R_{310})/(R_{39}-R_{310})<0.9$.

9. An imaging device, comprising the imaging lenses as claimed in claim 1.

10. The imaging lenses as claimed in claim 1, wherein the first imaging lens includes at least five plastic lenses; the second imaging lens includes at least five plastic lenses;
the third imaging lens includes at least five plastic lenses.

11. The imaging lenses as claimed in claim 10, wherein any two adjacent lenses of the first imaging lens have an air interval on an optical axis of the first imaging lens; any two adjacent lenses of the second imaging lens have an air interval on an optical axis of the second imaging lens;
any two adjacent lenses of the third imaging lens have an air interval on an optical axis of the third imaging lens.

12. The imaging lenses as claimed in claim 2, wherein a viewing angle $Fov_3$ of the third imaging lens is greater than a viewing angle $Fov_1$ of the first imaging lens, and the viewing angle $Fov_3$ of the third imaging lens is greater than a viewing $Fov_2$ angle of the second imaging lens.

13. The imaging lenses as claimed in claim 1, wherein a curvature radius $R_{23}$ of a second lens object-side surface of a second lens of the second imaging lens, a curvature radius $R_{24}$ of a second lens image-side surface of the second lens of the second imaging lens, a curvature radius $R_{21}$ of a first lens object-side surface of a first lens of the second imaging lens, and curvature radius $R_{22}$ of a first lens image-side surface of the first lens of the second imaging lens satisfy $0.4<(R_{23}+R_{24})/(R_{21}+R_{22})<0.8$.

14. The imaging device as claimed in claim 9, wherein
the first imaging lens (10) comprises at least three lenses with positive focal power;
the second imaging lens (20) comprises at least three lenses with positive focal power;
the third imaging lens (30) comprises at least three lenses with positive focal power.

15. The imaging device as claimed in claim 14, wherein
the first imaging lens (10), the second imaging lens (20) and the third imaging lens (30) each have at least one lens whose lens surface is aspherical.

16. The imaging device as claimed in claim 9, wherein an object distance $P_2$ of the second imaging lens is greater than or equal to 500 mm and less than or equal to 1500 mm.

17. The imaging device as claimed in claim 9, wherein the effective focal length $F_2$ of the second imaging lens, an effective focal length $f_{21}$ of a first lens of the second imaging lens, an effective focal length $f_{25}$ of a fifth lens of the second imaging lens and an effective focal length $f_{26}$ of a sixth lens of the second imaging lens satisfy $0.7<F_2/(f_{21}+f_{25}+f_{26})<1.0$.

18. The imaging device as claimed in claim 9, wherein a distance $TTL_2$ between a first lens object-side surface of a first lens of the second imaging lens and an imaging surface of the second imaging lens on an optical axis of the second imaging lens, $ImgH_2$ is a half of a diagonal length of an effective pixel area on an imaging surface of the second imaging lens, $TTL_2$ and $ImgH_2$ satisfy $TTL_2/ImgH_2<1.65$.

19. The imaging device as claimed in claim 9, wherein, an effective focal length $f_{31}$ of a first lens of the third imaging lens, an effective focal length $f_{32}$ of a second lens of the third imaging lens, an effective focal length $f_{33}$ of a third lens of the third imaging lens, an effective focal length $f_{34}$ of a fourth lens of the third imaging lens, an effective focal length $f_{35}$ of a fifth lens of the third imaging lens and an effective focal length $f_{36}$ of a sixth lens of the third imaging lens satisfy the following condition: $-1.0<(f_{31}+f_{34}+f_{36})/(f_{32}+f_{33}+f_{35})<-0.4$.

* * * * *